US012689320B2

(12) United States Patent
Patton et al.

(10) Patent No.: US 12,689,320 B2
(45) Date of Patent: Jul. 21, 2026

(54) METHODS AND SYSTEMS FOR CONNECTING SOLAR PANEL FRAME COMPONENTS

(71) Applicant: NEXTPOWER LLC, Fremont, CA (US)

(72) Inventors: John C. Patton, Rocklin, CA (US); Eric Hafter, Sacramento, CA (US); Tyler Hudson, Cocolalla, ID (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/704,906

(22) PCT Filed: Oct. 26, 2022

(86) PCT No.: PCT/US2022/047938
§ 371 (c)(1),
(2) Date: Apr. 25, 2024

(87) PCT Pub. No.: WO2023/076429
PCT Pub. Date: May 4, 2023

(65) Prior Publication Data
US 2025/0192715 A1      Jun. 12, 2025

Related U.S. Application Data

(60) Provisional application No. 63/272,086, filed on Oct. 26, 2021.

(51) Int. Cl.
*H02S 30/10*          (2014.01)
*H02S 20/20*          (2014.01)
*F16B 17/00*          (2006.01)
(52) U.S. Cl.
CPC .............. *H02S 20/20* (2014.12); *H02S 30/10* (2014.12); *F16B 17/004* (2013.01)

(58) Field of Classification Search
CPC ........... H02S 30/10; H02S 20/20; F24S 25/20
See application file for complete search history.

(56) References Cited

U.S. PATENT DOCUMENTS 3,797,194 A * 3/1974 Ekstein ................. F16B 17/004
                                                403/295
3,898,728 A * 8/1975 Rousseau .............. E06B 3/9725
                                                29/446

(Continued)

FOREIGN PATENT DOCUMENTS

DE      102009059232 A1     6/2011
WO        2011139648 A2    11/2011

OTHER PUBLICATIONS

International Patent Application No. PCT/US2022/047938, filed Oct. 26, 2022. First named inventor: Patton.

(Continued)

*Primary Examiner* — Bradley Duckworth
(74) *Attorney, Agent, or Firm* — Fredrikson & Byron, P.A.

(57) ABSTRACT

A frame for at least partially enclosing or supporting a panel is provided. The frame may include at least a first frame section that may include an elongated piece of framework material having a first end and a second end, wherein the first and second ends define a lengthwise dimension. The first frame section may further include lengthwise fold defining an intersection of a frame sidewall with a bottom flange, wherein the frame sidewall is characterized by a height extending from the bottom flange. The first frame section may further include a portion of at least one tab connection assembly where a connected element is attached to the first frame section. The tab connection assembly may include: i) at least one tab feature provided as part of either the first frame section or the connected element, and ii) at least one corresponding hole feature provided as part of the other of (Continued)

the first frame section or the connected element, wherein the hole feature may lockingly receives the at least one tab feature. The connected element may include another frame section, a cross bar, or a racking structure.

20 Claims, 44 Drawing Sheets

(56) References Cited

U.S. PATENT DOCUMENTS

| | | | | |
|---|---|---|---|---|
| 4,192,624 | A * | 3/1980 | Bucci | E06B 3/9765 |
| | | | | 403/295 |
| 4,637,752 | A * | 1/1987 | Centa | E02D 29/14 |
| | | | | 404/25 |
| 4,899,507 | A * | 2/1990 | Mairlot | B32B 17/10036 |
| | | | | 52/204.5 |
| 7,806,620 | B1 * | 10/2010 | Brochez | E06B 3/9765 |
| | | | | 403/403 |
| 9,109,814 | B2 * | 8/2015 | Patton | H02S 30/10 |
| 9,571,030 | B2 * | 2/2017 | Kube | H10F 71/00 |
| 10,063,183 | B2 * | 8/2018 | Patton | F24S 25/61 |
| 10,935,282 | B2 * | 3/2021 | Gorny | H10F 19/00 |
| 11,431,288 | B2 * | 8/2022 | Gorny | H02S 30/10 |
| 11,870,387 | B2 * | 1/2024 | Yoo | H02S 30/00 |
| 11,962,270 | B2 * | 4/2024 | Miller | F24S 25/617 |
| 12,237,806 | B2 * | 2/2025 | Gorny | H02S 40/34 |
| 12,237,807 | B2 * | 2/2025 | Oldenkamp | H02S 40/32 |
| 2008/0216440 | A1 * | 9/2008 | Kobayashi | E06B 3/9765 |
| | | | | 403/295 |
| 2010/0132766 | A1 | 6/2010 | Jenkins | |
| 2010/0275974 | A1 | 11/2010 | Chan et al. | |
| 2011/0194886 | A1 * | 8/2011 | Wu | E06B 3/9641 |
| | | | | 403/23 |
| 2011/0214713 | A1 * | 9/2011 | Hou | F24S 25/20 |
| | | | | 136/251 |
| 2011/0259404 | A1 * | 10/2011 | Jang | H02S 30/10 |
| | | | | 136/251 |
| 2014/0352763 | A1 | 12/2014 | Chen et al. | |
| 2015/0222219 | A1 * | 8/2015 | Kouyanagi | H02S 30/10 |
| | | | | 136/251 |
| 2024/0088824 | A1 * | 3/2024 | Feng | B29C 66/636 |

OTHER PUBLICATIONS

International Patent Application No. PCT/US2022/047938, filed Oct. 26, 2022. First named inventor: Patton. Written Opinion of the International Searching Authority dated Mar. 6, 2023, 9 pages.

International Patent Application No. PCT/US2022/047938, filed Oct. 26, 2022. First named inventor: Patton. International Search Report dated Mar. 6, 2023, 5 pages.

International Patent Application No. PCT/US2020/037092, filed Oct. 6, 2020. First named inventor: Patton.

U.S. Appl. No. 63/176,803, filed Apr. 19, 2021. First named inventor: Hafter.

U.S. Appl. No. 63/176,824, filed Apr. 19, 2021. First named inventor: Patton.

U.S. Appl. No. 63/189,591, filed May 17, 2021. First named inventor: Hafter.

U.S. Appl. No. 63/213,541, filed Jun. 22, 2021. First named inventor: Hafter.

U.S. Appl. No. 63/224,271, filed Jul. 21, 2021. First named inventor: Patton.

U.S. Appl. No. 63/272,086, filed Oct. 26, 2021. First named inventor: Patton.

* cited by examiner 501-1

501-2

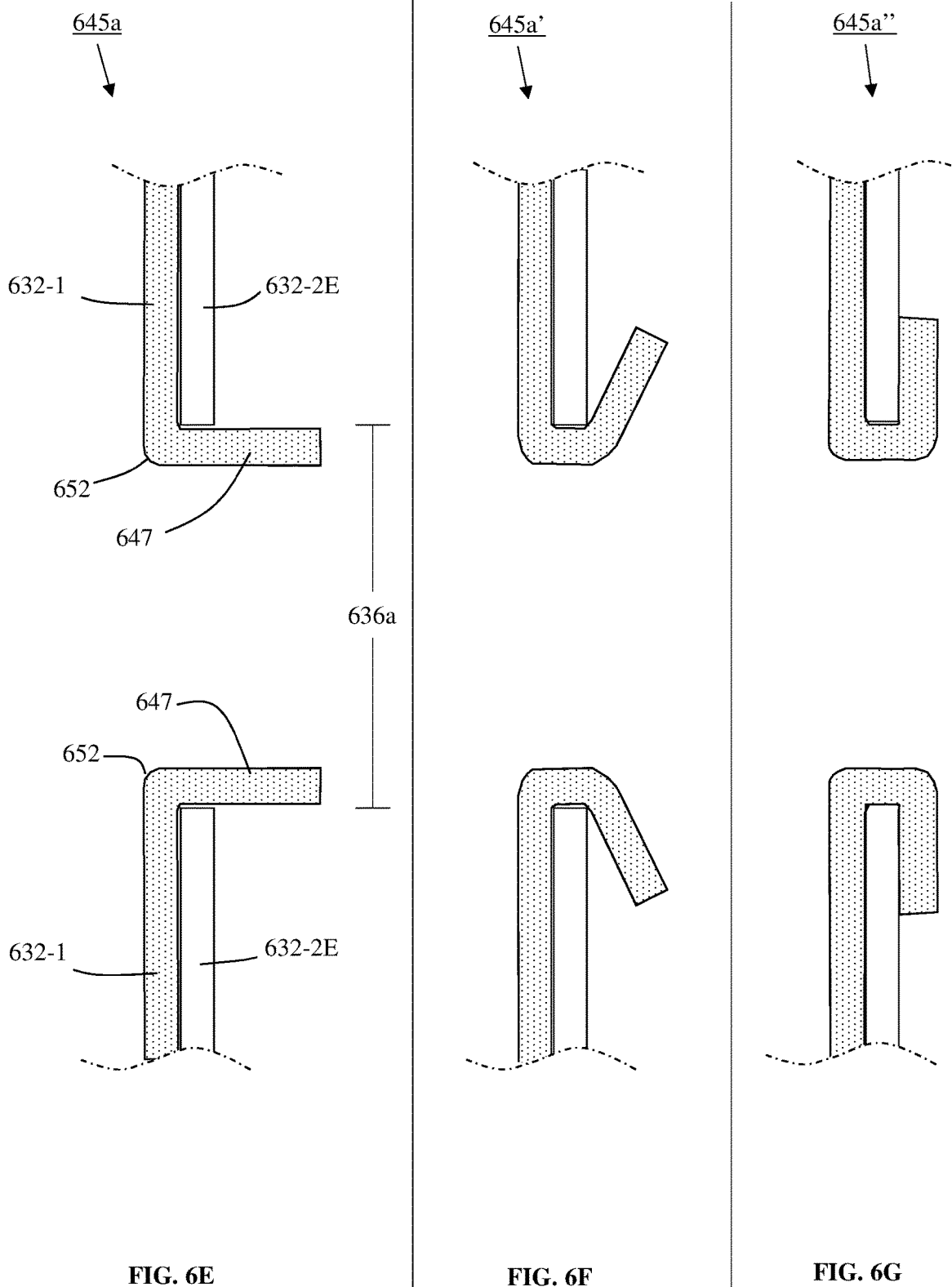
FIG. 6E                    FIG. 6F                    FIG. 6G

1070A 1071-1A    1071-2A 1001-1B

1041b

1041b

1041a

1041a 1145-1a 1145-2a 1145-1b 1145-2b

F 1145-1b 1145-2b

1270

1270

1201-1                 1201-2

1318-1

1301-1

1301-2

1380

1380F

1384

1480C

1483D

1480D

1489

METHODS AND SYSTEMS FOR CONNECTING SOLAR PANEL FRAME COMPONENTS

CROSS-REFERENCE TO RELATED APPLICATIONS

The present application is the US National Phase of PCT International Application No. PCT/US2022/047938, filed Oct. 26, 2022 which claims priority to and the benefit of U.S. Provisional Patent Application No. 63/272,086 filed Oct. 26, 2021, each mentioned application and any priority case are hereby incorporated by reference in its entirety.

TECHNICAL FIELD

The present disclosure relates to various embodiments for connecting frame components for use with panels such as solar panels.

BACKGROUND

Photovoltaic solar panels for residential and commercial use are relatively large and heavy. For example, a typical rectangular solar panel may weigh about 20-30 kg, have a width of about 1 meter, a length of about 1.6 to 2.5 meters, and a thickness of about 3 to 5 cm. A photovoltaic solar panel may typically be a multilayer laminated structure and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack.

Over the years, the cost of solar panels has decreased perhaps due to a decrease in the material and manufacturing costs and even an increased efficiency of the solar cells. However, in order to further expand the use of renewable solar energy, there is a continuing desire to further reduce costs and simplify the manufacture of frames.

SUMMARY

The present application includes a variety of aspects, which may be selected in different combinations based upon the particular application or needs to be addressed. In various embodiments, the application may include a frame for at least partially enclosing or supporting a panel is provided. The frame may include at least a first frame section that may include an elongated piece of framework material having a first end and a second end, wherein the first and second ends define a lengthwise dimension. The first frame section may further include lengthwise fold defining an intersection of a frame sidewall with a bottom flange, wherein the frame sidewall is characterized by a height extending from the bottom flange. The first frame section may further include a portion of at least one tab connection assembly where a connected element is attached to the first frame section. The tab connection assembly may include: i) at least one tab feature provided as part of either the first frame section or the connected element, and ii) at least one corresponding hole feature provided as part of the other of the first frame section or the connected element, wherein the hole feature may lockingly receives the at least one tab feature. The connected element may include another frame section, a cross bar, or a racking structure.

Embodiments of frames, frame sections, frame precursor structures, connected elements and connectors herein may provide one or more of the following advantages: improved frame strength; improved mounting structures; improved options for high-strength modules; improved bending; improved twisting; improved durability of framed panel structures; reduced material costs; reduced manufacturing costs; reduced manufacturing tack time; higher manufacturing yield; reduced installation costs; simplified installation; reduced installation time; higher installation yield; or some other advantage.

Naturally, further objects, goals and embodiments of the application are disclosed throughout other areas of the specification, claims, and drawings.

BRIEF DESCRIPTION OF DRAWINGS

FIGS. 6E-6F are cross-sectional views illustrating the connection of two frame sections using tab connection assemblies according to some embodiments.

FIGS. 6G-6K are various perspective views illustrating the connection of two frame sections using tab connection assemblies according to some embodiments.

DETAILED DESCRIPTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the present application may be found in co-pending PCT application PCT/US2020/037092 filed on Jun. 10, 2020, co-pending U.S. provisional application 63/176,803 filed on Apr. 19, 2021, co-pending U.S. provisional application 63/176,824 filed Apr. 19, 2021, co-pending U.S. provisional application 63/189,591 filed May 17, 2021, co-pending U.S. provisional application 63/213,541 filed Jun. 22, 2021, and co-pending U.S. provisional application 63/224,271 filed Jul. 21, 2021, the entire contents of each application are incorporated herein by reference for all purposes.

Figure 1A:
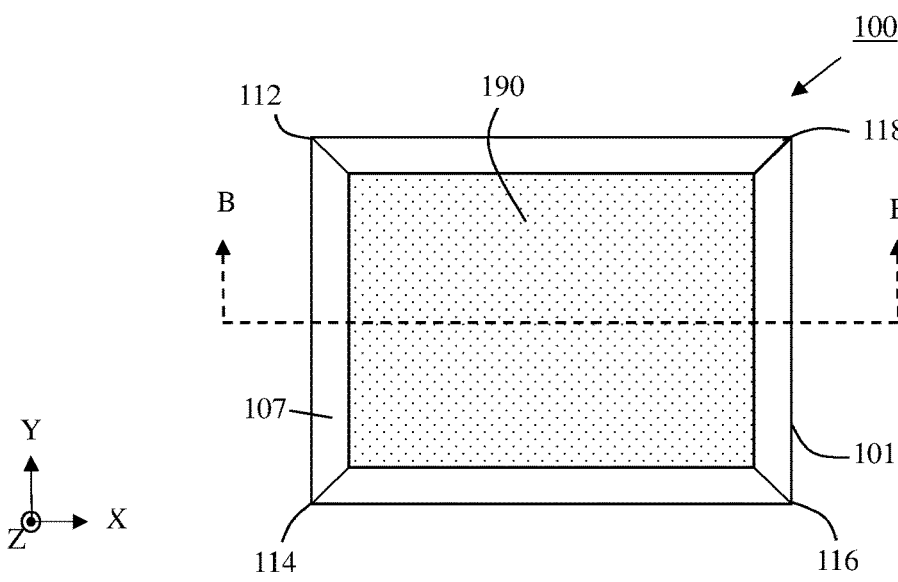
FIG. 1A is a plan view of a non-limiting example of a framed panel structure according to some embodiments.
Figure 1B:
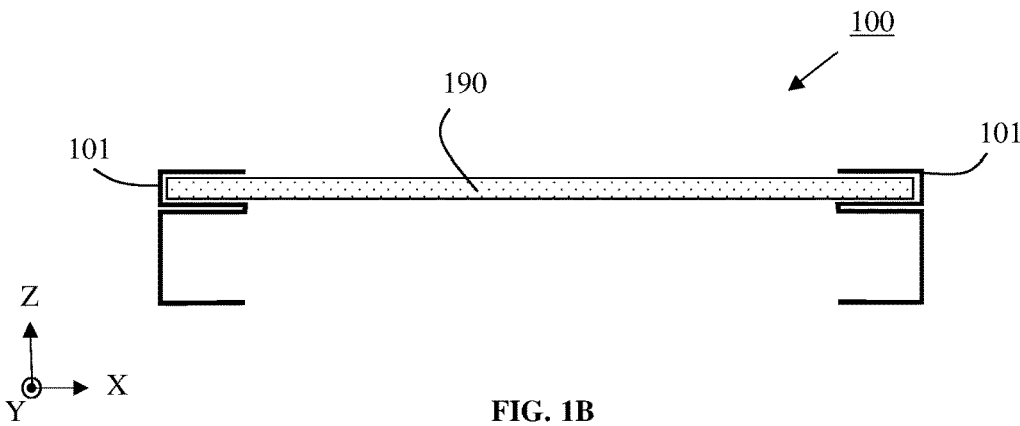
FIG. 1B is a cross-sectional view of a non-limiting example of a framed panel structure along cutline B-B of FIG. 1A according to some embodiments.
Figure 1C:
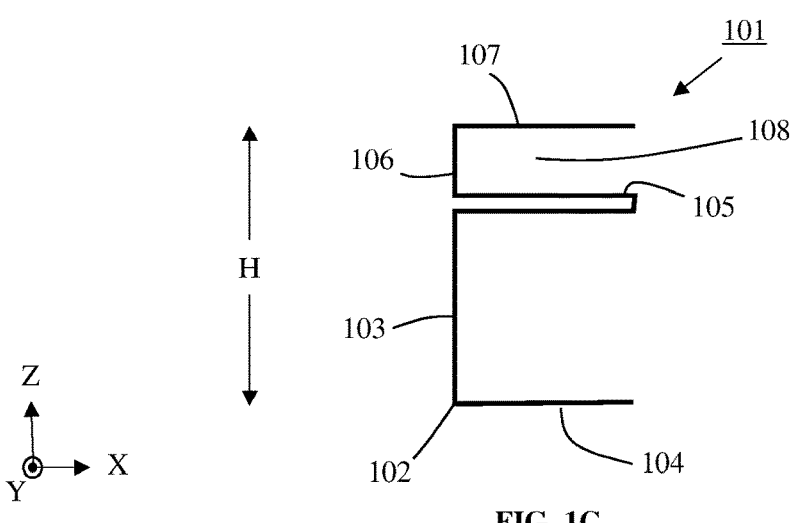
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure) including panel 190 (e.g., a solar panel) encased in a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that is bent in predetermined regions to accommodate three corners of the solar panel, perhaps with the fourth corner forming a joint between two ends of the frame precursor structure. That is, frame 101 may include a first corner bend 112 corresponding to a first corner of panel 190, a second corner bend 114 corresponding to a second corner of panel 190, a third corner bend 116 corresponding to a third corner of panel 190, and a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure including a lower shelf 105, a pocket wall 106, a top lip 107, and perhaps even a pocket region 108. The panel 190 may be received into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be shorter or longer than the others. The angle between the frame sidewall and bottom flange is shown to be approximately 90°, e.g., in a range of about 85° to about 95°, but in some other embodiments, the angle may be larger than that, e.g., in a range of about 45° to about 135° depending on other features of the structure and overall system design. In some embodiments, the lower shelf and bottom flange may remain approximately parallel, e.g., within about 10°, alternatively within about 5°, regardless of the angle between the frame sidewall and the bottom flange. The top lip is shown to be parallel with the lower shelf, but in some embodiments, it may be at a slight angle or curved at the end so that the opening of the pocket region is larger or smaller than the pocket wall.

FIGS. 1A, 1B, and 1C illustrate a conventional rectangular panel shape that may be common for solar panels. However, there is no particular limitation on the shape of the panel which may be any polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others. Although frames and frame sections herein are generally shown as having a bottom flange, in some embodiments, one or more frame sections may not include a bottom flange. In some embodiments where the frame has a rectangular shape, the frame sections corresponding to the shorter sides of the frame may not include a bottom flange whereas the frame sections corresponding to the longer sides of the frame may include a bottom flange.

Making the frame or a frame section substantially from a single piece of framework material may have considerable manufacturing, assembly, and cost advantages. However, the panel containment structure in some embodiments may be formed using alternative methods and materials. For example, the shelf may be a piece of shelf material bonded (e.g., welded, brazed, soldered, glued, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 frame separate frame sections (or more if the frame has more than 4 sides).

Figure 2A:
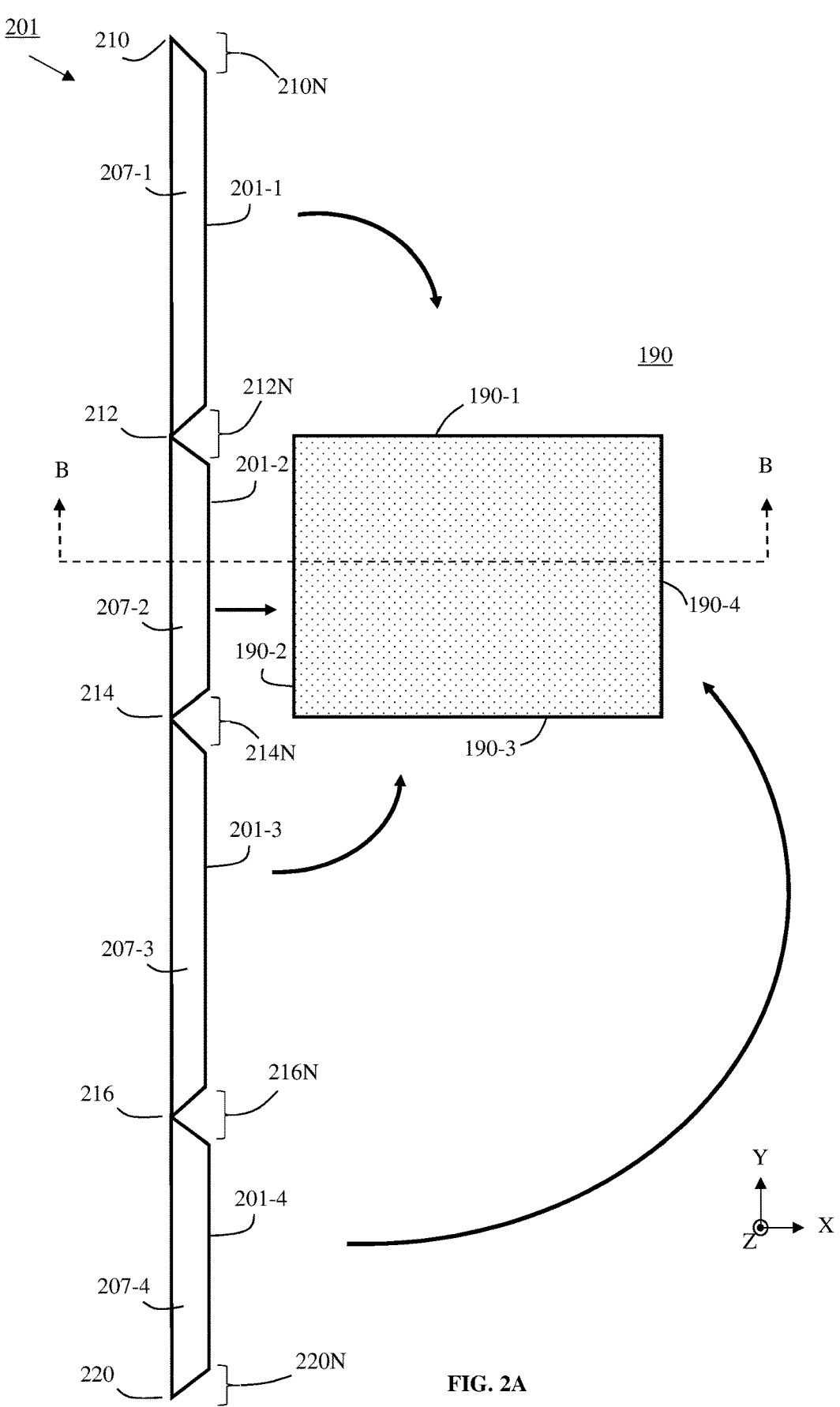
FIG. 2A is a plan view of a non-limiting example of a frame precursor structure and a panel prior to assembling a framed panel structure according to some embodiments.
Figure 2B:
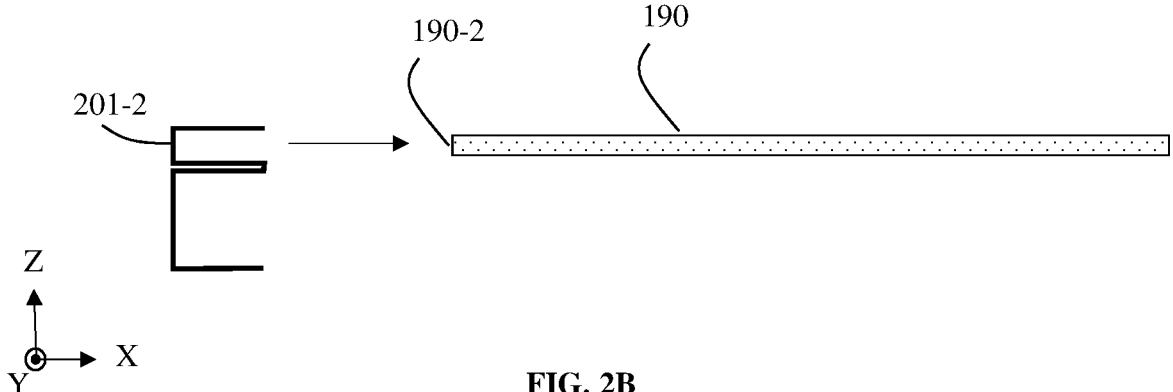
FIG. 2B is a cross-sectional view of a non-limiting example of a frame precursor structure and a panel along cutline B-B of FIG. 2A according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or attach to first panel edge 190-1 of panel 190, a second frame section 201-2 designed to fit with or attach to second panel edge 190-2, a third frame section 201-3 designed to fit with or attach to third panel edge 190-3, and even a fourth frame section 201-4 designed to fit with or attach to fourth panel edge 190-4. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively.

Figure 2C:
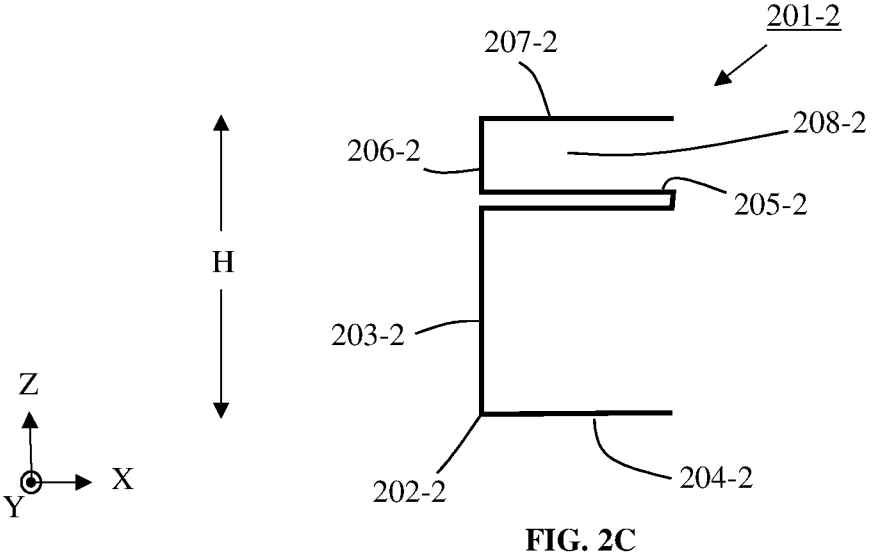
FIG. 2C is the cross-sectional view from FIG. 2B showing a non-limiting example of just the frame precursor structure according to some embodiments.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure including a lower shelf 205-2, a pocket wall 206-2, a top lip 207-2 and even a pocket region 208-2. The panel 190 may be received into a portion of the pocket region and secured in place, optionally with some adhesive (not shown). In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections.

In order to accommodate bending of the frame precursor structure to enclose the panel, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
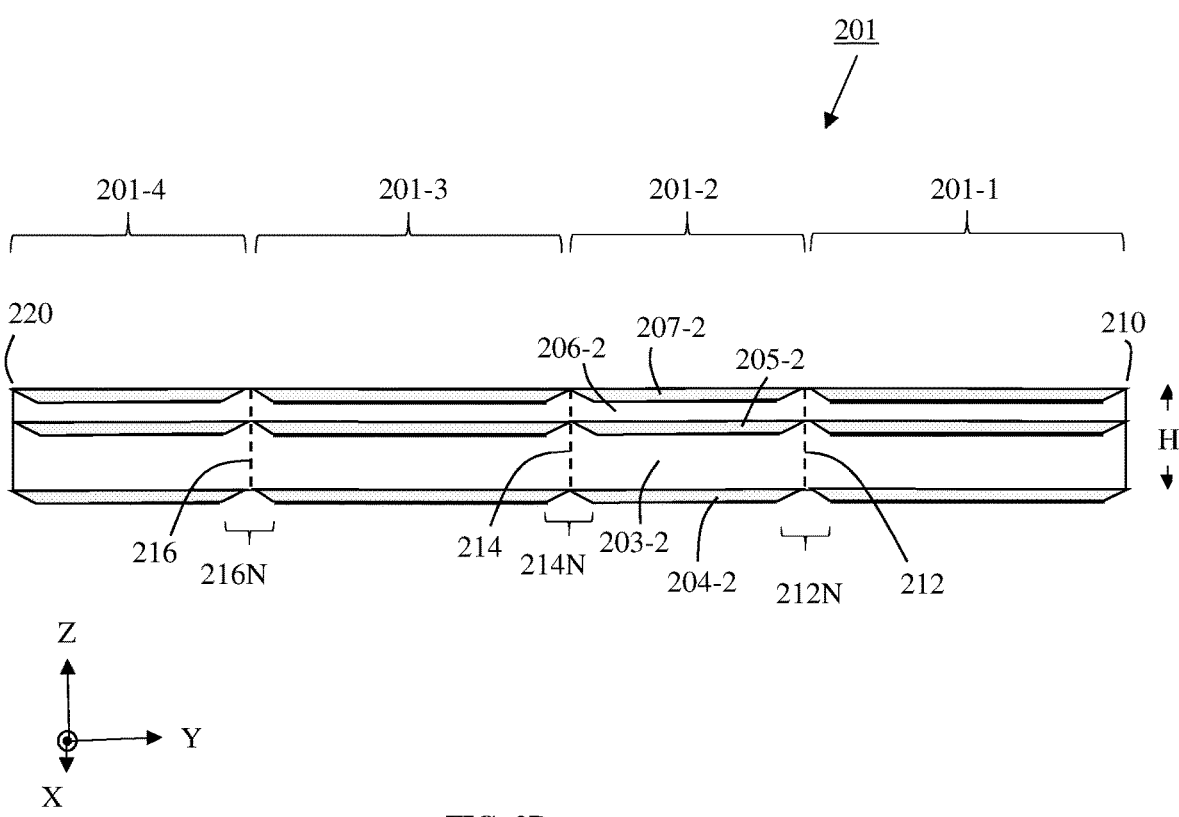
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures, the identity of each feature is self-evident.

Figure 2E:
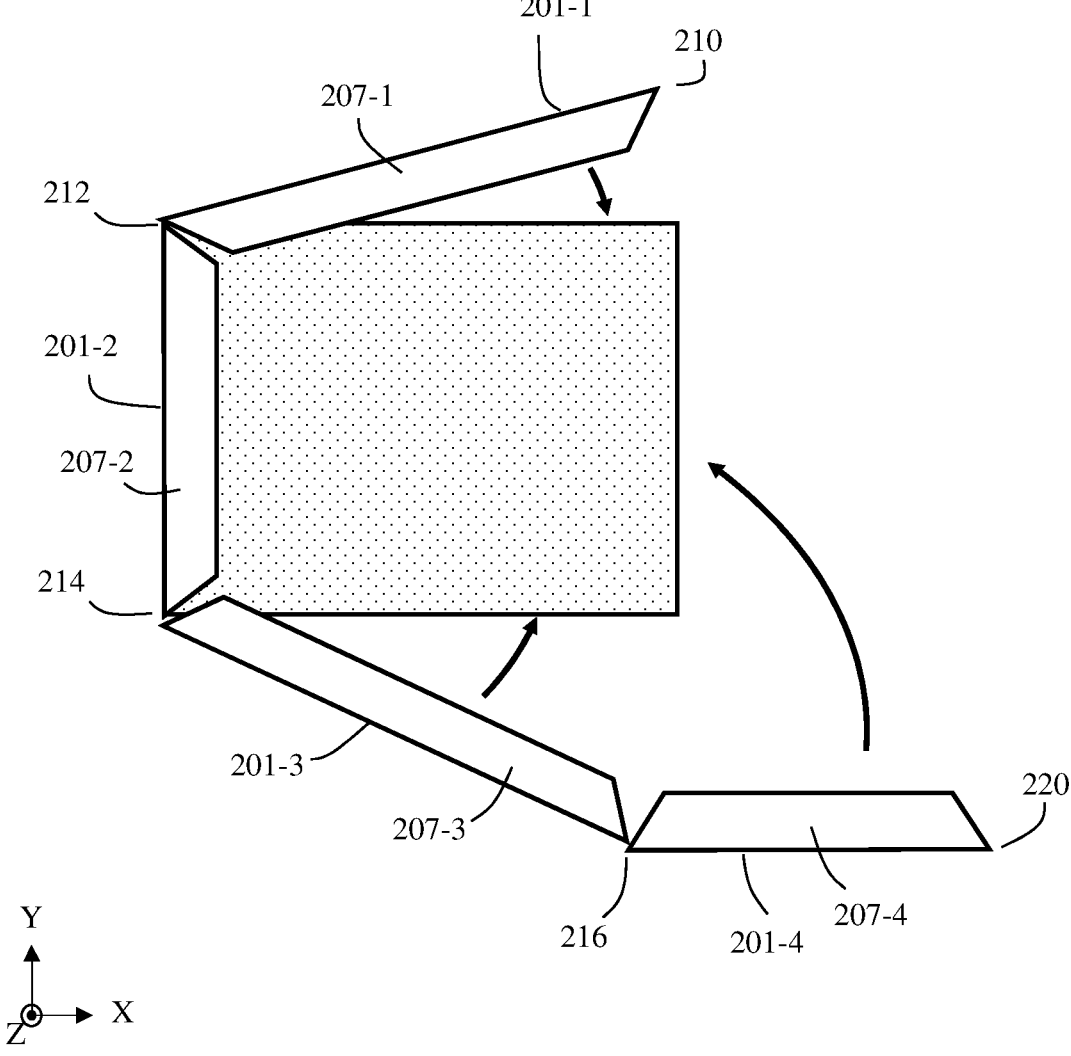
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where the frame precursor structure has received the panel edge 190-2 into frame section 201-2 and bends are being formed along the bend precursor axes as other frame sections move closer to their intended final positions around the panel. Note that assembly does not have to start with panel edge 190-2 but may instead start with any panel edge or corner. Forming the corner joint 118 where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

In some embodiments, the corner bends and/or corner joints may include features capable of forming interlocking structures. For example, a bottom flange or other portion on one side of the corner may include a locking element that may be received into an opening on the other side of the corner.

In some embodiments, the frame precursor structure 201 may be substantially linear (as shown) prior to assembling the framed panel structure. In some embodiments, the frame precursor structure may be received by an assembler already partially bent at one or more corner bend precursor axes. One or more corner bend precursor axes may be pre-scored or include a furrow or features that promote bending along the height access between the frame sections.

The frame and frame precursor structures described in FIGS. 1A-C and 2A-E are non-limiting examples provided in order to illustrate how some of the frame support structures described below may be implemented in a frame. Alternative designs and structures may be used effectively with such support structures. In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 3:
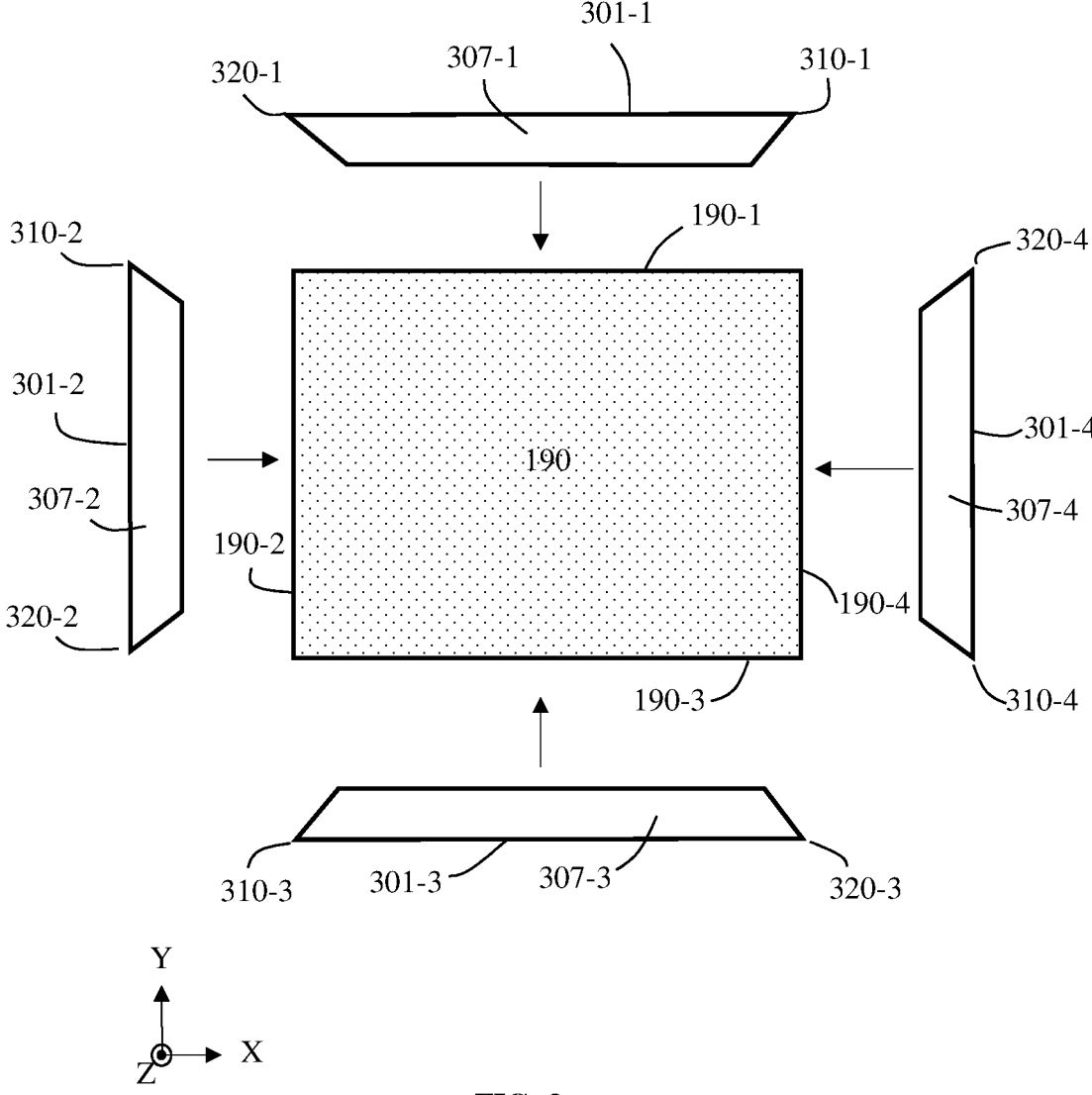
FIG. 3 is a plan view showing a non-limiting example of assembling a frame using four frame precursor structures according to some embodiments.

FIG. 3 is a plan view showing a non-limiting example of assembling a frame using four frame precursor structures according to some embodiments. Each frame precursor structure (each of which may also be referred to herein as a frame section) 301-1, 301-2, 301-3, 301-4 may optionally include any of the features described above, such as a bottom flange, a side wall, and even a panel containment structure that may include a lower shelf, a pocket wall and a top lip. In this view, only the top lip 307-1, 307-2, 307-3, 307-4 of each frame precursor structure is visible. Each frame precursor structure may have a first end 310-1, 310-2, 310-3, 310-4 and a second end 320-1, 320-2, 320-3, 320-4.

When assembled, a first end of one frame precursor structure may form a corner joint with a second end of an adjacent frame precursor structure. As discussed with respect to FIG. 2E, the plan view of FIG. 2E may represent a view from above, or alternatively a view from below, or even a view from the side, depending on the nature of the assembly apparatus.

As indicated by the arrows, a first frame precursor structure may be designed to fit with or attach to a first panel edge 190-1 of panel 190, a second frame precursor structure 301-2 may be designed to fit with or attach to a second panel edge 190-2, a third frame precursor structure 301-3 may be designed to fit with third panel edge 190-3, and even a fourth frame precursor structure 301-4 may be designed to fit with fourth panel edge 190-4. There are numerous variations regarding the sequence used to assemble the frame. In some embodiments, all four frame precursor structures are concurrently brought together with their respective panel edges and attached at approximately the same time. In some cases, attachment is sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint and then attached to the panel. In some cases, a frame precursor structure may initially be brought together with its respective panel edge at an angle rather than flush or parallel. In some cases, the choice of assembly sequence may in part be dependent upon the design of the corner joint to be used.

In some embodiments, a finished frame (whether made from a continuous piece or from multiple frame section pieces) may further include one or more cross bars that may extend from one frame section to an opposite or adjacent frame section. In some embodiments with respect to a rectangular frame, a cross bar may extend between the two longest opposing frame sections. In some cases, a cross bar may connect two opposing frame sections at about their middle areas. Cross bars may act to strengthen the frame. A cross bar may be connected to the frame at the bottom flange, a frame sidewall, or at some other frame feature including, but not limited to, support walls (discussed below). In some embodiments, a cross bar structure may include an upper surface upon which the panel may rest or optionally be adhered to. In some cases, cross bars may be readily attached as part of the panel mounting process (e.g., as discussed in FIGS. 2E, 3). That is, an additional separate step may not be needed in some cases. In some embodiments, the cross bars may be formed of the framework material used for the rest of the frame. In some embodiments, the cross bars may use a different material.

Figure 18A:
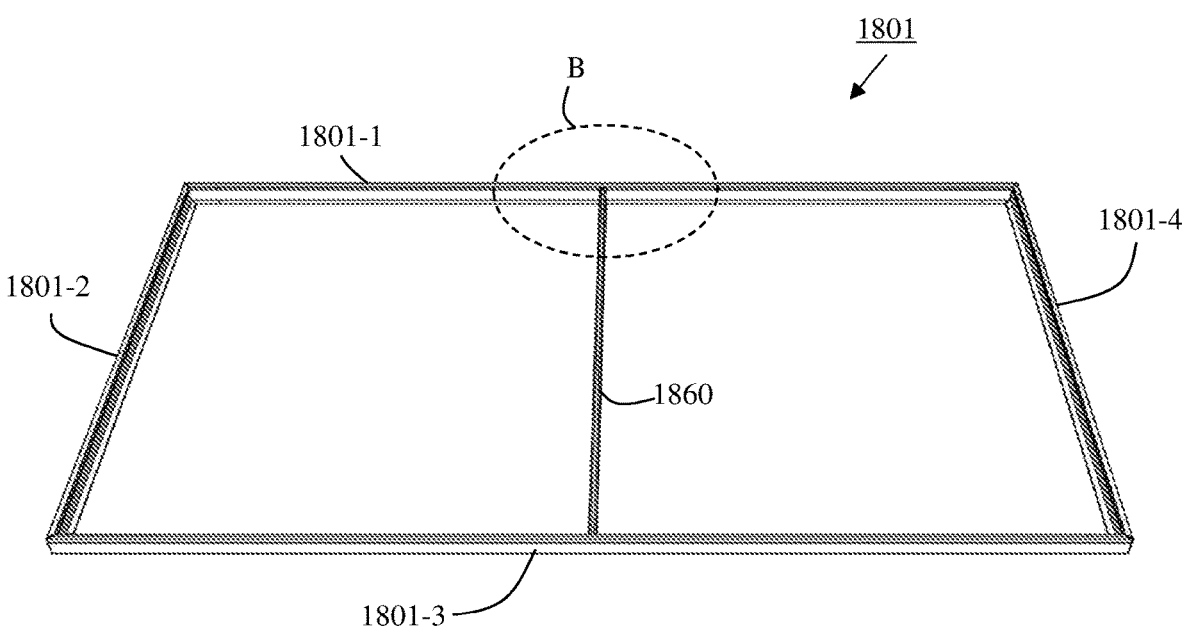
FIG. 18A is a perspective view of a non-limiting example of a frame that includes a cross bar according to some embodiments.

FIG. 18A is a perspective view of a non-limiting example of a frame that includes a cross bar according to some embodiments. For clarity, the framed panel is not shown. In some cases, frame 1801 may include a first frame section 1801-1, second frame section 1801-2, third frame section 1801-3, and fourth frame section 1801-4. Cross bar 1860 may be connected to opposing frame sections 1801-1 and 1801-3. Connection may, for example, be made using one or more of the connection structures and methods discussed below.

Figure 18B:
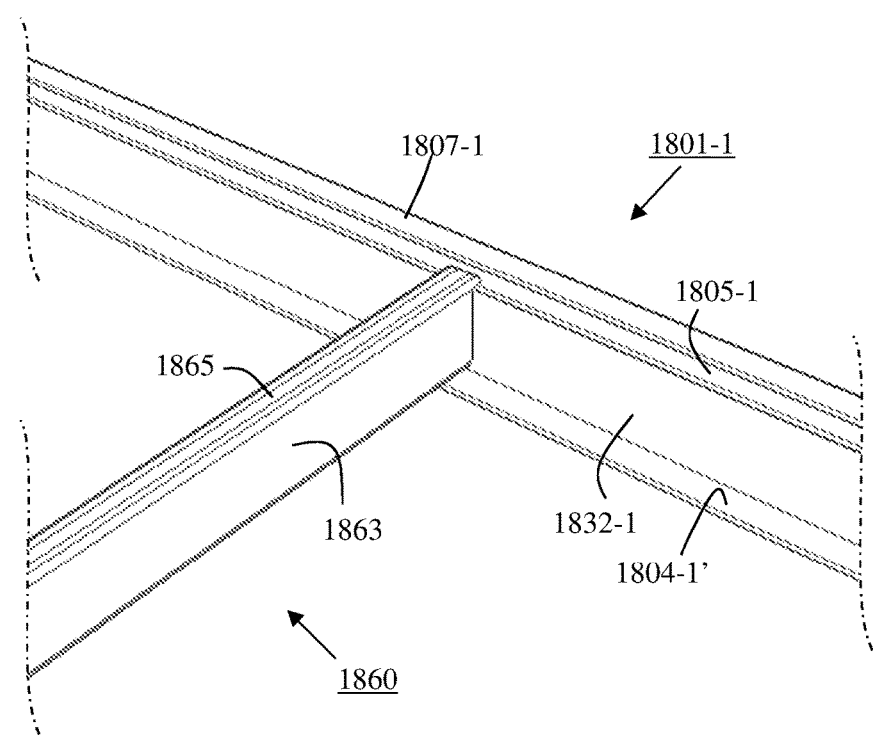
FIG. 18B is a zoomed in view of area B from FIG. 18A.

FIG. 18B is a zoomed in view of area B from FIG. 18A. In some cases, first frame section 1801-1 may optionally have a structure similar to that shown in FIG. 5A or 5F discussed below. Frame section 1801-1 may, for example, include a bottom flange (including doubled bottom flange portion 1804-1'), a support wall 1832-1, lower shelf 1805-1, top lip 1807-1, and frame sidewall (not visible in this view). In some embodiments cross bar 1860 may include a cross bar top surface 1865 and cross bar sidewall 1863. Cross bar 1860 may optionally have a box type of structure including another sidewall (not visible in this figure) opposite cross bar sidewall 1863 and a bottom flange or bottom surface (not visible in this figure) opposite cross bar top surface 1865. In some cases, the cross bar top surface 1865 may contact the panel and may optionally include an adhesive layer to help secure the panel. In some embodiments, the cross bar top surface 1865 may be flush (at the same height) with lower shelf 1805-1 of the first frame section. In some embodiments, cross bar 1865 may be connected to the first frame section at the frame sidewall, bottom flange, support wall, or any combination. In some cases, the connection may include use of connector tabs with hole features, including but not limited to, those using bent tabs, spring tabs, press fit tabs, and tab precursor structures as discussed below.

The framework material should have sufficient strength to support the panel. In some embodiments, the framework material may include a metal such as uncoated steel, coated steel, stainless steel, aluminum, or another metal or metal alloy (coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, and magnesium. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.3 to about 0.4, alternatively about 0.4 to about 0.5, 0.5 to about 0.6mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof. When a coated steel framework material may be used to make a frame for a conventional photovoltaic solar panel, in some embodiments, the thickness may be in a range of about 0.3 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that will retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames are attached directly to a steel structure, most electrical codes allow for this connection to be considered a competent electrical ground or electrical bond. This means that the framed panel structures may connect directly to a steel substructure, and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

In some cases, the frame precursor structure may be fabricated from an elongated sheet of the framework material that is bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 4:
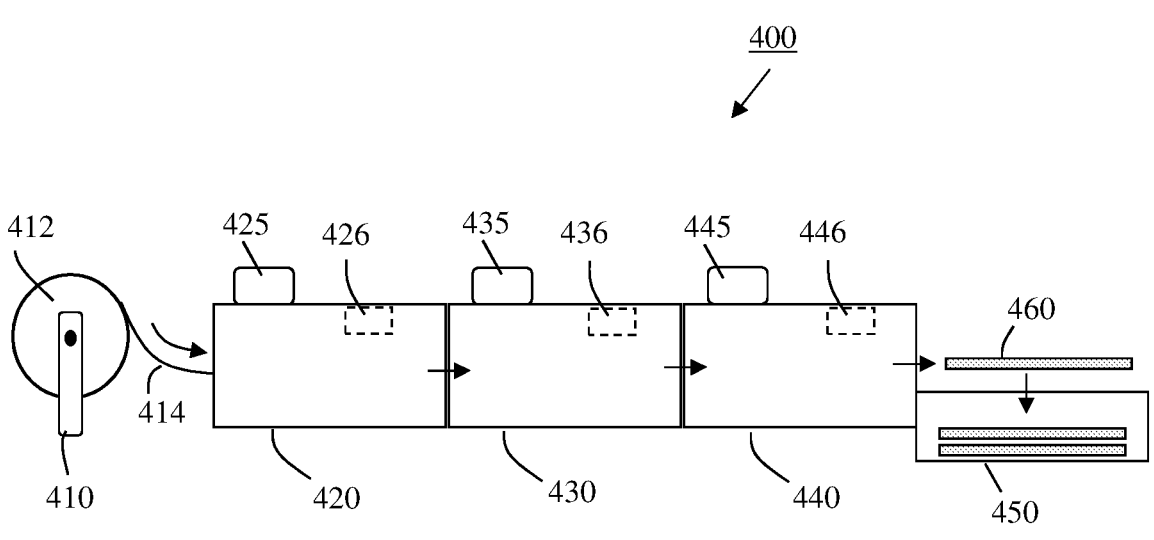
FIG. 4 is a schematic diagram of a non-limiting example of a manufacturing process line for making frame precursor structures according to some embodiments.

FIG. 4 is block diagram showing a non-limiting example of a manufacturing process line for making frame precursor structures according to some embodiments. Manufacturing process line 400 may include a framework material station 410 having framework material that may be fed into the next station. In some embodiments, the framework material may be in the form of sheets that are pre-cut to the final desired length. In some embodiments, the framework material may be fed continuously to the next station. For example, framework material station 410 may include a coil 412 of coated steel 414. The coated steel 414 may be supplied to punching station 420. For example, the punching station 420 may pull the coated steel 414 from the coil. In some embodiments, certain cutting and/or punching processes may be performed at punching station 420 to cut and/or remove predetermined sections of the framework material to make a patterned framework material. In some embodiments, the framework material may be cut to a desired length at the punching station, if such cut has not yet been performed. In some embodiments, the process may be controlled to high tolerances. Punching station 420 may include a microprocessor 425 and machine software and/or firmware that may control the cutting. Punching station 420 may include one or more sensors 426 that provide data to the microprocessor which may be used to monitor the punching processes or identify defects. The microprocessor 425 may be in electronic communication with another microprocessor or with an external computer for sending or receiving data or instructions. Such electronic communication may be through cables or wireless methods.

After the punching station 420, the patterned framework material, e.g., coated steel, may be received by a roll forming station 430. The steel may be shaped in a linear fashion using multiple rollers that provide a graduated bending process to form the steel into the desired shape (shaped framework material). The design of the rollers, order of the rollers, and tolerances may be highly precise, and may result in a fully (or nearly fully) shaped and punched frame precursor structure. Roll forming station 430 may include a microprocessor 435 and machine software and/or firmware that may control the roll forming. Roll forming station 430 may include one or more sensors 436 that provide data to the microprocessor which may be used to monitor the bending and folding processes or identify defects. The microprocessor 435 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed.

After the roll forming station 430, the shaped framework material, e.g., coated steel, may be received by a post forming station 440. Some non-limiting examples of post forming processes may include cutting the frame precursor structures to length, buffing/deburring, cleaning, or passing the frame precursor structures through straightening rollers or dies that may ensure product accuracy. Post forming station 440 may include a microprocessor 445 and machine software and/or firmware that may control one or more post forming processes. Post forming station 440 may include one or more sensors 446 that provide data to the microprocessor which may be used to monitor the post forming processes or identify defects or out-of-tolerance parts. These data may be fed back to roll forming station 430 for active adjustment of roll forming rollers or adjustment rollers. Post forming station 440 may include a cleaning section. The microprocessor 445 may be in electronic communication with another microprocessor or with an external computer for sending or receiving data or instructions. Such electronic communication may be through cables or wireless methods.

After the post forming station 440, finished (or nearly finished) frame precursor structures 460 are received by a finished product station 450. The frame precursor structures may be loaded into transportation containers and prepared for delivery, e.g., to a solar panel module production facility.

In some embodiments, the framework material may proceed in a generally linear (forward) direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors (including, but not limited, to laser position sensors), vision systems (including, but not limited to vision measurement and shape vision systems), contact sensors (including, but not limited to contact position sensors), vibration sensors, thermal sensors, conductivity sensors, roughness sensors, profilometers, ultrasonic sensors, stress sensors, and the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, to a building (e.g., a roof, a wall, an awning or the like), to the ground, to a shade structure or carport, or to a moving or stationary vehicle. In some embodiments, a frame or framed panel structure may be attached directly to its intended target without an intermediate support structure. In such case, the target itself may act as the support structure.

To provide robust support and strength to the framed panel such as a solar panel, it may be useful for the frame to include one or more connection features, for example, when forming a corner joint between frame precursor structures or sections. For the purposes of describing various connection features and technology below, the terms "frame precursor structure" and "frame sections" may be used interchangeably unless otherwise noted. In some cases, the frame may also include additional strengthening features such as cross bars that may extend from one frame section to an opposite or adjacent frame section. These additional strengthening features may also benefit from the use of one or more connection features. Similarly, in some embodiments, certain connection features may be used to attach a framed panel structure to a support structure such as racking.

Conventional connection technologies such as welding, rivets, screws, and the like, may be slow, difficult to carry out, costly, or require numerous extra steps. More manufacturing friendly connection technologies are therefore desirable.

Figure 5A:
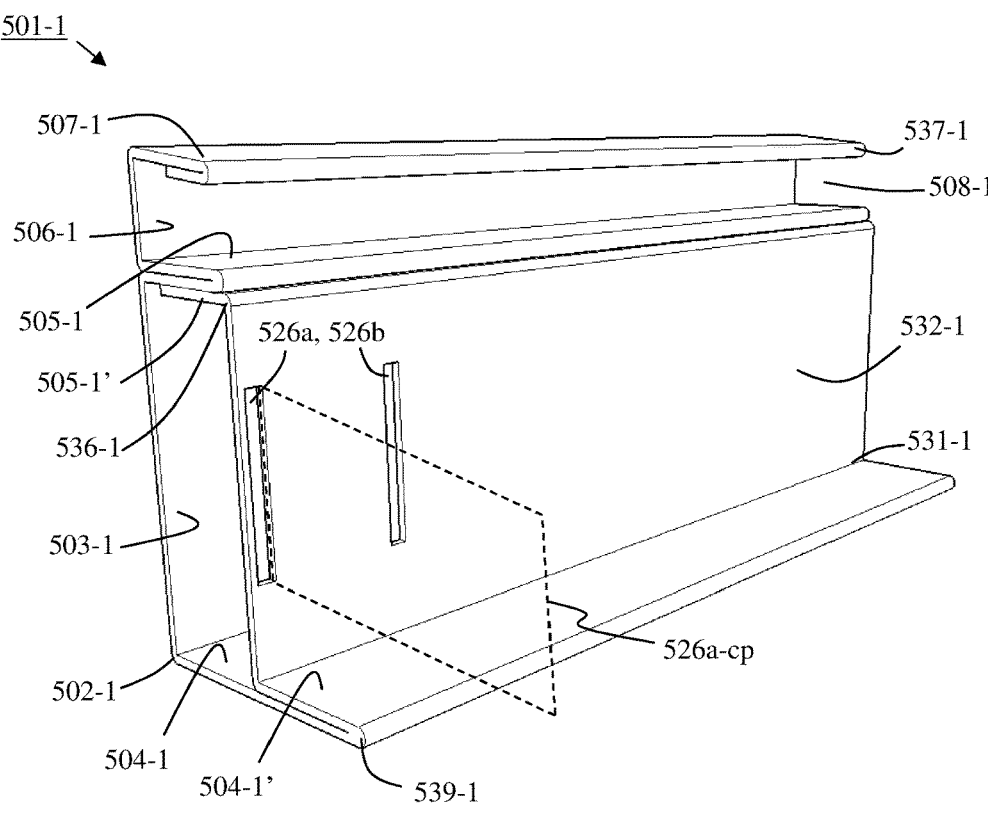
FIGS. 5A-5G are perspective views illustrating the connection of two frame sections using a tab connection assembly according to various embodiments.

FIGS. 5A-5G are perspective views illustrating the connection of two frame sections using a tab connection assembly according to various embodiments. Referring to FIG. 5A, first frame section 501-1 may include a framework material that has been cut and folded into a desired shape. First frame section 501-1 may include a lengthwise fold 502-1 that may define an intersection of a frame sidewall 503-1 with a bottom flange 504-1. The first frame section may further include a series of folds that may form a panel containment structure that may include a lower shelf 505-1, a pocket wall 506-1, a top lip 507-1, and perhaps even a pocket region 508-1. The first frame section may include a reversing flange fold 539-1 such that a portion 504-1' of the bottom flange may include a double layer of framework material, sometimes referred to herein as a "doubled bottom flange portion" or "doubled portion" or just "bottom flange" since both 504-1' and 504-1 are considered part of the overall bottom flange structure. Another lengthwise fold 531-1 may define an intersection of a support wall 532-1 with the bottom flange, specifically, doubled bottom flange portion 504-1'. Support wall 532-1 may extend from the bottom flange to lower shelf 505-1 (part of the panel containment structure). Another lengthwise fold 536-1 may define the intersection of the support wall with a secondary lower shelf 505-1' folded under or over a portion of lower shelf 505-1, both of which may be considered part of the panel containment structure. In some embodiments, the top lip 507-1 may include a top lip fold 537-1 to form a rounded top lip edge. Frames having a support wall extending between the lower shelf and bottom flange may in some cases be referred to herein as "box frames". First frame section 501-1 may be considered a type of box frame. There are many alternative ways to construct a box frame and FIG. 5A is just one representative, non-limiting example. Support wall 532-1 may include first and second hole features, 526a and 526b, respectively. In FIG. 5A, the hole features are provided on the support wall and may be in the form of slots. Each slot may define a connection plane that may be approximately orthogonal to the surface of the support wall. Connection plane 526a-cp is shown in FIG. 5A to illustrate this with respect to hole feature 526a. The panel (not shown for clarity) may be received into a portion of the pocket region and secured in place, optionally with a sealant that may have adhesive properties.

Figure 5B:
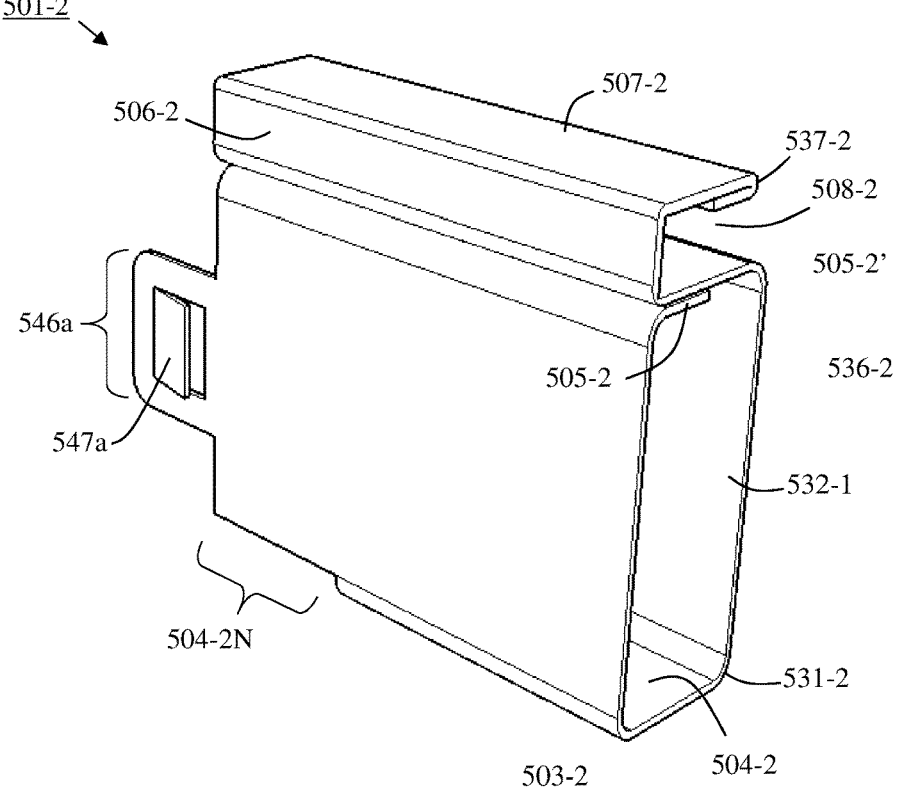

Referring to FIG. 5B, second frame section 501-2 may include a framework material that has been cut and folded into a desired shape. Second frame section 501-2 may include a lengthwise fold 502-2 that may define an intersection of a frame sidewall 503-2 with a bottom flange 504-2. The first frame section may further include a series of folds that may form a panel containment structure that may include a lower shelf 505-2, a pocket wall 506-2, a top lip 507-2, and perhaps even a pocket region 508-2. Lengthwise fold 531-2 may define an intersection of a support wall 532-2 with the bottom flange 504-2. Support wall 532-2 may extend from the bottom flange to lower shelf 505-2 (part of the panel containment structure). Another lengthwise fold 536-1 may define the intersection of the support wall with a secondary lower shelf 505-2' (also considered part of the panel containment structure) folded over a portion of lower shelf 505-2. In some embodiments, the top lip 507-1 may include a top lip fold 537-1 to form a rounded top lip edge. Second frame section 501-2 may be considered a type of box frame.

Second frame section 501-2 may include a first tab feature 546a provided as an extension of frame sidewall 503-2. Not visible in this view, the second frame section 501-2 may include a second tab feature 546b provided as an extension of support wall 532-2. In assembly as shown later, the first and second tab features are designed to align with the first and second hole features (slots) of the first frame section, in particular, along the connection plane. The first tab feature may include a first spring tab element 547a that is angled out of the plane of the first tab. In some cases, the spring tab element may be formed by cutting and bending a flap in the tab. Similarly (not shown here), the second tab feature may include a second spring tab element 547b. In some embodiments, the second frame section 501-2 may include a notch or cutout 504-2N in the bottom flange 504-2 near the tab features.

Figure 5C:
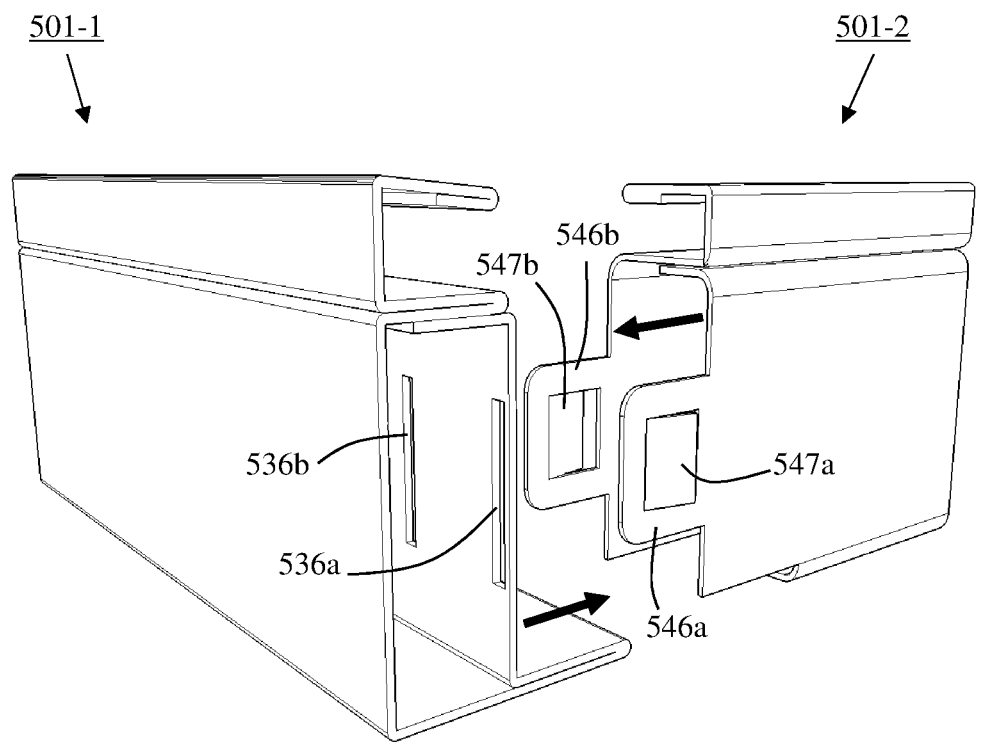
Figure 5D:
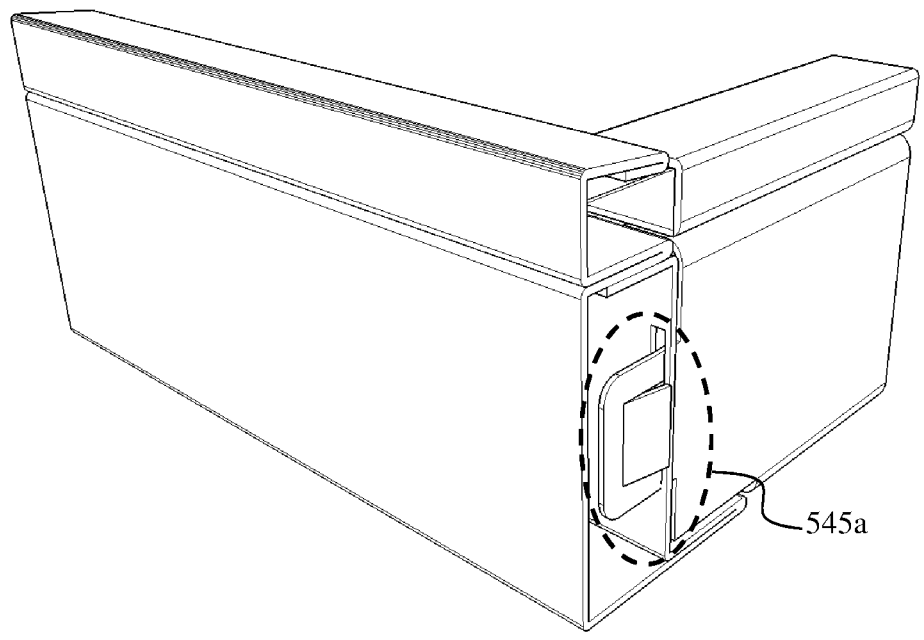

In FIG. 5C, the first frame section 501-1 and second frame section 501-2 are aligned and moved toward each other in a relative manner in a connection direction (see arrows) so that the first and second tab features, 546a and 546b, are pressed through the first and second hole features (slots), 536a and 536b, respectively. As the tab feature moves through the respective slot, the spring tab element is pushed back into alignment with the tab feature until such point that it passes completely through the slot whereupon it may spring back into its out-of-plane orientation such that the end of the spring tab element engages the support wall on the opposite surface, thereby locking it in place as shown in FIG. 5D. The hole feature and the tab feature, lockingly received by the hole feature, collectively form a tab connection assembly 545a and 545b (the latter is not visible in the figure). It will be appreciated that the term "lockingly" in this application may also referring to other means, methods and structures that perform locking and/or other attachments. FIG. 5D is an embodiment of a corner joint between first frame section 501-1 and second frame section 501-2. In some embodiments (not shown), second frame section includes at least a frame sidewall and a first tab feature, but may not necessarily include a bottom flange, a support wall, or panel containment structure.

In some embodiments, assembly of a frame as shown in FIGS. 5A-5D may start by attaching the second frame section 501-2 to the panel edge (not shown) and then moving the sections together as shown in FIGS. 5C and 5D to form the corner joint and concurrently attaching the first frame section 501-1 to the panel. This is not a limitation, but in some cases, assembly may be easier if a panel edge directionally parallel to the connection direction is first bonded to the appropriate frame section prior to completing the tab connection assembly and making the corner joint. In some embodiments, a slot and corresponding tab feature may not be straight but have a curved or angled shape.

Figure 5E:
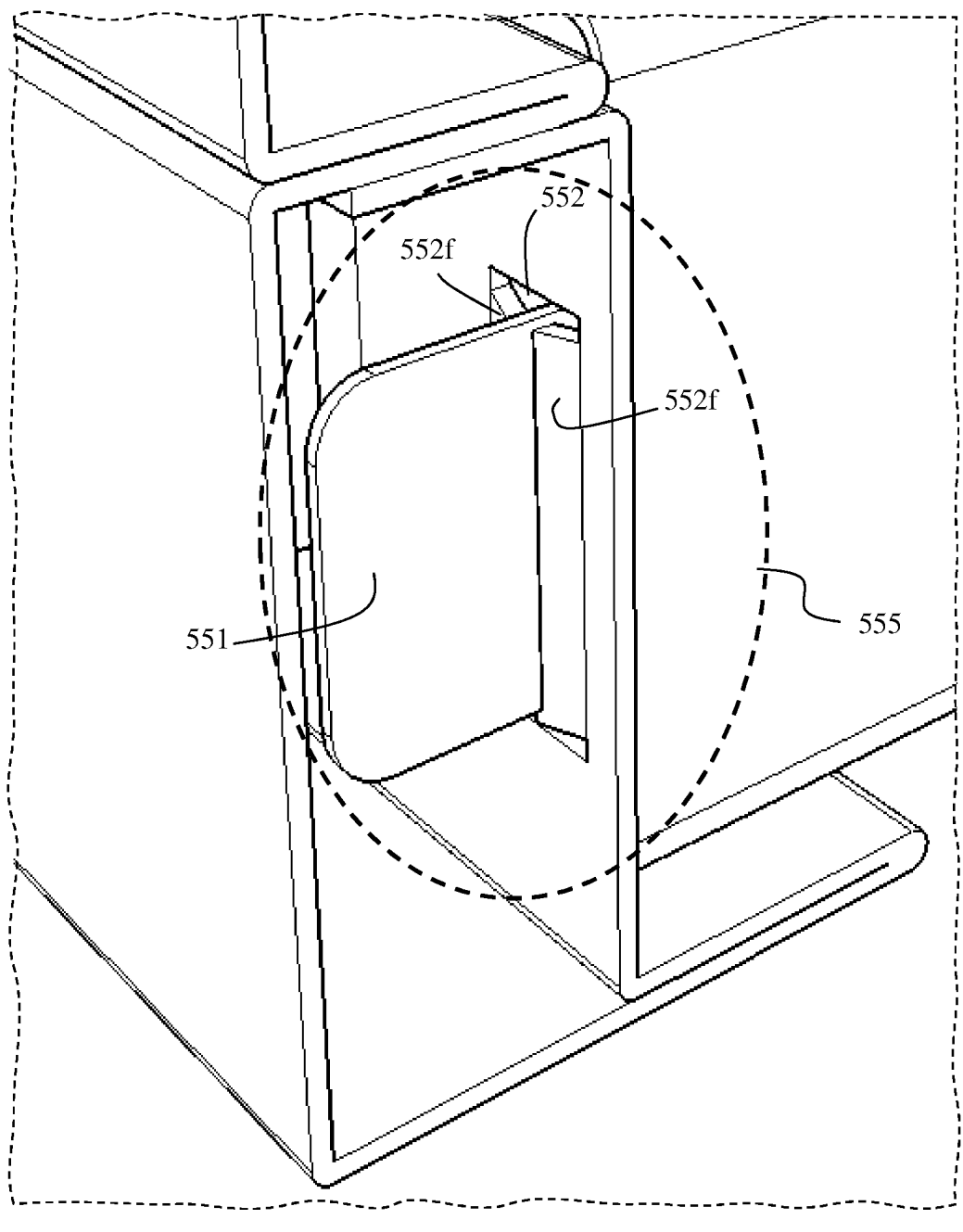

FIG. 5E is a perspective view illustrating another tab connection assembly according to some embodiments. The first and second frame sections may optionally be as described with respect to FIGS. 5A and 5B except that the tab feature 551 may be characterized as a press fit element and the hole feature 552 may include one or more flaps 552*f*. For clarity, other frame section features are not labelled, but the various parts are self-evident with reference to FIGS. 5A and 5B. When tab feature 551 is pushed through the hole feature 552, the flap elements engage the tab feature to help lock it in place thereby forming tab connection assembly 555. In some embodiments, the tab feature 551 may include one or more grooves or a roughened surface to aid in the engagement by the flap elements.

As another embodiment (not shown), a tab feature may be bent, e.g., using a tool, after extending at least partly through the hole feature thereby locking the tab in place and forming a tab connector assembly.

There are numerous variations available for implementing tab connection assemblies to attach an element to the frame. For example, there may be just one tab connection assembly rather than two at the corner joint (or other connection point), or alternatively more than two. Also, the hole features may instead be on the sidewall or some other portion of the frame section. In some cases, an advantage of hole features in the support wall is that the tabs remain hidden and will not interfere with assembling multiple panels. In some cases, one or both tab features and corresponding hole features may be switched to the other frame section (along with the appropriate minor design changes to each frame section). In some cases, one or both of the frame sections may not form a box frame or may not include a pocket wall or top lip. Rather than vertical slots and tabs, one or more could be horizontal or at an angle. In some embodiments, the pocket wall of the second frame section may have an extension to cover the exposed corner of the panel. In some embodiments, a tab may be in the form of a post or slab. Alternatively, a tab may have a shape, e.g., a V-shape, a curved shape, or some other shape, and the hole feature may have a complementary shape.

Figure 5F:
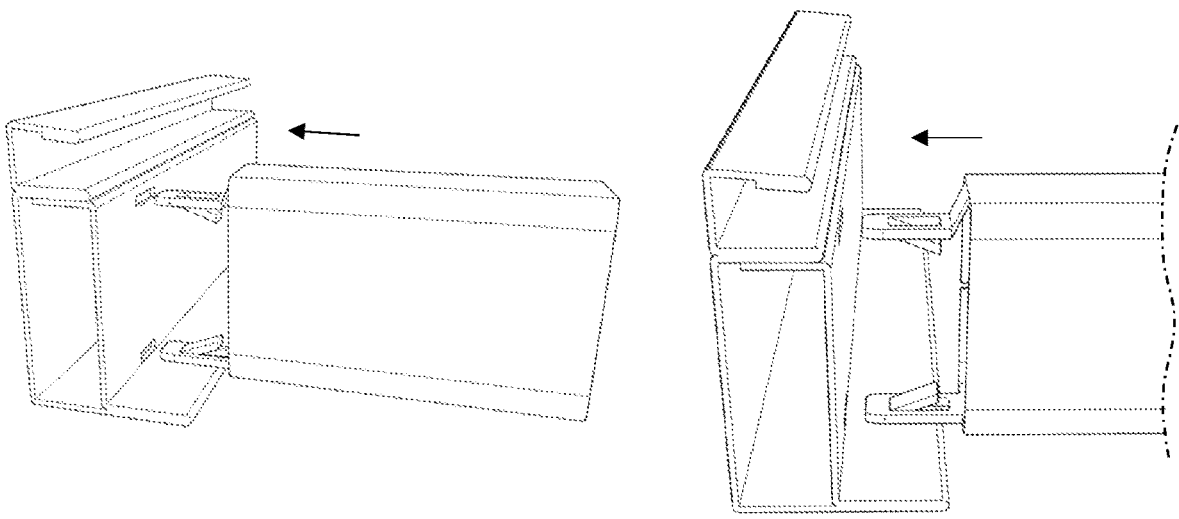
Figure 5G:
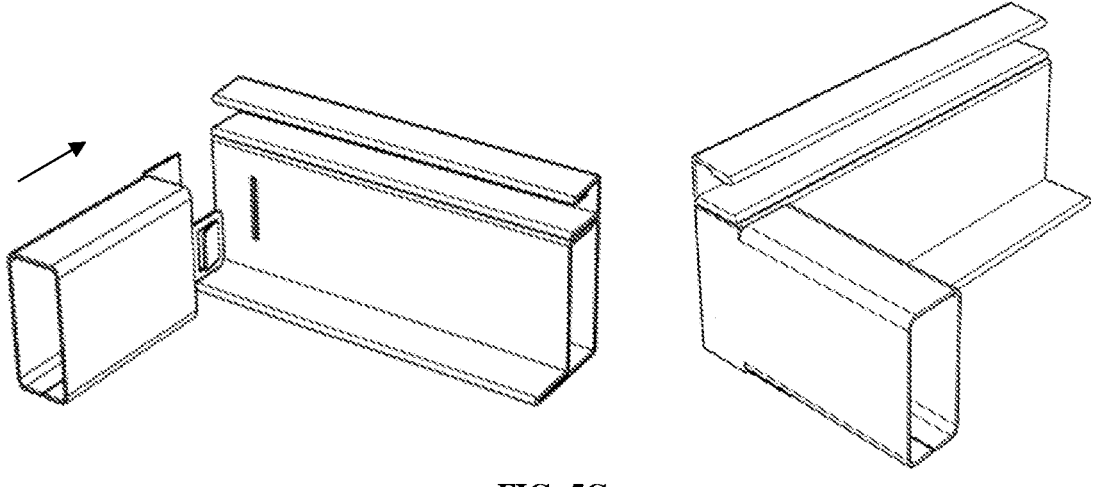

FIGS. 5F and 5G illustrate a couple of these variations. For clarity, the figures are generally not labelled, but their properties and features are self-evident. In FIG. 5F, there are two views showing frame sections having horizontal hole features (slots) and tab features (spring tab elements). Relative to vertical slots and tabs, horizontal tabs/slots may provide improved strength in certain dimensions or directions whereas vertical slots and tabs may provide improved strength in other dimensions or directions. In some cases, both horizontal and vertical (or angled) tabs and slots may be used. In FIG. 5G, there are two views showing formation of a corner joint using a tab connection assembly (spring tab with slot). In this embodiment, the frame section with the tab includes an end closure to cover the open end of the box frame of the other frame section, e.g., to reduce incursion of soil, insects, animals or the like. Although shown using a spring tab approach, one may instead use a press fit, or a bent tab method. In general, a combination of any or all of these approaches may be used in connecting a component to a frame. Further, with minor modifications as a skilled person would understand, tab connection assemblies may be employed at corner bends to help lock the two adjacent frame sections together in position.

Referring again to FIG. 5F, rather than acting as a frame section, the structure having the spring tabs may instead be a portion of a cross bar structure. The slots in the receiving frame section may in some cases be located near the middle of the frame section length. In some embodiments, spring tabs may be used to secure a frame section to racking. For example, the spring tab(s) may be part of the racking and the hole feature(s) may be part of the frame. Alternatively, the spring tab(s) may be part of the frame and the hole feature(s) may be part of the racking.

Figure 6A:
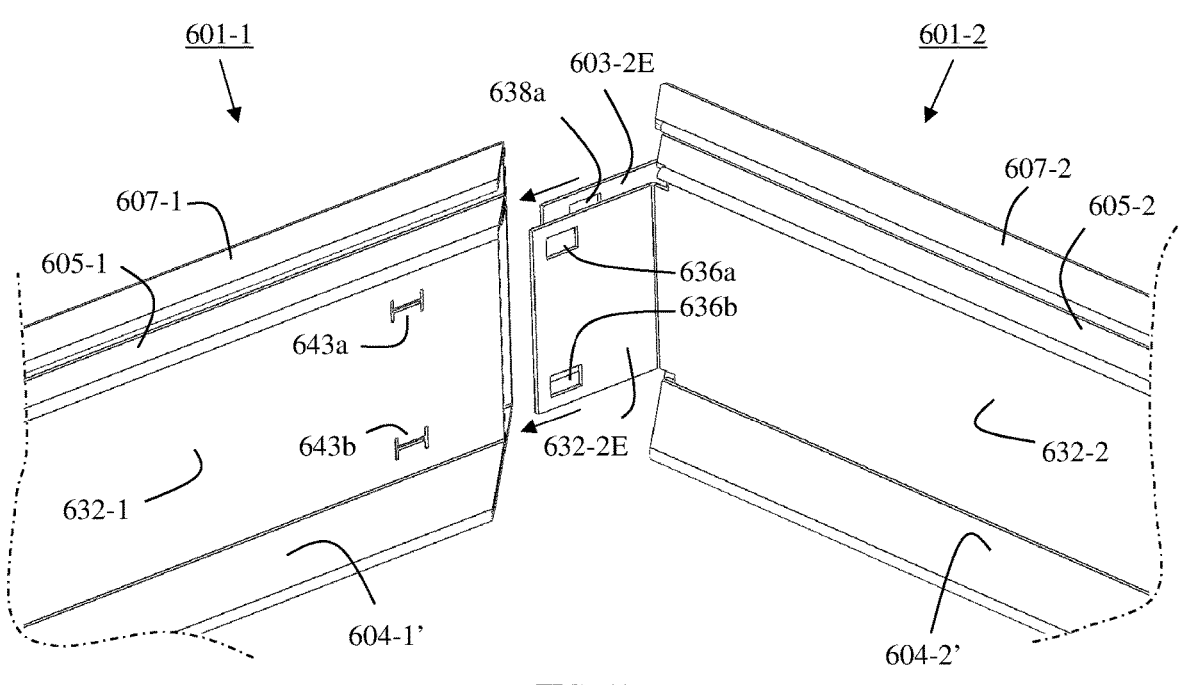
FIGS. 6A-6D are various perspective views illustrating the connection of two frame sections using tab connection assemblies according to some embodiments.
Figure 6B:
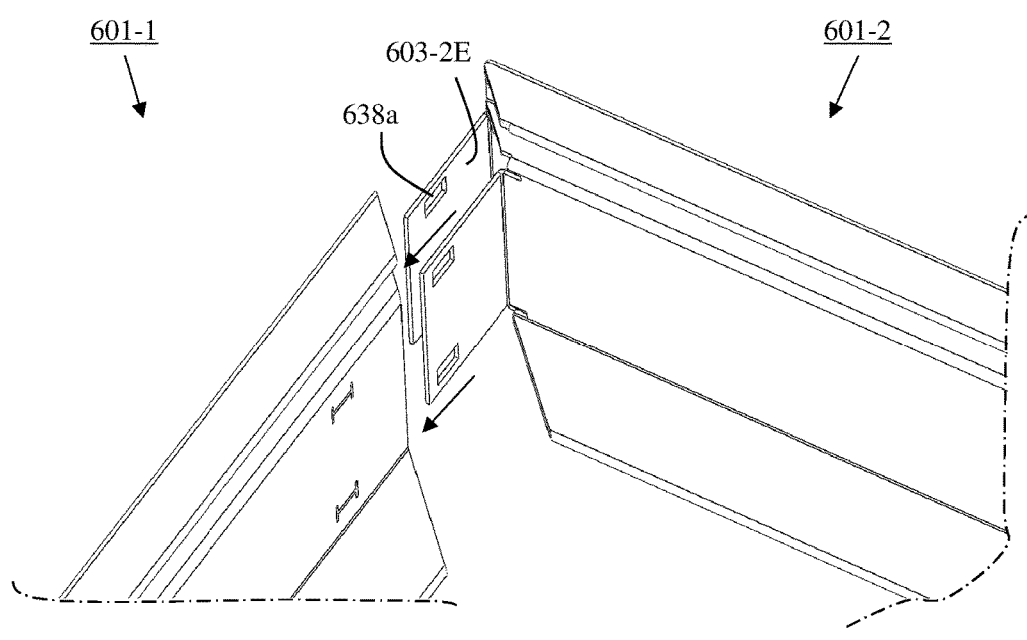
Figure 6C:
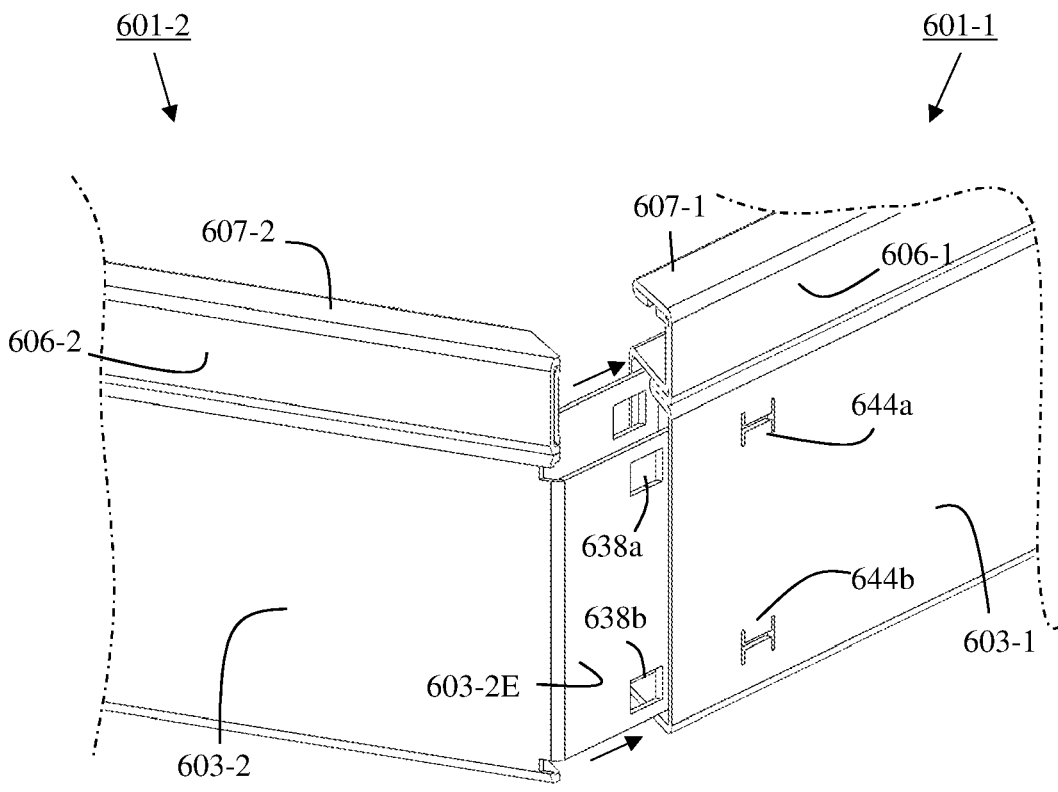
Figure 6D:
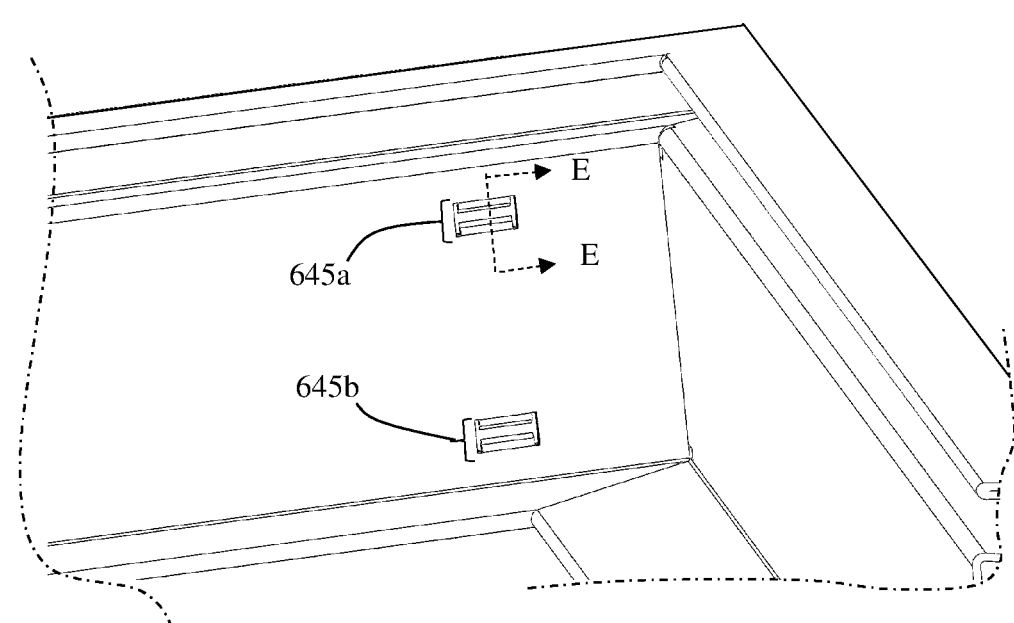

FIGS. 6A-6D are a various perspective views, and FIGS. 6E-6G are cross-sectional views, illustrating the connection of two frame sections using tab connection assemblies according to some embodiments. Although not limiting, this tab connection assembly may be particularly useful for connecting parts having parallel surfaces. FIGS. 6A and 6B are similar perspective views of the two frame sections prior to connection. FIG. 6C is a perspective view from the back corner prior to connection. FIG. 6D illustrates the frame sections after connection. First frame section 601-1 and second frame section 601-2 may optionally have a box frame structure similar to the frame sections of FIGS. 5A and 5B. For visual reference, various frame features are labelled in FIGS. 6A-6D, although not all features are visible or necessarily labelled in each view. The frame sections each may include frame sidewall 603-1, 603-2, a bottom flange (not labelled), a doubled bottom flange portion 604-1', 604-2', lower shelf 605-1, 605-2, pocket wall 606-1, 606-2, top lip 607-1, 607-2, and support wall 632-1, 632-2.

The first frame section 601-1 may include one or more tab precursor structures, for example, two tab precursor structures 643*a* and 643*b*, that may be provided as cuts into support wall 632-1, and two tab precursor structure 644*a* and 644*b*, that may be provided as cuts into the frame sidewall 603-1. The cuts may form upper and lower bendable flaps. The second frame section 601-2 may include a support wall extension 632-2E and sidewall extension 603-2E that are bent at an angle so that the planes of each extension may be approximately parallel to the planes of the support wall and sidewall of the first frame precursor section 601-1. The support wall extension 632-2E may include one or more hole features, for example, two hole features 636*a* and 636*b*. Similarly, the sidewall extension may include one or more hole features, for example, two 638*a* and 638*b*.

As illustrated by the arrows, relative motion may be provided between the first frame section 601-1 and second frame section 601-2 so that the support wall extension 632-2E and sidewall extension 603-2E may slide into the annular "box" of the first frame section and align with corresponding tab precursor structures, e.g., 643*a*, 643*b*, 644*a*, 644*b*, on first frame section 601-1. As shown in FIG. 6D, the flaps of the tab precursor structures may be pushed inwardly through the hole features to form tab connector assemblies, e.g., 645*a* and 645*b* and a corner joint between the first and second frame sections. Not shown in this view, tab connector assemblies may be similarly formed between hole features 638*a*, 638*b* and tab precursor structures 644*a*, 644*b*. A tab connector assembly is further illustrated in FIG. 6E, which is a cross-sectional view along cutline E-E of FIG. 6D. Pushing the flaps of the tab precursor structures may cause a bend 652 to form at the interface with the hole feature and concurrently form a corresponding tab 647 that extends into or through the hole feature that lock the second frame section in place. In some embodiments, a tool may be used to push and bend the flap structures through the hole feature. In some cases, the tool may have an end feature that may be rotated to further bend or otherwise act on the tabs. The flaps may contact the one or more of the corners or edges of the hole feature.

There are numerous variations of this "tab precursor" approach for forming tab connection assemblies. For example, as shown in FIG. 6F, the bend may be such that the material of the tab precursor structure bends back over the material from of the hole feature to form tab connector assembly 645a'. In FIG. 6G, the bend may be such that the tab precursor structure bends back flush with the material from the hole feature to form tab connector assembly 645a".

Figure 6H:
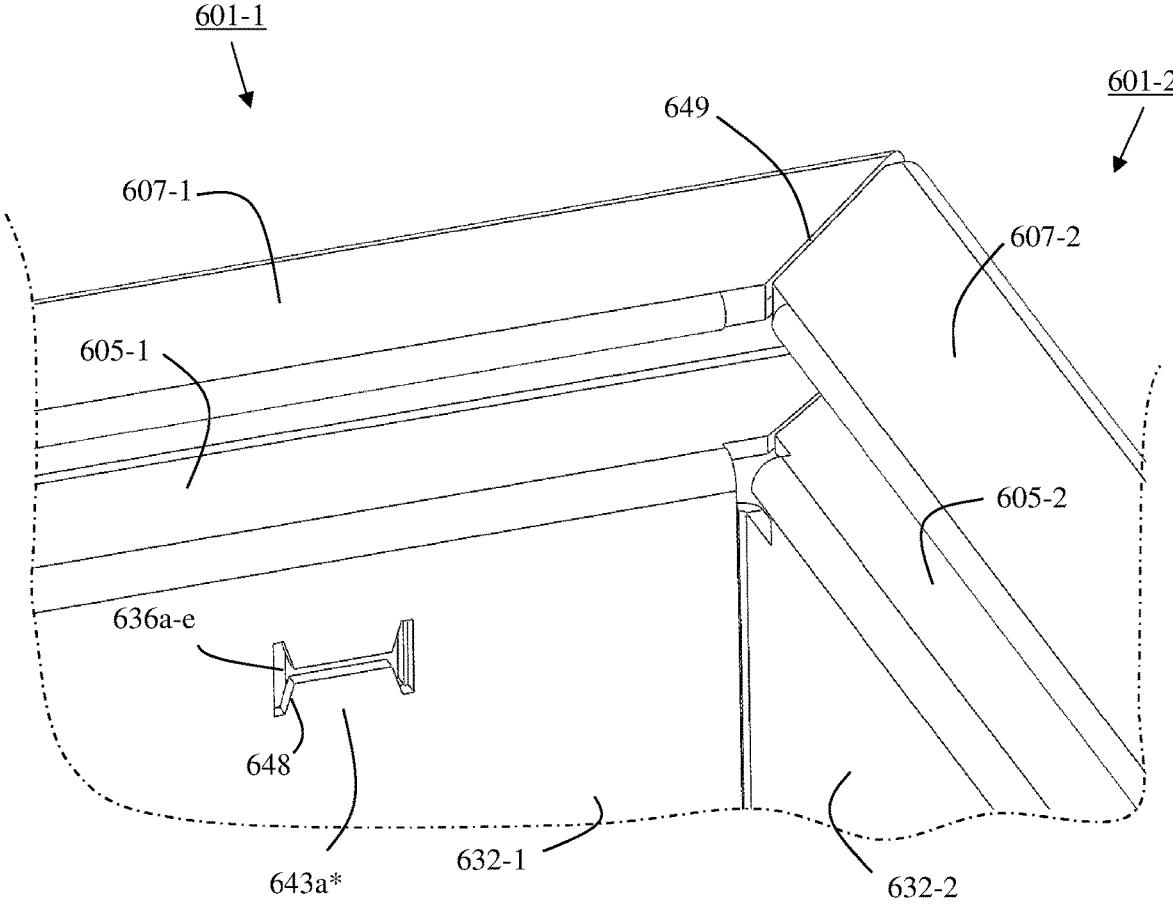
Figure 6I:
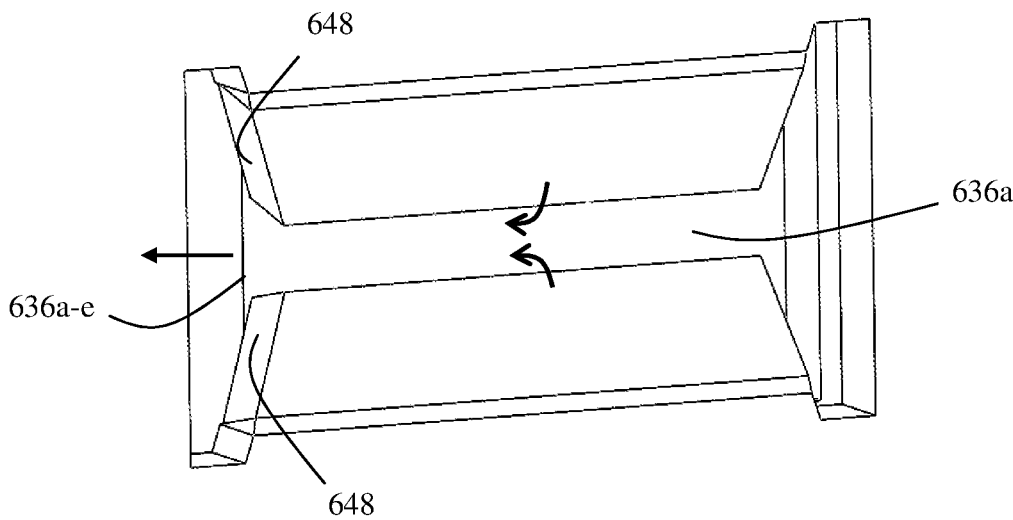
Figure 6J:
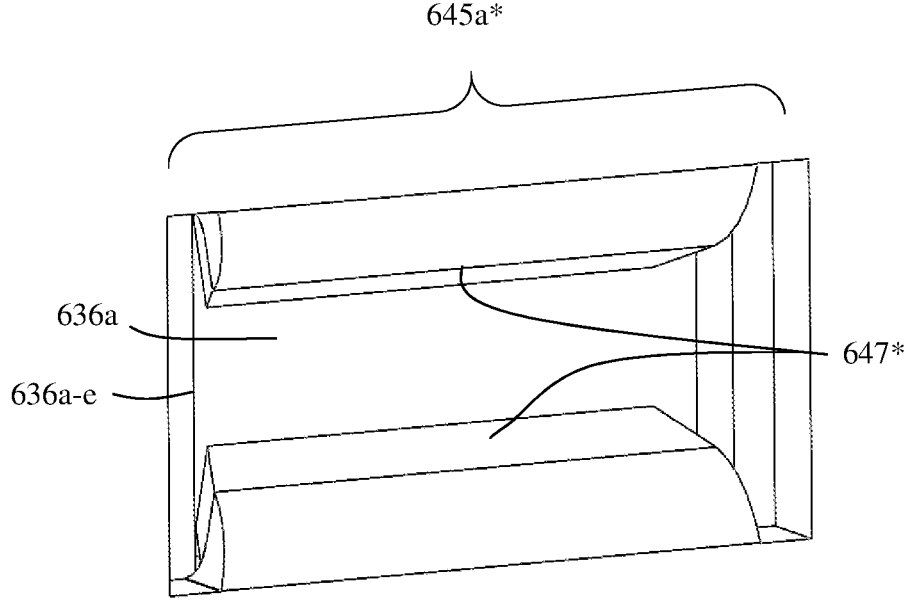
Figure 6K:
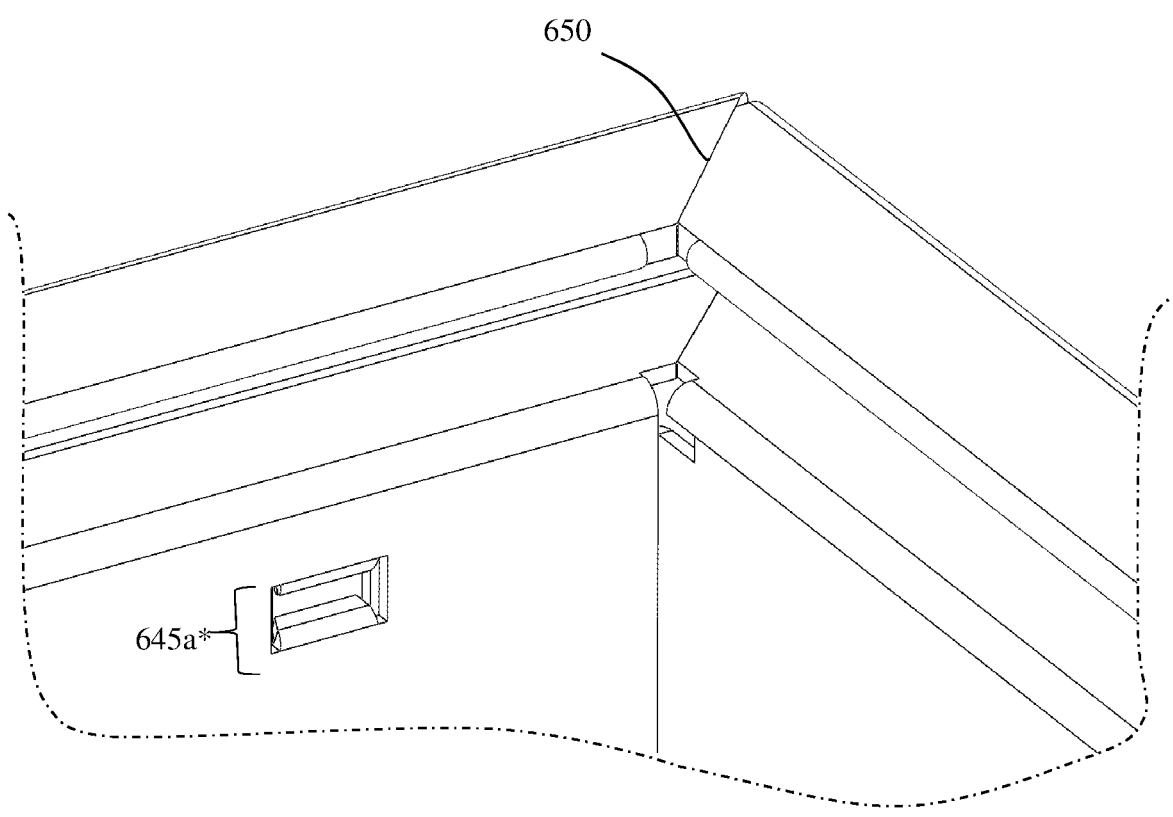

FIGS. 6H-6J are a series of views illustrating a non-limiting example of forming a tab connector assembly where the tab sides are angled according to some embodiments. FIG. 6H shows first and second frame assemblies that may be similar to those described with respect to FIG. 6A with the exception that the bendable flaps of tab precursor structure 643a* may be cut into the support wall to form an angled edge relative to the hole feature edge, rather than having a vertical edge as shown in FIG. 6A. Although not shown, any or all of the other tab precursor structures may include bendable flaps having an angled edge. In FIG. 6H, the structure is shown such that the support wall extension and sidewall extension of the second frame section have been inserted into the annular box of the first frame section, but there is still a small gap 649 between the sections. Also visible in this figure is the edge of hole feature 636a ("636a-e"). As shown in FIGS. 6I-6J, in forming tab connector assembly 645a*, when the flaps of tab precursor structure 643a* are pushed into the hole feature 636a, the angled edges 648 of the flaps (forming tabs 647*) engage the hole feature edge 636a-e thereby forcing the hole feature and support wall extension to the left. This pulls the two frame sections together to form a corner joint having a tighter connection (reduced seam) and reduces or eliminates the gap at interface 650 as illustrated in FIG. 6K. Although the right edges of the flaps/tabs are shown to have an angle, in some embodiments, only the left edges (edge furthest from the frame corner joint) may be angled. In some embodiments, rather than, or in addition to, the flaps/tabs having an angled edge, the hole feature may have an angled edge and achieve a similar result.

Although FIG. 6D is shown with two tab connection assemblies per wall, just one may be used, or more than two. Although shown going into the annular portion of the box frame of the first frame section, one or both extensions of the second frame section may be outside of the box frame features. In some embodiments, only one extension may be used. In some embodiments, the frames are not box frame type. In some embodiments, the hole features and tab precursor structures may be reversed in location so long as the bending tool has appropriate access. For example, one or more hole features may be in the first frame section's support wall (or sidewall) and one or more of the corresponding frame precursor structures are located on the second frame section's support wall extension (or sidewall extension). In some embodiments, rather than two flaps, a tab precursor structure may include just one or more than two flaps. Rather than a horizontal orientation, the bends that form the tabs may be vertical or some other angle. In some cases, the hole features may be a shape other than square or rectangular, e.g., round, oval, triangular or some other shape.

Figure 16A:
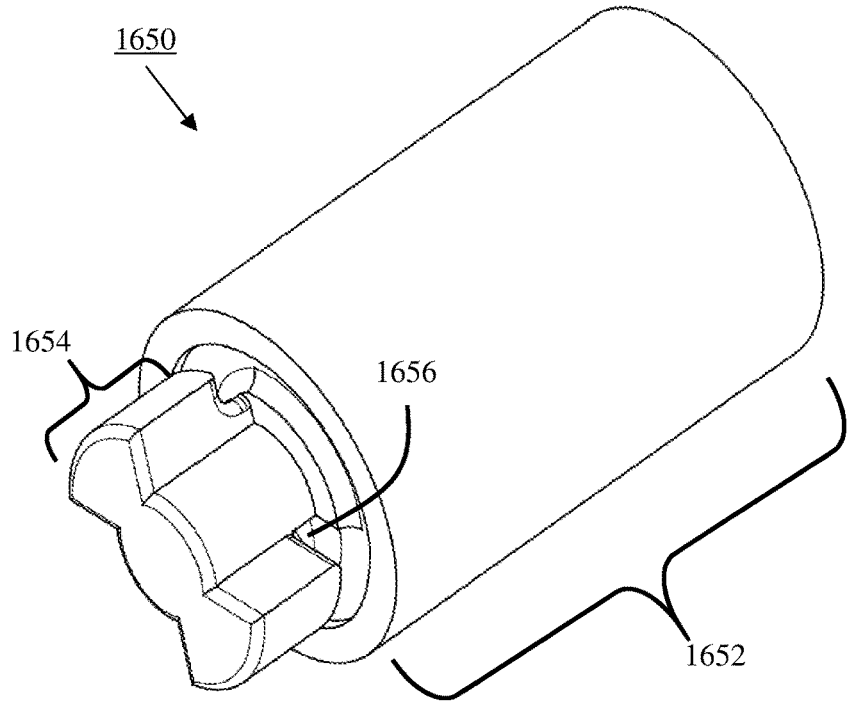
FIG. 16A is a perspective view of a non-limiting example of a tab-forming tool that may be utilized with tab precursor structures to make tab connector assemblies, according to some embodiments.
Figure 16B:
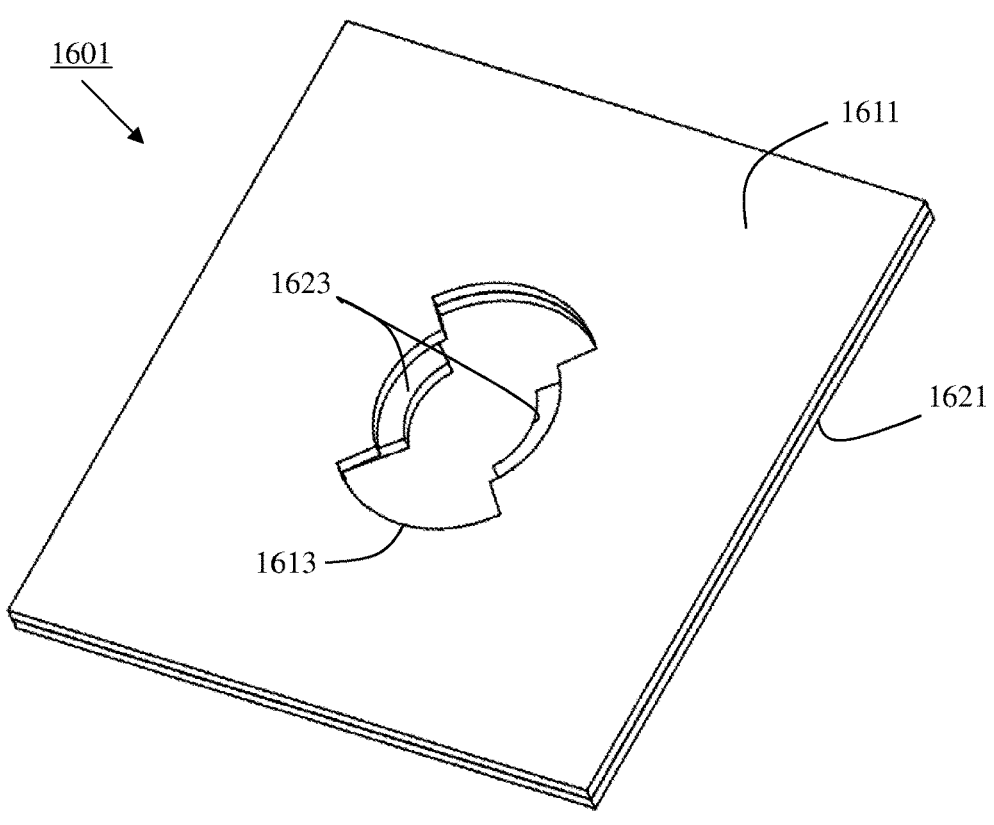
FIG. 16B is a perspective view of a non-limiting example of a connection precursor structure according to some embodiments.

FIG. 16A is a perspective view of a non-limiting example of a tab-forming tool that may be utilized with tab precursor structures to make tab connector assemblies, according to some embodiments. Tab-forming tool 1650 includes a handle portion 1652 and an active tool portion 1654. In some cases, the tab-forming tool may be a unitary piece formed from a single material, or alternatively, may be an assembly of pieces formed from the same or different materials. In some embodiments, at least the active tool portion is formed from or includes a strong material having low pliability such as a metal, including but limited to, stainless steel, titanium or other strong metallic alloys. The metal may also be hardened. The active tool portion may include a groove 1656 at its base. FIG. 16B is a perspective view of a non-limiting example of a connection precursor structure according to some embodiments. Connection precursor structure 1601 may include a first layer of framework material 1611 that may be flush with a second layer of framework material 1621. The first layer of framework material 1611 may include a hole feature 1613. The second layer of framework material 1621 may include a tab precursor structure aligned with, and having a shape similar to, hole feature 1613, but with tab precursors 1623 extending into the opening.

Figure 16C:
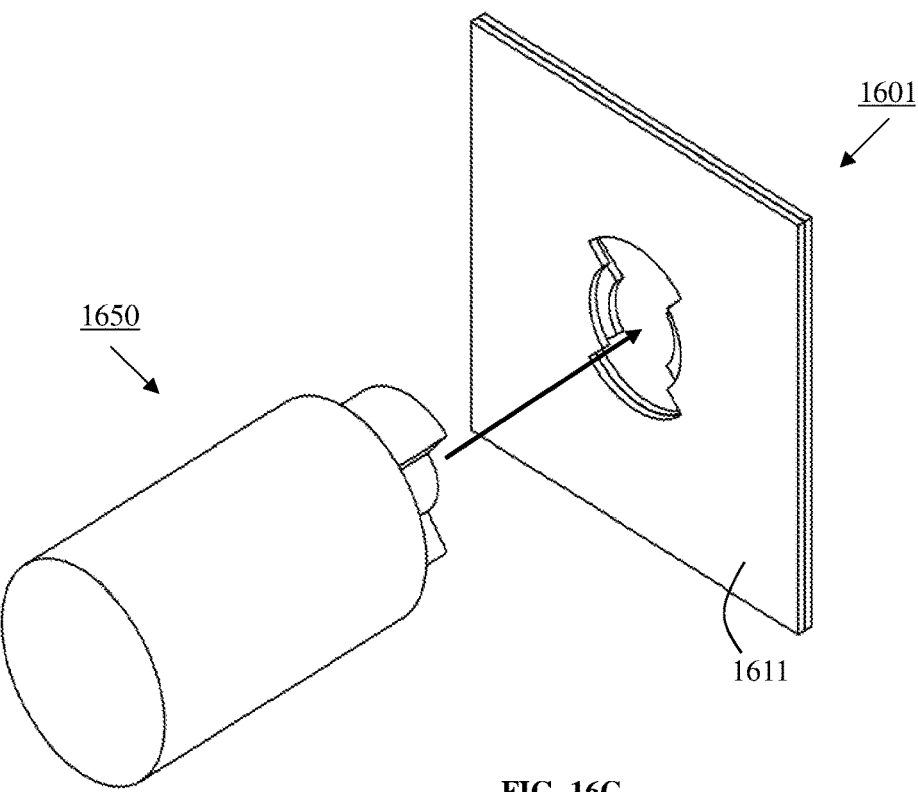
FIGS. 16C-16F are perspective views illustrating a non-limiting example of the operation of the tab-forming tool with the connection precursor structure according to some embodiments.
Figure 16D:
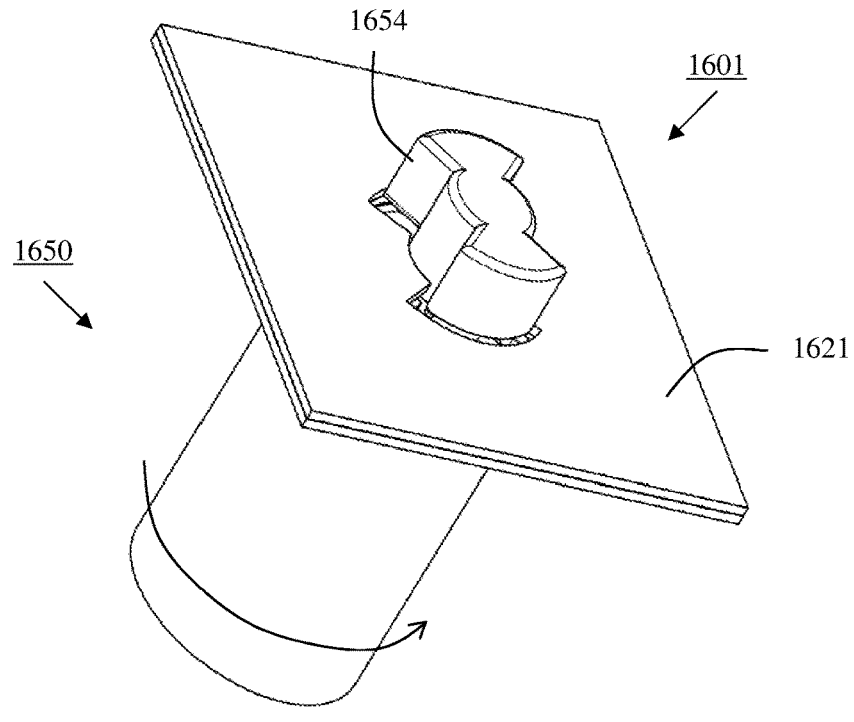

FIGS. 16C-16D are perspective views illustrating a non-limiting example of the operation of the tab-forming tool with the connection precursor structure according to some embodiments. When properly oriented, the shape of the active tool portion 1654 may be designed to fit into the opening created by the aligned tab precursor structure and hole feature. In some cases, the active tool portion 1654 of tab-forming tool 1650 may be inserted into the opening on the side of the first layer of framework material 1611 (FIG. 16C) such that at least some of the active tool portion extends through the opening on the side of the second layer of framework material 1621 (FIG. 16D). When the tab-forming tool is rotated, the tab precursors 1623 may be caught by groove 1656 of the tab-forming tool. During a rotation of, e.g., of 180°, the groove forces the tab precursors to bend at least partially through the hole feature to form a tab connector assembly. The handle and active tool portion act together with rotational force to effectively pull the tabs through the hole. After the 180° rotation, the tab forming tool may then be pulled back out of the hole.

Figure 16E:
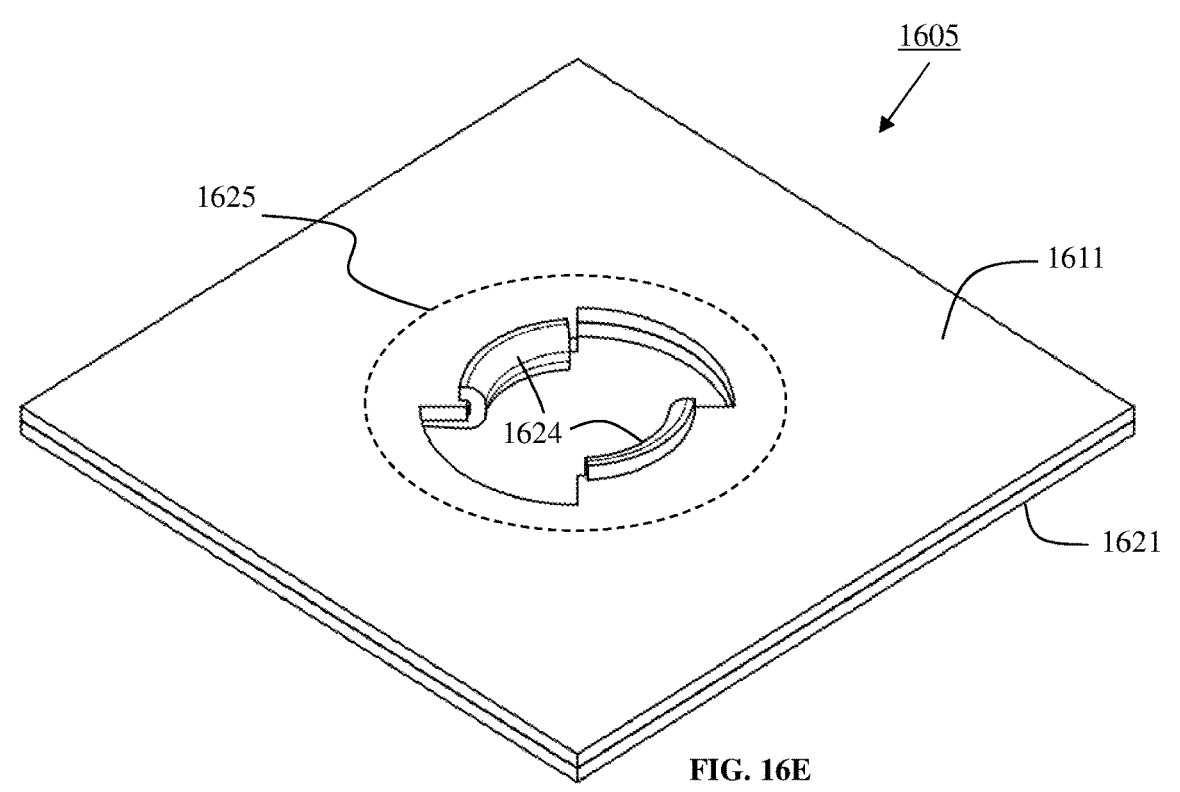
Figure 16F:
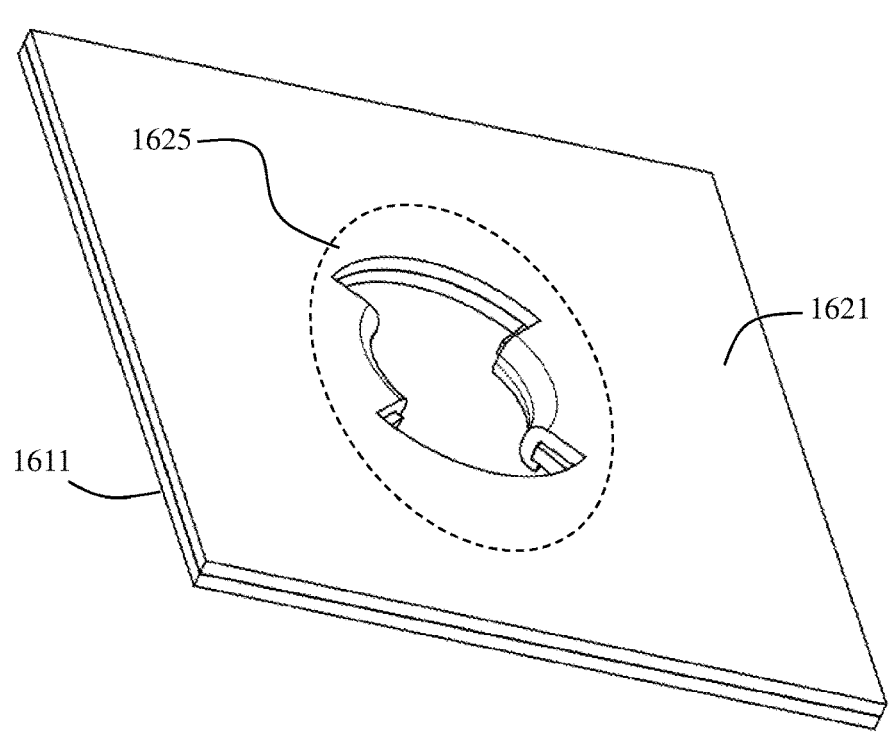

FIGS. 16E and 16F are perspective views of a non-limiting example of a tab connector assembly according to some embodiments. Connected structure 1605 includes tab connector assembly 1625 formed from bent tabs 1624 of the second layer of framework material 1621 interfacing with at least the edge of the hole feature of the first layer of framework material 1611. In some embodiments, as shown in the figures, the bent tabs may further contact the surface of the first layer of framework material 1611.

The tab-forming tool, hole feature and tab precursor structures may have different shapes and the rotation may be different than 180°. The tab-forming tool may be operated manually or by a machine or robot. Although pushing tabs of a tab precursor structure through a hole feature as shown in FIG. 6 may work effectively in many embodiments, an advantage of the system described in FIGS. 16A-16F is that the risk of deforming the frame structure may be reduced since the force is rotational (rather than tab-pushing) and generally balanced between the two layers of framework material.

Although discussed in the context of two layers of "framework material", in some embodiments, one layer is a framework material and the other layer is a material from a cross bar or racking or some other element desiring connection, which may be the same or different than the material of the framework. When connecting a frame section to another frame section or to some other element or structure (cross bars, racking, or the like), the tab precursor type of tab connector assembly may optionally be used in combination with any other tab connector assembly, for example, those discussed above.

Although connection of the support wall and/or sidewall extensions is shown using the tab precursor method, in some embodiments, connection may be made using other tab connector assemblies including, but not limited to, spring tab type, press fit type, and bent tab type. In some embodiments, a combination of these approaches may be used. In some embodiments, non-tab connector technologies may optionally be used including, but not limited to, clinching, rivets, screws, nuts/bolts, welding, or the like, either alone or in combination with any of the tab connector assembly methods. Further, with minor modifications as a skilled person would understand, the tab precursor structure approach to forming a tab connection assembly may be employed at corner bends to help lock the two adjacent frame sections together in position.

In some embodiments, the term "hole feature" is not necessarily limited to simple cutout-type openings, but in some cases may refer to a recessed area of a structure, a channel, or any space which a tab may be bent or moved into and yield the desired connection function.

Figure 7:
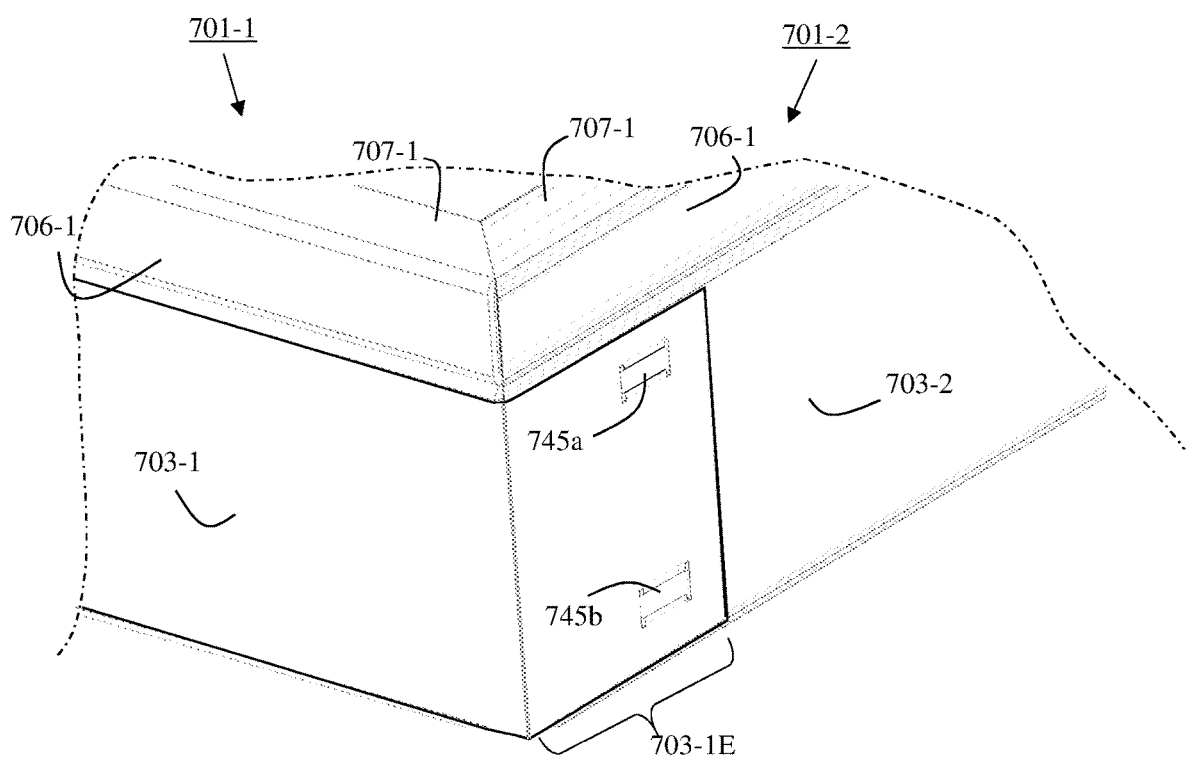
FIG. 7 is a perspective view of a non-limiting example of a wrapped corner joint according to some embodiments.

In some embodiments, a sidewall of a frame section may have an extension that is wrapped around the end of another frame section sidewall. FIG. 7 is a perspective view of a non-limiting example of a wrapped corner joint according to some embodiments. First frame section 701-1 and second frame section 701-2 may optionally have structure similar to the frame sections of FIGS. 5A and 5B. For visual reference, some of the frame features are labelled in FIG. 7, including side wall 703-1, 703-2, pocket wall 706-1, 706-2, and top lip 707-1, 707-2. First frame section 701-1 may include a sidewall extension 703-1E that bend to form a corner and overlays a portion sidewall 703-2. The sidewall extension may be connected to the sidewall using a connector feature, for example, a tab connector assemblies 745a and 745b. FIG. 7 illustrates a tab precursor type of tab connector assembly, but other tab connector assemblies may be used including, but not limited to, a spring frame type, a press fit type, or a bent tab type. In some embodiments, the two frame sections may aligned and connected without the sidewall extension yet having a substantial bend. The bend may be formed later, e.g., when the joined structure is bent into position during attachment to a panel (thereby forming the corner joint). In some embodiments, the first frame section sidewall extension may be bent into position prior to connection with the second frame section sidewall. Although discussed here as a tab connector assembly, other connector technologies may optionally be used including, but not limited to, clinching, rivets, screws, nuts/bolts, welding, or the like.

Figure 8A:
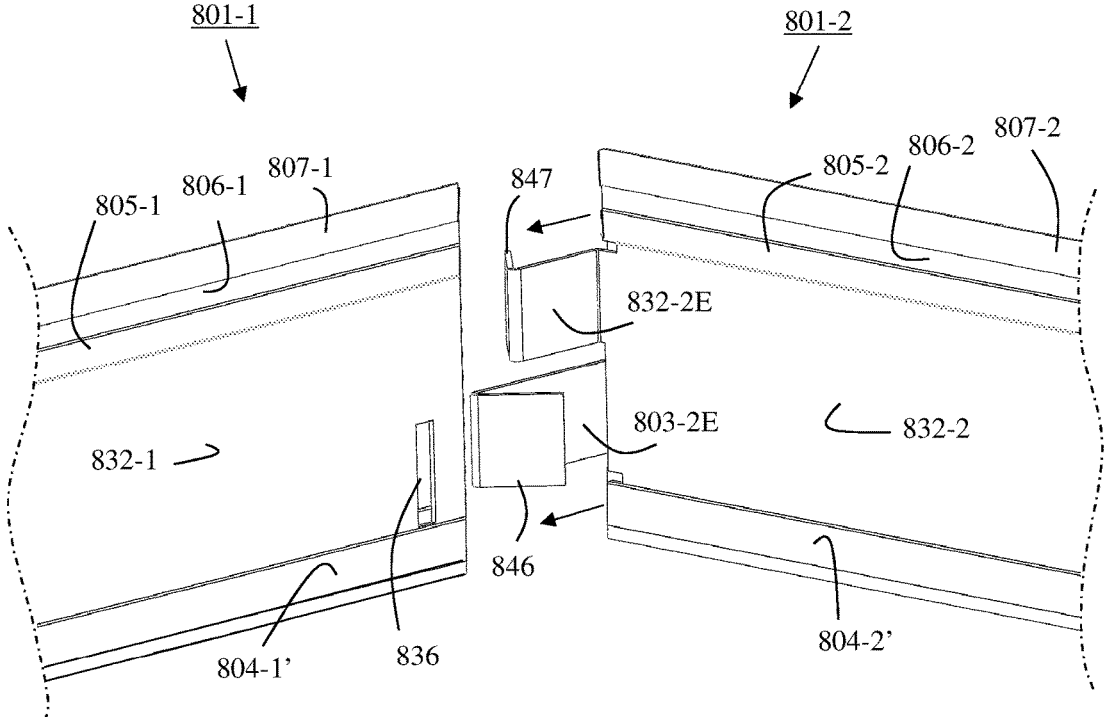
FIGS. 8A-8C are various views showing a non-limiting example of forming a corner joint according to some embodiments.
Figure 8B:
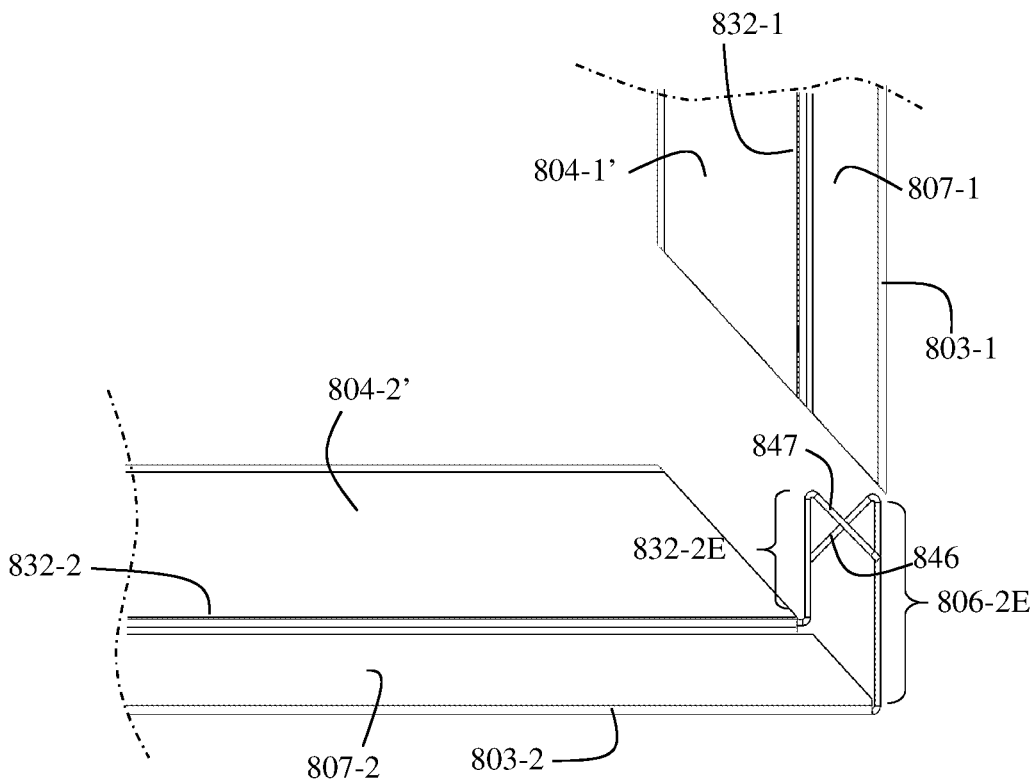
Figure 8C:
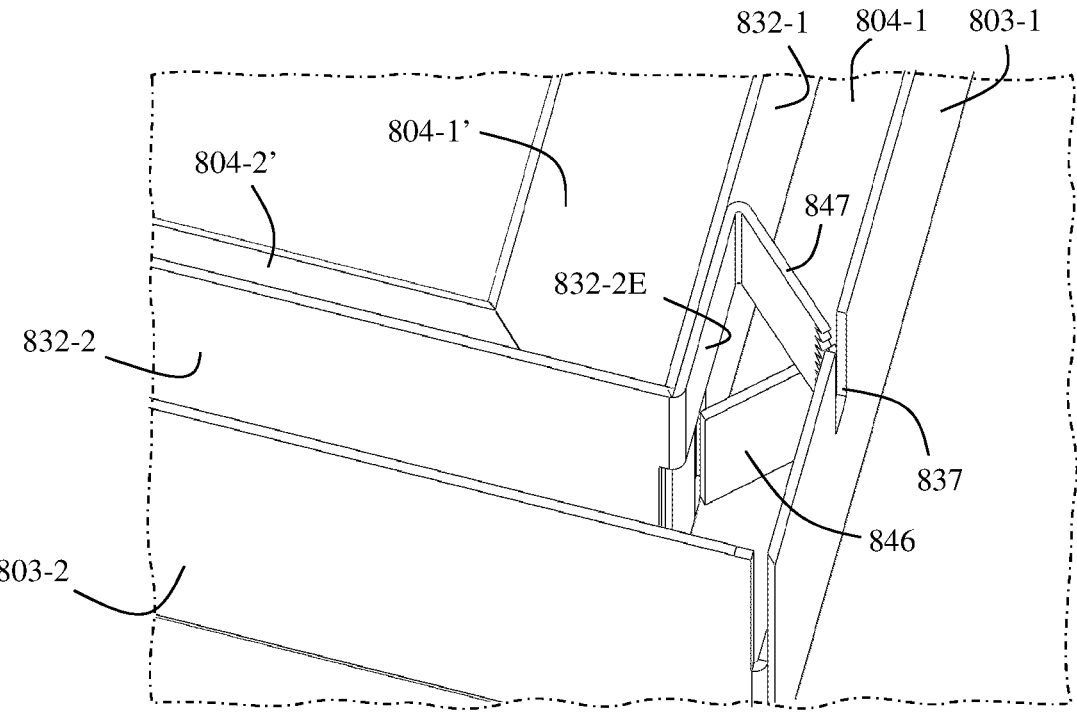

FIGS. 8A-8C are various views showing a non-limiting example of forming a corner joint according to some embodiments. In the perspective view FIG. 8A, a first frame section 801-1 is to be connected to second frame section 801-2 and form a corner joint. FIG. 8B is a top view of the two frame sections as in FIG. 8A. FIG. 8C is a perspective cutaway view (with the panel containments structure removed) showing the corner joint after connection of the two frame sections. First frame section 801-1 and second frame section 801-2 may optionally have structure similar to the frame sections of FIGS. 5A and 5B. For visual reference, some of the frame features are labelled in FIGS. 8A, 8B and/or 8C including frame sidewall 803-1, 803-2, bottom flange 804-1, doubled bottom flange portion 804-1', 804-2' lower shelf 805-1, 805-2, pocket wall 806-1, 806-2, top lip 807-1, 807-2, and support wall 832-1, 832-2. Not all features are visible in every figure. The first frame section 801-1 may optionally include holes 836 and 837 (e.g., slots) provided in support wall 832-1 and frame sidewall 803-1, respectively. A fold in the frame sidewall 803-2 orthogonal to the length-wise dimension may define a sidewall extension 803-2E which may include an engagement feature 846. Similarly, a fold in support wall 832-2 orthogonal to the lengthwise dimension may define a support wall extension 832-2E which may include an engagement feature 847. In some embodiments, one or both of the engagement features 846, 847 may include or act as a spring type of engagement feature.

Referring to FIG. 8A and 8B, the first frame section 801-1 and second frame section 801-2 are aligned so that the sidewall extension 803-2E and support wall extension 832-2E of the second frame section are directed toward the "box" of the first frame section, i.e., the partially enclosed, 4-sided frame space collectively formed by the first frame section's bottom flange, frame sidewall, panel containment structure, and support wall. Relative motion is applied between the two frame sections so that the extensions and respective engagement features are pushed into the frame space. During insertion, the spring-type engagement features may be compressed that creates friction or a mechanical lock to hold the frame sections together.

FIG. 8C illustrates the frame sections after formation of the corner joint (again, with the panel containment structure removed). The optional holes or slots 836 and 837 in the first frame sidewall and support wall, respectively, may act as catch or lock that may stop the extensions and respective engagement features from easily pulling out. Rather than holes/slots, the frame sidewall or support wall may optionally include one or more grooves, detents or ridges formed on the surface internal to the frame space to achieve a similar locking effect. In some embodiments, the frame sidewall or support wall may optionally be substantially flat and include no special features such as holes, grooves, ridges, or the like. In some embodiments, the end of the engagement feature may include serrated teeth, a sharp edge, or other shapes that may fully or partially embed in the corresponding sidewall or support wall, especially when subject to reverse (pulling) forces, helping to lock the frame sections together, and preventing the corners from separating. In some embodiments, the end of the engagement feature may include a roughened, tacky, or some other high-friction surface that may also act to help hold the frame sections together. In some embodiments, the extension feature and engagement feature may be compressed together when inserted into the box portion of the first frame section to provide a spring force to assist in locking the frame sections (with or without holes, slots, grooves, ridges, or the like in the frame section surfaces).

Figure 8D:
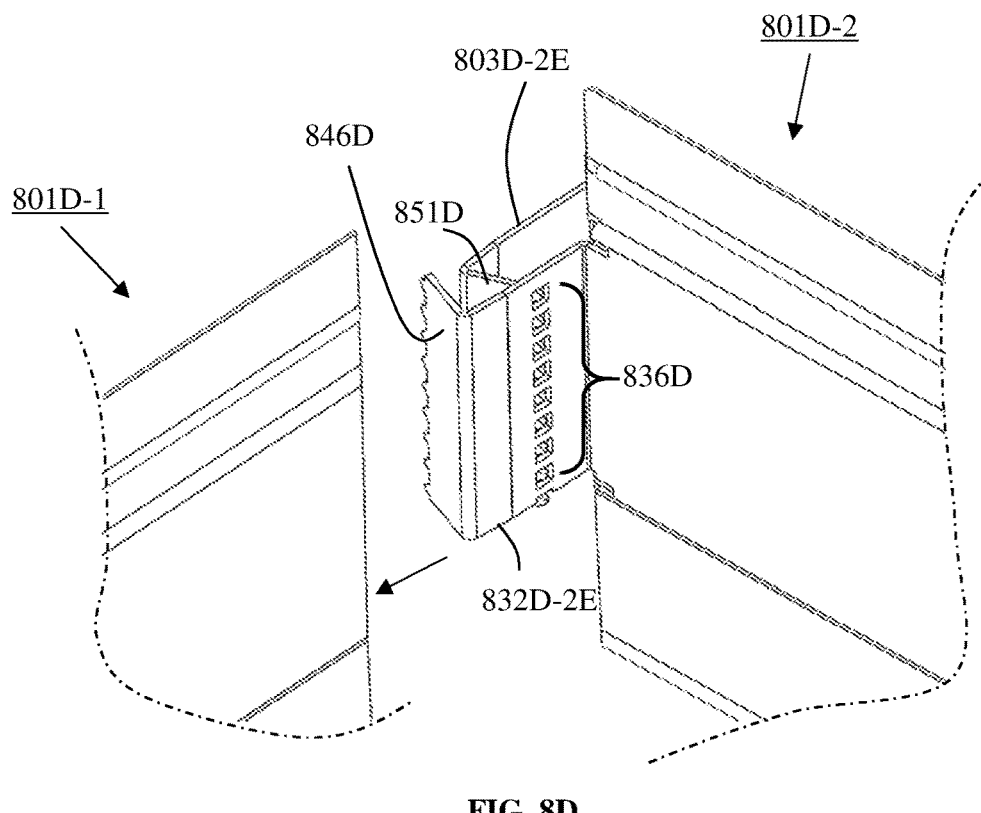
FIGS. 8D and 8E are perspective views of another non-limiting example of forming a corner joint according to some embodiments.
Figure 8E:
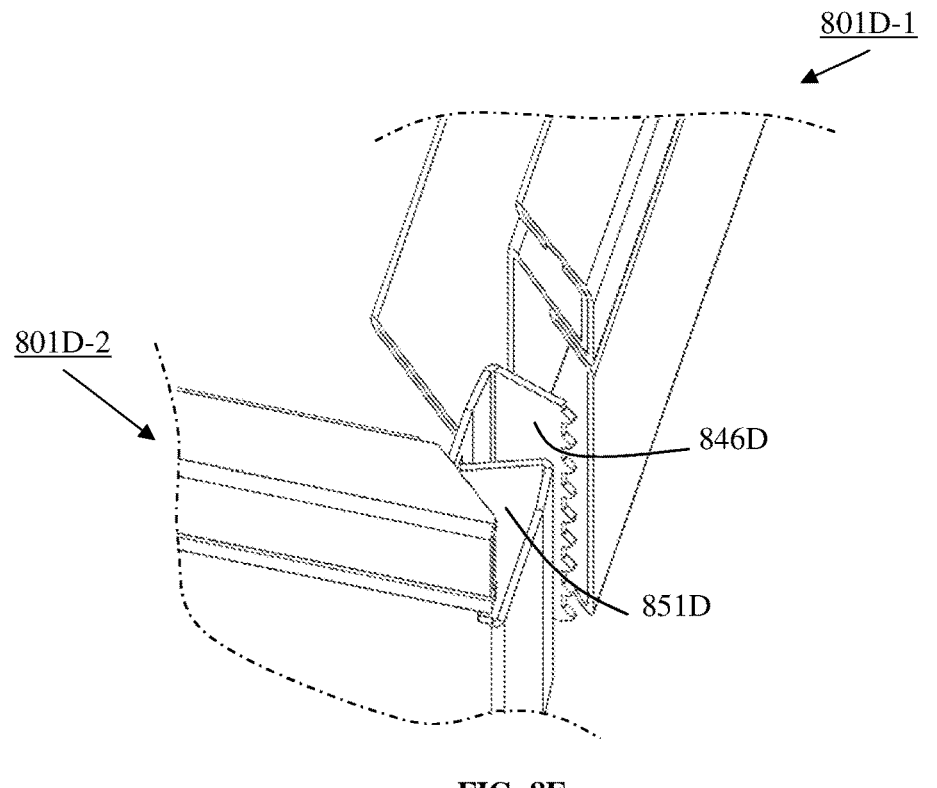

FIGS. 8D and 8E are perspective views of another non-limiting example of forming a corner joint according to some embodiments. The first and second frame sections (801D-1 and 801D-2, respectively) may be similar to that described in FIGS. 8A-8C. The second frame section 801D-2 may include a support wall extension 832D-2E and a frame sidewall extension 803D-2E that may be similar to those discussed above. As shown, the support wall extension may include an engagement feature 846D, e.g., a spring-type engagement feature with serrated teeth at the end. Unlike FIGS. 8A-8C, the sidewall extension may include a bend feature 851D having an end that engages the support wall extension (rather than the first frame section). In some cases, the end of the bend feature may also have serrated teeth or the like which may engage the support wall extension. The support wall extension may optionally include a series of small openings 836D or depressions that may align with or otherwise cooperate with the serrated teeth to strengthen the engagement. In some embodiments, the serrated teeth of the bend feature may extend through the series of holes in the support wall extension such that the serrated teeth may also engage the first frame support wall. Such a design may help reinforce the support wall extension and its respective engagement feature to resist unwanted deformations or the like during assembly or use. Although not shown, the sidewall of the first frame section may also include a series of holes or depressions that align with the serrated teeth of the support wall extension's engagement feature.

Figure 8F:
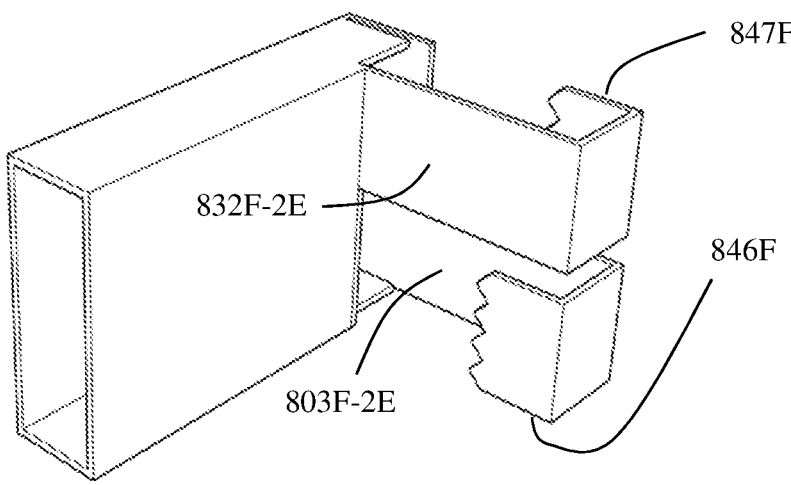
FIGS. 8F and 8G are perspective views of other non-limiting examples of frame sections having extension features according to some embodiments.
Figure 8G:
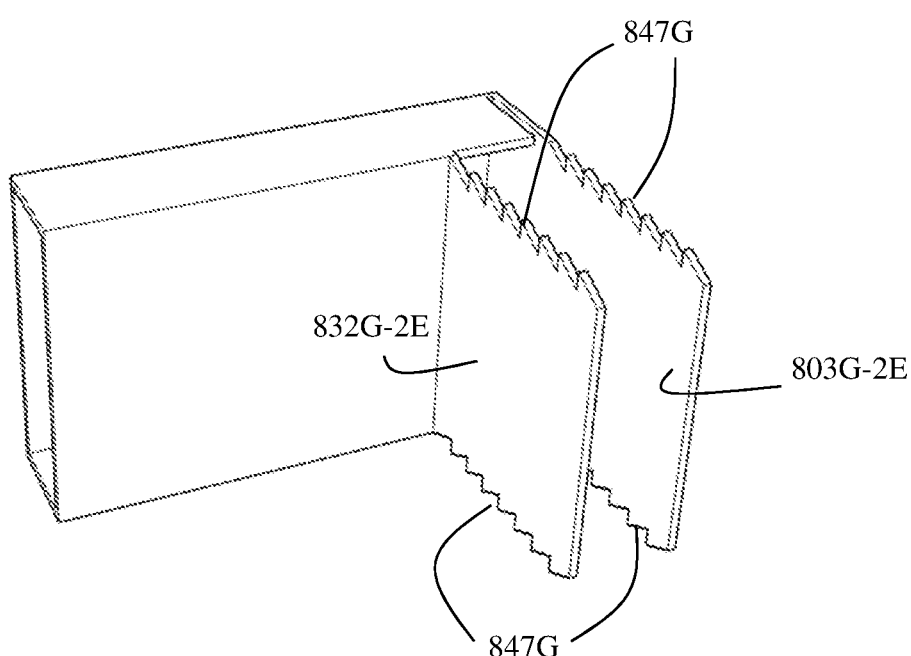

There are numerous options for how the support wall extension or sidewall extension of the second frame section may engage the first frame section. For example, in FIG. 8F the engagement features 846F (connected to sidewall extension 803F-2E) and 847F (connected to support wall extension 832F-2E) may have a different shape than shown in earlier figures. In some embodiments, the support wall extension and/or the sidewall extension may include engagement features that engage the top and bottom of the frame space rather than the sides. For example, in FIG. 8G, the support wall extension 832G-2E and sidewall extension 803G-2E may have serrated teeth engagement features 847G that may engage the bottom flange and panel containment structure of the first frame section. In some embodiments where engagement is between the top and bottom of the frame space, the frame may not necessarily be a box frame and the frame space may be a 3-sided frame space collectively formed, for example, by the frame section's bottom flange, frame sidewall, and panel containment structure.

In some cases, it may be useful for the frame sections are all electrically grounded for safety. The use of serrated teeth mentioned above may help ensure that the frames are all electrically connected. The teeth from the second frame section may dig into the internal frame space surface of the other frame section thereby breaking through any electrically insulating coatings (if present). By ensuring electrical connection between the frame sections, a single ground connection may be used rather than individual ones to each section.

In some embodiments, the first frame section and a second frame section's extension include features to form a tab connection assembly, e.g., a spring tab type, a press-fit type, a bent tab type, and/or a tab precursor structure type of assembly.

Figure 9A:
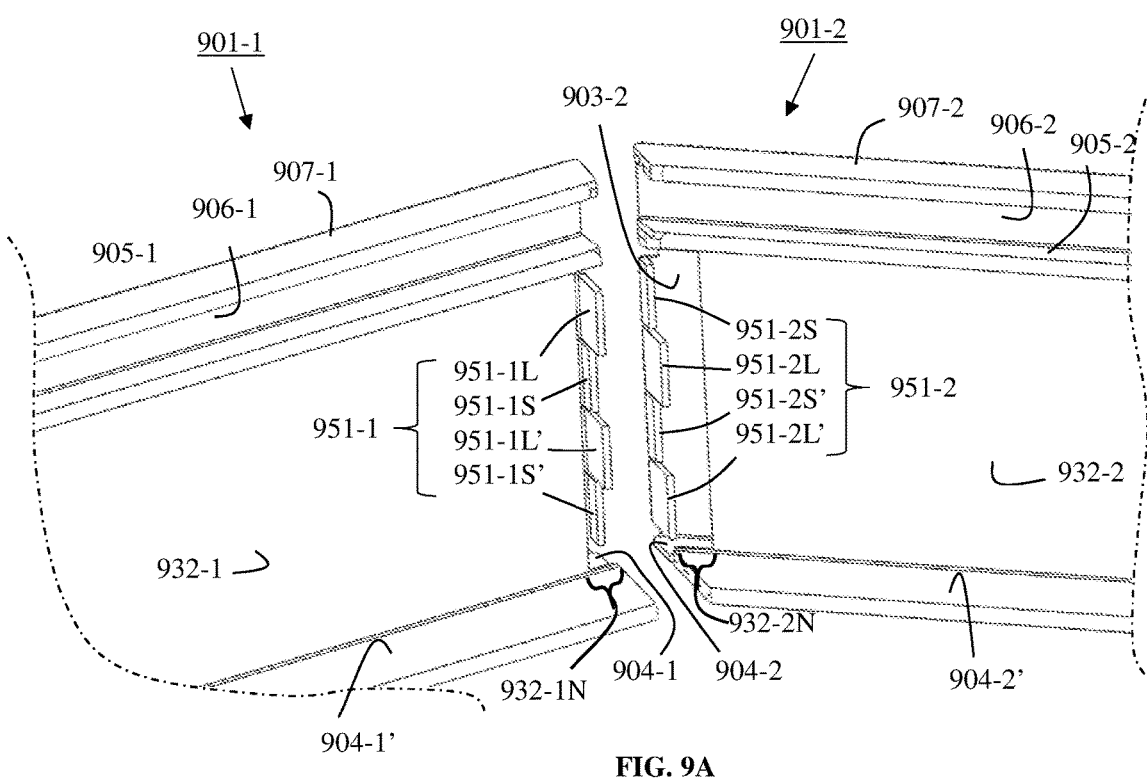
FIGS. 9A-9F are various views showing a non-limiting example of forming a corner joint according to some embodiments.
Figure 9B:
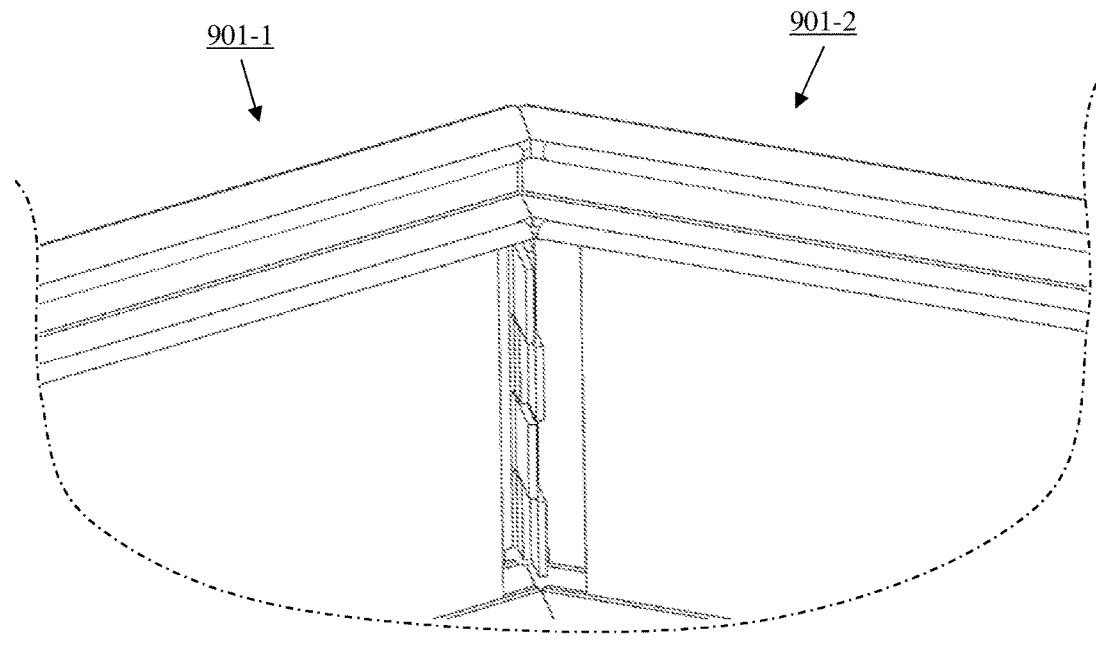
Figure 9C:
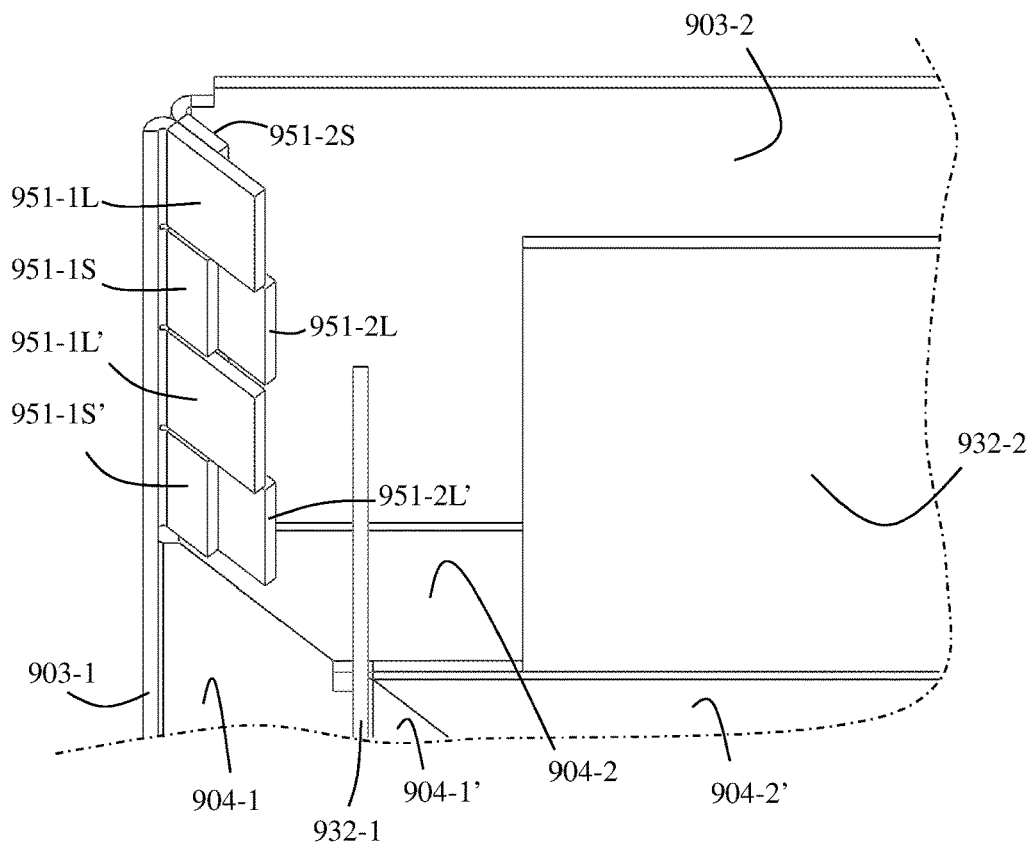

FIGS. 9A-9F are various views showing a non-limiting example of forming a corner joint according to some embodiments. In the perspective view FIG. 9A, a first frame section 901-1 is to be connected to second frame section 901-2 and form a corner joint. FIG. 9B is like 9A but now with the two frame sections in alignment for making the corner joint. FIG. 9C is a perspective cutaway view (with the panel containments structure removed) showing the aligned frame sections with focus on the corner area. First frame section 901-1 and second frame section 901-2 may optionally have structure similar to the frame sections of FIGS. 5A and 5B. For visual reference, some of the frame features are labelled in FIGS. 9A-9F, including frame sidewall 903-1, 903-2, bottom flange 904-1, 904-2, doubled bottom flange portion 904-1', 904-2' lower shelf 905-1, 905-2, pocket wall 906-1, 906-2, top lip 907-1, 907-2, and support wall 932-1, 932-2. Not all features are visible or necessarily labelled in every figure.

A first set 951-1 of interlocking precursor tabs may be provided at the end of frame sidewall 903-1. Note that the term "precursor tabs" is not to be confused with "tab precursor structures" discussed above. The first set of interlocking precursor tabs may include a first series of alternating longer precursor tabs (951-1L, 951-1L') and shorter precursor tabs (951-1S, 951-1S') inwardly angled relative to the frame sidewall, i.e., angled toward the interior of the frame. Similarly, a second set 951-2 of interlocking precursor tabs may be provided at the end of frame sidewall 903-2. The second set of interlocking precursor tabs may include second series of alternating shorter precursor tabs (951-2S, 951-2S') and longer precursor tabs (951-2L, 951-2L') inwardly angled relative to the frame sidewall, i.e., angled toward the interior of the frame. As shown in FIGS. 9B and 9C, the frame sections may be aligned so that the shorter precursor tabs of the first set are proximate the longer precursor tabs of the second set (e.g., 951-1S with 951-2L, and 951-1S' with 951-2L'), and so that the longer precursor tabs of the first set are aligned with the shorter precursor tabs of the second set (e.g., 951-1L with 951-2S, and 951-1L' with 951-2S'). The angle of the tabs relative to the sidewall depends in part upon the frame design. For example, in some embodiments, the frame may be square or rectangular such that each frame section forms about a 90° angle with an adjacent frame section. In such cases, and as illustrated here, each tab may optionally be inwardly angled at about 45° relative to its respective sidewall. However, one or more precursor tabs may be provided at some other acute angle that may be in a range of about 10° to 80°, alternatively about 20° to 70°, alternatively about 30° to 60°, alternatively about 40° to 50°. In some embodiments, the inward angles of two complementary proximate tabs may together add up to about 90°, e.g., one may be about 30° and the other about 60°.

Figure 9D:
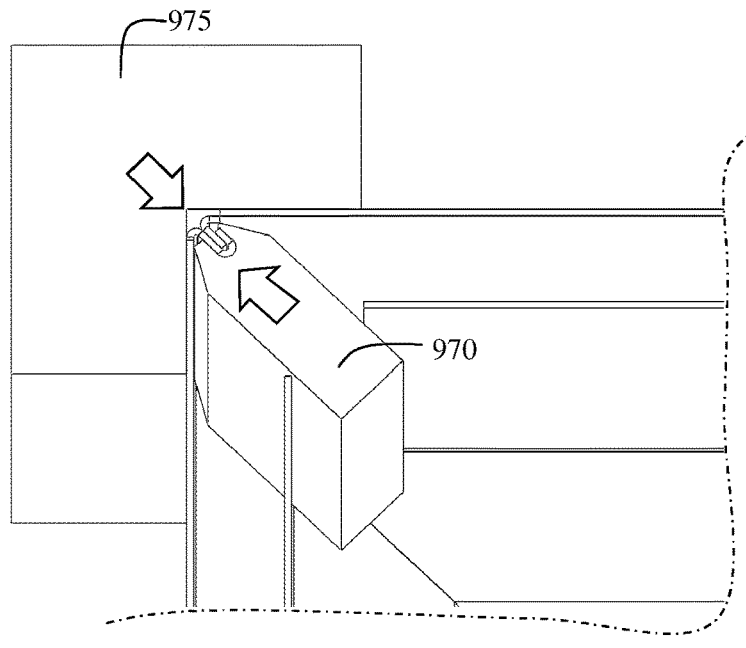
Figure 9E:
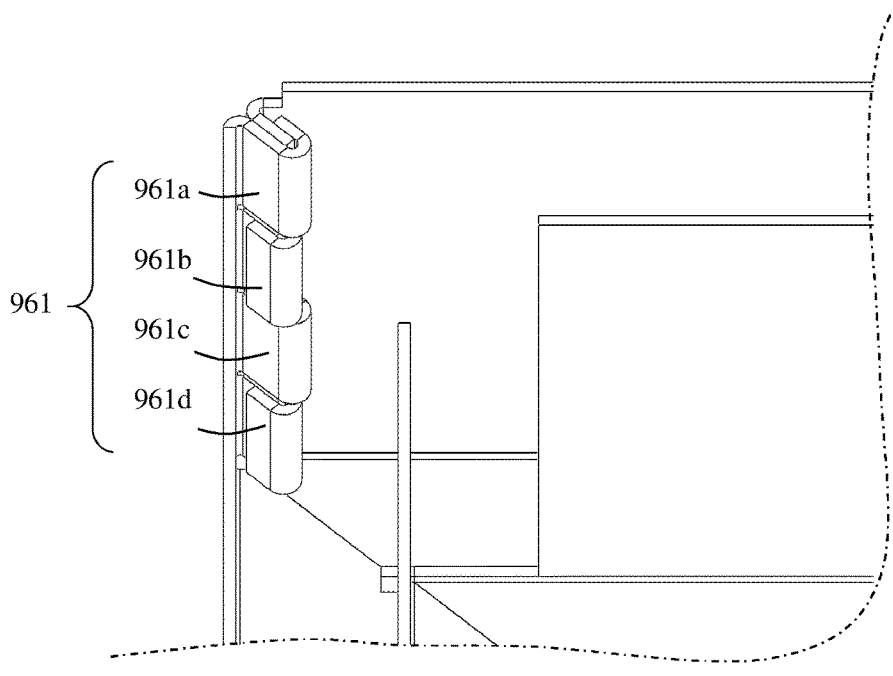
Figure 9F:
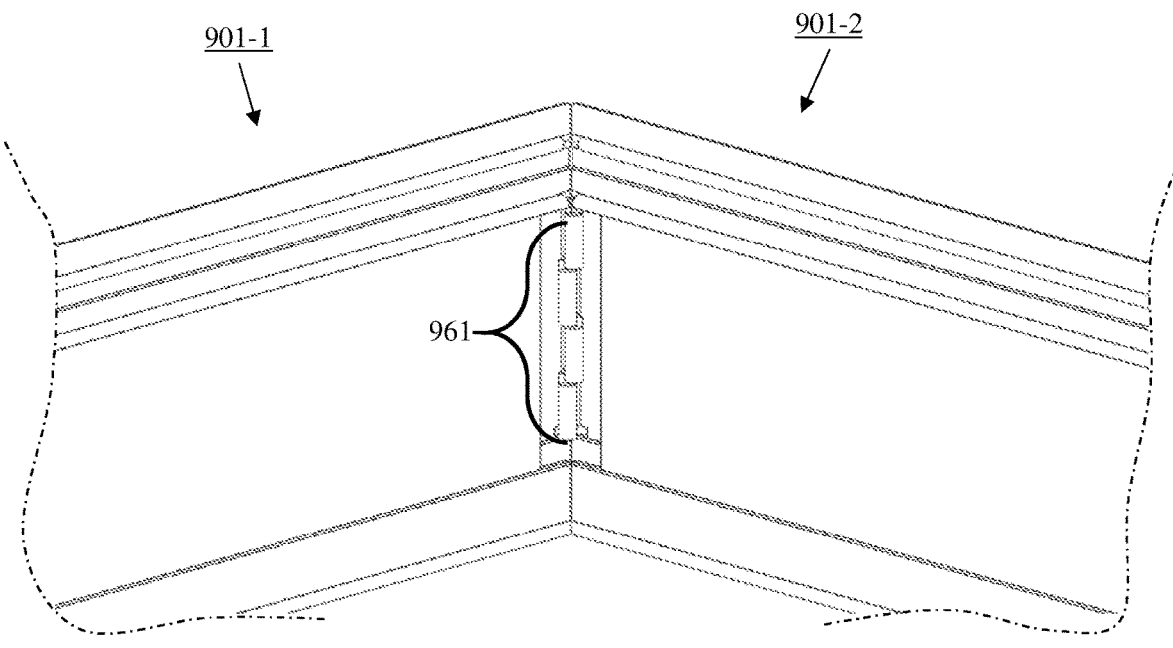

Support walls 932-1, 932-2 may each include a notched or removed portion 932-1N, 932-2N. In some cases, the notched portion allows access of a tool to further shape the aligned sets of interlocking precursor tabs. As shown in FIG. 9D, which is a similar view as FIG. 9C but zoomed out slightly, a tab-bending tool 970 may be used to fold the longer precursor tabs over the shorter precursor tabs. In some embodiments, the tab-bending tool 970 may be pushed against the corner to force the longer precursor tabs to fold over the shorter precursor tabs, optionally in cooperation with a backing block 975 which provides a counterforce that stabilizes the corner during the folding. Referring to FIG. 9E, which is similar view as FIG. 9C, a corner joint may be formed including interlocking tab structure 961 having interlocked tabs 961a, 961b, 961c, 961d. FIG. 9F is another view of the corner joint from a perspective similar to FIGS. 9A and 9B showing the interlocking tab structure 961, which is visible through the notched portions of the frame section support walls.

As can be seen, the interlocking tab structure is such that no friction or texture is necessary with respect to the tab precursor surfaces. The geometry of the interlocking tab structure may prevent substantial slippage of the folded, interlocked tabs. In some embodiments, however, one or more tab precursor surfaces may optionally include a texture or features that may promote even stronger interlocking, improved electrical continuity between frame sections, improved interaction with the tab-bending tool, or provide some other benefit.

Figure 10A:
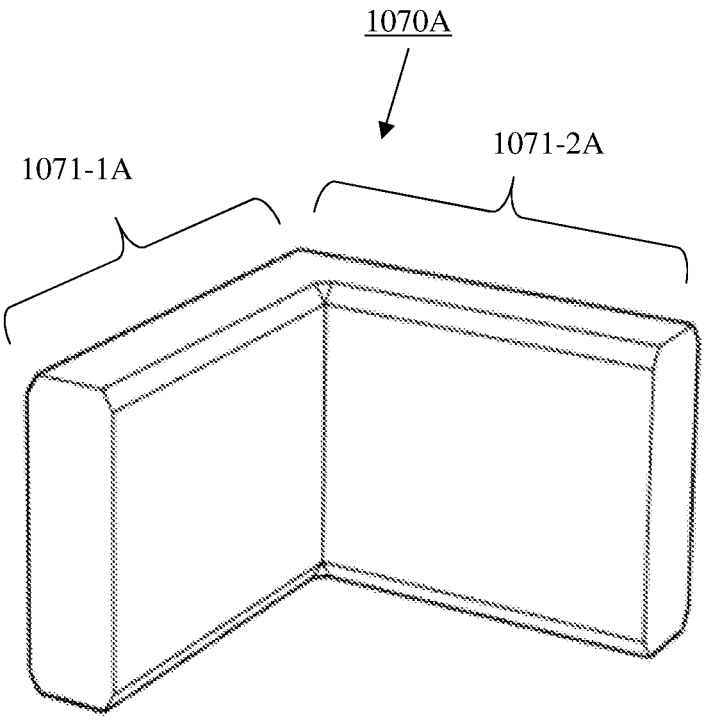
FIG. 10A shows a perspective view of a non-limiting example of a corner insert according to some embodiments.

In some embodiments, a corner joint or other junction may include an insert connector (sometimes called a "corner insert" when used at a corner) that may fit into the 3- or 4-sided frame space of a frame section. FIG. 10A shows a perspective view of a non-limiting example of a corner insert according to some embodiments. Corner insert 1070A may include a first portion 1071-1A designed to fit into the frame space of a first frame section and a second portion 1071-2A designed to fit into the frame space of a second frame section. Although the first and second frame sections are not shown in FIG. 10A, they may be similar to those described earlier, e.g., with respect FIGS. 5A and 5B. In some cases, both frame sections may include a support wall (like FIGS. 5A and 5B), but in some other cases only one or neither frame section includes a support wall. In some embodiments, the first and second portions may be provided at an angle corresponding approximately to the angle that the intersection of the two frame sections is designed to form to make a corner joint. For example, for a rectangular or square frame, the angle formed by first portion 1071-1 and second portion 1071-2 may be about 90°. In some embodiments, the first and second portions may be symmetrical or very similar with respect to dimensions, features, and properties. In some embodiments, the first portion and second portions of a corner insert may have substantially different dimensions, features, or properties.

Figure 10B:
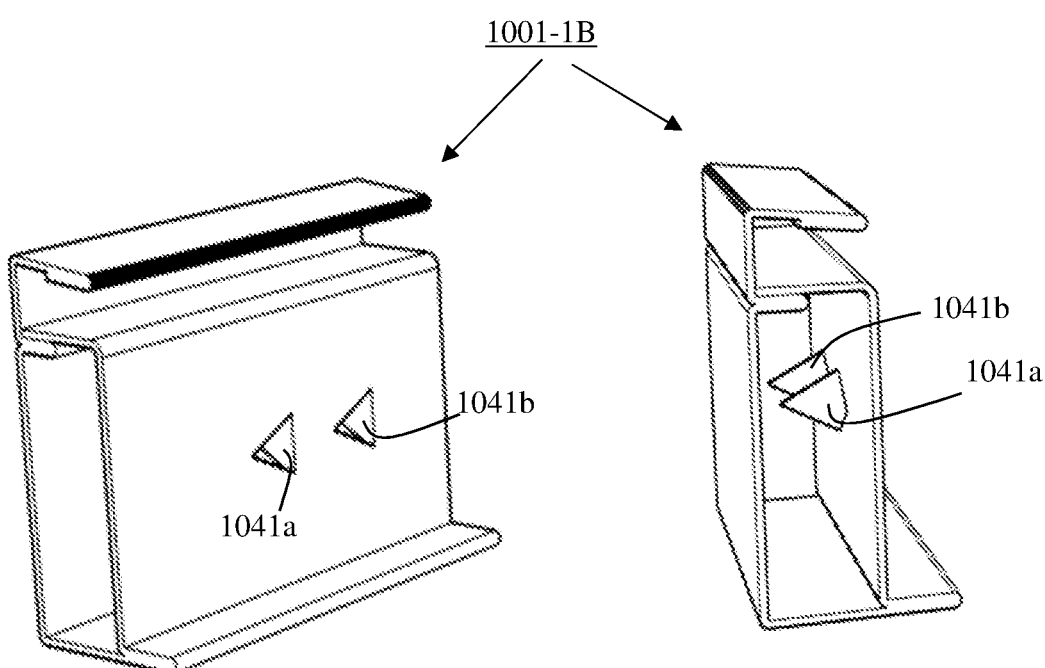
FIG. 10B shows two perspective views of a non-limiting example of a frame section including indents according to some embodiments.

The insert connector (e.g., a corner insert) may be made from any material that can achieve the stiffness, density, strength or other attributes desirable for a solid connection. In some non-limiting examples, the corner insert may be made from plastic, fiberglass, aluminum, steel, a composite, or the like. The corner insert may be solid, hollow, partially hollow, or even have an open structure. Depending on the material and desired shape, the corner insert may be cast, milled, injection formed, roll formed, or made by any other suitable fabrication method. In some embodiments, the corner insert may be secured to a frame section, e.g., to a frame sidewall, bottom flange, a panel containment structure (lower shelf), or even a support wall (if present), by a variety of methods. In some embodiments, the corner insert may be secured using screws, rivets, bolts/nuts, welds, or adhesives. In some embodiments, the corner insert is pressure-fit into the frame space where the corner insert may have a slightly larger outside dimension than the frame space and one or both of the frame section and corner insert are sufficiently compressible. In some cases, the corner insert (or frame section) may include serrated or textured surfaces to increase friction. In some embodiments, the corner insert may include holes or openings to receive locking or connection mechanisms, including but not limited to, screws, bolts, rivets, or even frame section elements such as tabs. In some embodiments, the corner insert may be secured by crimping, denting, or even piercing a frame section component proximate the corner insert to form an indent or barb that presses against or into the corner insert. FIG. 10B shows two perspective views of a non-limiting example of a frame section 1001-1B including indents 1041a, 1041b that may puncture or press into a corner insert (not shown for clarity). Frame section 1001-B may optionally be similar to that described in earlier figures and so the various features are not labelled, but such features are self-evident from other figures. Such corner insert may, for example, be formed of a pliable material such as plastic or may include a preformed hole or hole precursor (e.g., a pre-cut or weakened area) that readily receives the indentation. In some embodiments, the corner insert and corresponding frame section may include features to form a tab connection assembly, e.g., a spring tab type, a press-fit type, a bent tab type, and/or a tab precursor structure type of assembly.

Figure 10C:
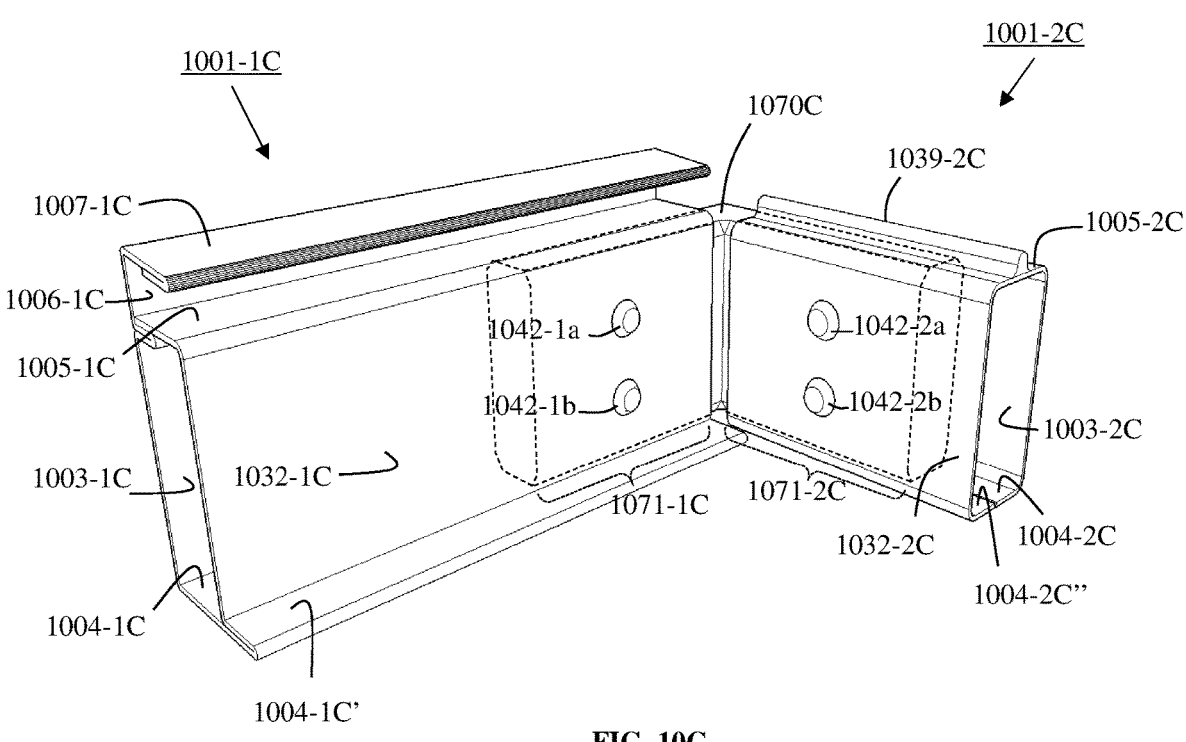
FIG. 10C is a perspective, see-through view of non-limiting example of a corner joint based on a corner insert according to some embodiments.

FIG. 10C is a perspective, see-through view of non-limiting example of a corner joint based on a corner insert according to some embodiments. First frame section 1001-

1C may optionally be similar to frame sections described earlier, e.g., as described with respect to FIG. 5A. First frame section 1001-1C may include a lengthwise fold that may define an intersection of a frame sidewall 1003-1C with a bottom flange 1004-1C. The first frame section may further include a series of folds that may form a panel containment structure that may include a lower shelf 1005-1C, a pocket wall 1006-1C, a top lip 1007-1C, and perhaps even a pocket region. The first frame section may include a reversing flange fold such that a portion 1004-1C' of the bottom flange may include a double layer of framework material (doubled bottom flange portion). Another lengthwise fold may define an intersection of a support wall 1032-1C with the bottom flange, specifically, doubled bottom flange portion 1004-1C'. Support wall 1032-1C may extend from the bottom flange to lower shelf 1005-1C (part of the panel containment structure). First frame section 1001-1C may be considered a type of box frame having a 4-sided frame space collectively formed by the first frame section's bottom flange, frame sidewall, panel containment structure, and support wall.

Second frame section 1001-2C may optionally be similar to frame sections described earlier, e.g., as described in FIG. 5B. However, in FIG. 10C, the second frame section may be slightly different. Second frame section 1001-2C may include a lengthwise fold defining a bottom flange 1004-2C and frame sidewall 1003-2C. The second frame section may further include a series of folds that may form a panel containment structure that may include a lower shelf 1005-2C and ridge 1039-2C. Another lengthwise fold may form a support wall 1032-2C that extends down to secondary bottom flange 1004-2C", which in turn, may be formed by another lengthwise fold at the base of the support wall 1032-2C. Second frame section 1001-2C may be considered a type of box frame having a 4-sided frame space collectively formed by the first frame section's bottom flange, frame sidewall, panel containment structure, and support wall. In some embodiments, ridge 1039-2C may act as a support on which the panel (not shown) may rest. In some embodiments, the panel may instead rest directly on an inward portion of lower shelf 1005-2C and ridge 1039-2C may act as a wall to stop or reduce lateral panel movement.

Corner insert 1070C may include a first portion 1071-1C designed to fit into the frame space of a first frame section 1001-1C and a second portion 1071-2C designed to fit into the frame space of the second frame section 1001-2C. The first and second portions are not actually visible in this perspective view but their locations within each frame space are shown by the dotted lines. In some embodiments, the corner joint may include one or more attachment features 1042-1a and 1042-1b which may assist in or lock the attachment of the first frame section to the first portion of the corner insert. Similarly, the corner joint may include one or more attachment features 1042-2a and 1042-2b which may assist in or lock the attachment of the second frame section to the second portion of the corner insert. In FIG. 10C, the attachment features may represent the head of a screw, bolt, rivet or similar structure that has been provided through the respective support wall and into or through the corner insert. In some embodiments, such feature may extend all the way through the frame space and to their respective frame sidewalls. Rather than screws, bolts, rivets, or similar structures, the attachment feature may be any of the other attachment features discussed herein including, but not limited to, those based on the tab precursor method or tab connector assembly method including, but not limited to, those based on a spring tab type, a press fit type, a bent tab type, or a tab precursor structure type. Although the frame sidewalls are not shown in FIG. 10C, similar attachment features may be provided there, or even on the bottom flange or lower shelf. In some embodiments, one or more of the attachment features 1042-1a, -1b, -2a, -2b shown in FIG. 10C may represent a raised portion of the corner insert that extends through a hole in the support wall.

Figure 10D:
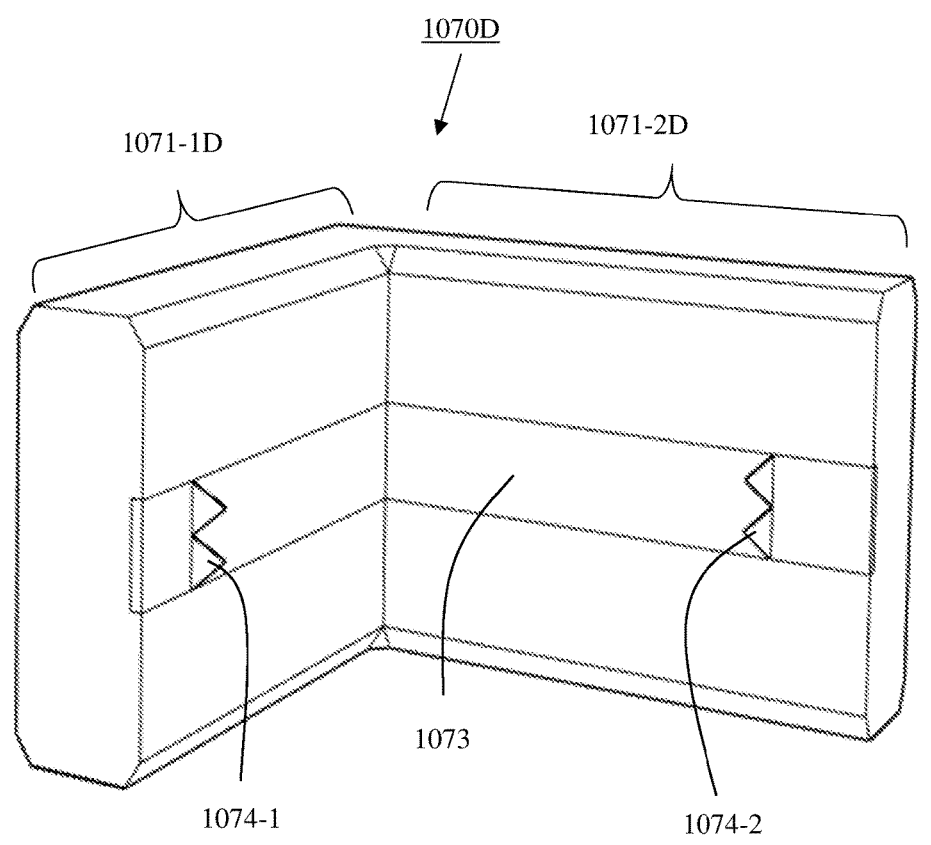
FIG. 10D is a non-limiting example of a corner insert including an electrical interconnection feature according to some embodiments.

As mentioned, it may be useful for the frame sections to be electrically interconnected, e.g., to ensure adequate grounding for safety. The insert connector may include features to help assure such electrical interconnection. In some cases, the insert connector may be formed of an insulating material or have an electrically insulating coating. FIG. 10D is a non-limiting example of a corner insert according to some embodiments. Corner insert 1070D may include a first portion 1071-1D designed to fit into the frame space of a first frame section and a second portion 1071-2D designed to fit into the frame space of a second frame section. Although the first and second frame sections are not shown in FIG. 10A, they may optionally be similar to those described earlier, e.g., with respect FIGS. 5A and 5B. In some cases, corner insert 1070D may be formed of an electrically insulating material or have an electrically insulating coating that does not make good electrical connection to the frame sections.

Corner insert 1070D may further include an electrical interconnection feature 1073, e.g., an electrically conductive strip, provided at least partly across the faces of both the first and second portions. In some embodiments the electrical interconnection feature may further include a connectivity enhancement feature 1074-1, 1074-2 that may assist in ensuring electrical contact to a respective frame section and may further assist in locking the corner insert in place. For example, the connectivity enhancement feature may have a sharp, barbed, or raised feature that may dig into the framework material of the first or second frame sections to make strong electrical contact. The electrical interconnection material may be formed of any suitable electrically conductive material such as a metal including, but not limited to, metals or alloys containing copper, nickel, aluminum, titanium, or iron (e.g., steel). The connectivity enhancement feature may be made of the same material as the rest of the electrical interconnection feature, but in some cases, may be different.

Figure 11A:
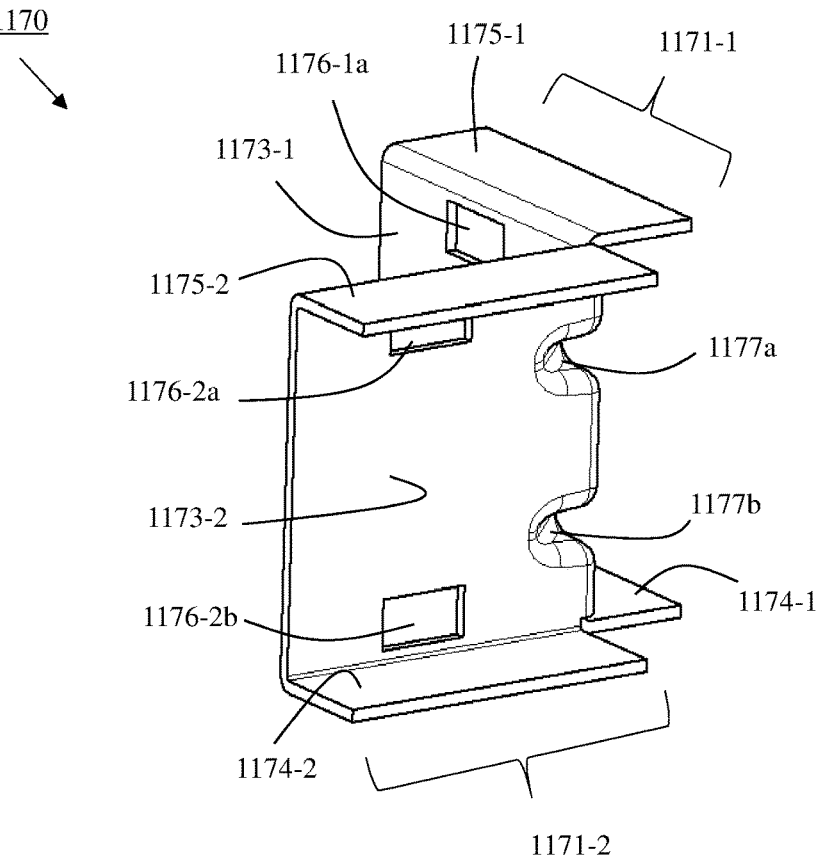
FIG. 11A is a perspective view of a non-limiting example of a corner insert according to some embodiments.
Figure 11B:
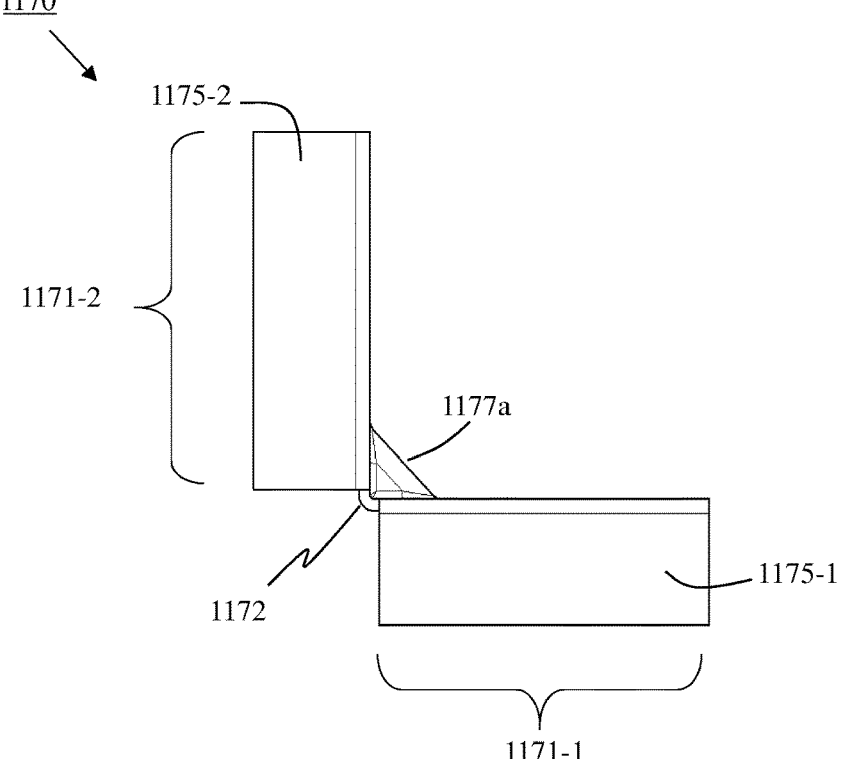
FIG. 11B is a top view of the corner insert of FIG. 11A.
Figure 11C:
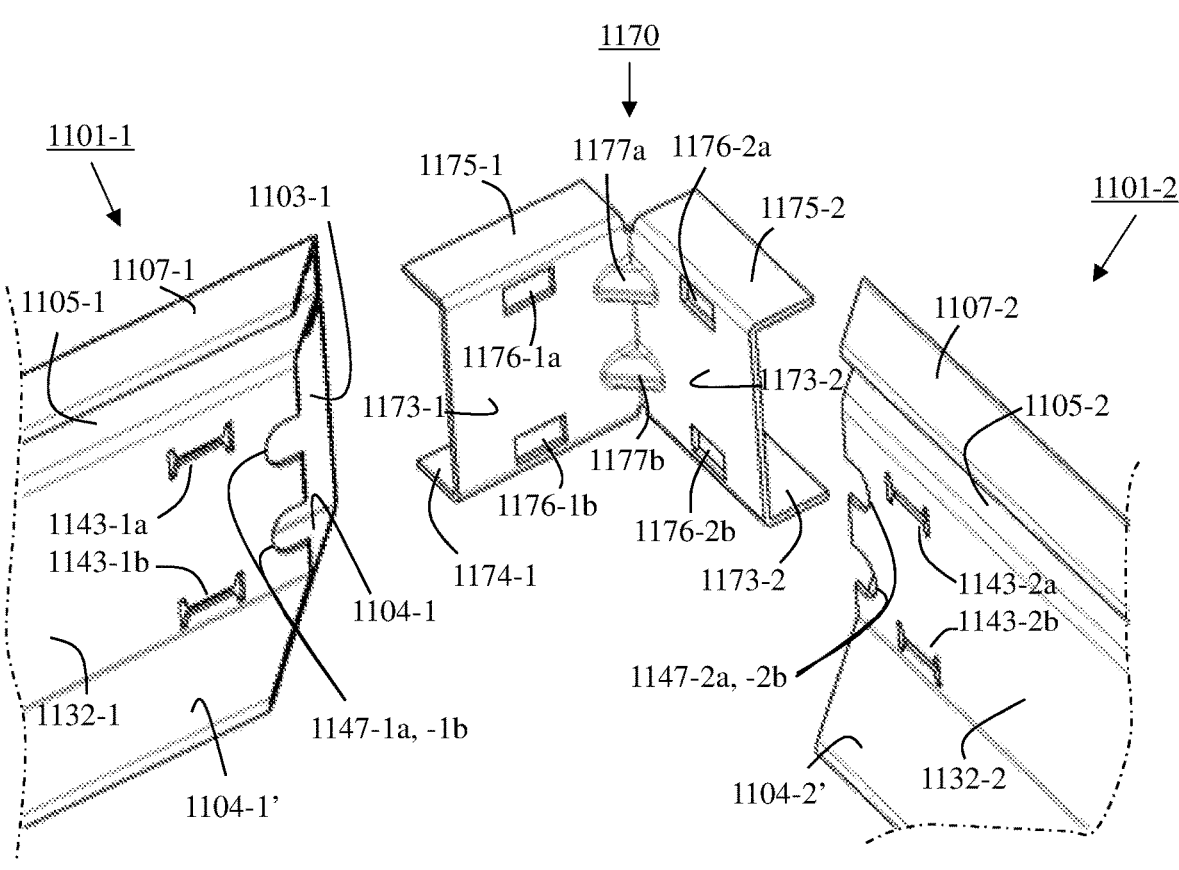
FIG. 11C is a perspective view of the corner insert of FIGS. 11A and 11B along with first and second frame sections intended for joining, according to some embodiments.

In some embodiments, an insert connector may have a frame-like, open structure rather than a block or hollow block structure. FIG. 11A is a perspective view of a non-limiting example of a corner insert according to some embodiments. FIG. 11B is a top view of the corner insert of FIG. 11A. FIG. 11C is a perspective view of the corner insert of FIGS. 11A and 11B along with first and second frame sections intended for joining. Corner insert 1170 may include a fold 1172 defining a first portion 1171-1 and a second portion 1171-2. In some embodiments, the first portion 1171-1 may include an insert wall 1173-1, a bottom flap 1174-1, and top flap 1175-1. In some cases, one or more hole features 1176-1a, 1176-1b may be provided in the insert wall 1173-1. Similarly, in some embodiments, the second portion 1171-2 may include an insert wall 1173-2, a bottom flap 1174-2, and top flap 1175-2. Hole features 1176-2a, 1176-2b may be provided in the insert wall 1173-2. As mentioned, the first and second portions may in some cases be provided at an angle corresponding approximately to the angle that the intersection of the two frame sections is designed to form to make a corner joint. For example, for a rectangular or square frame, the angle formed by the insert walls of the first and second portions may be about 90°. In some cases, one or more lateral indents 1177a, 1177b may be provided in the fold 1172 that pushes a portion of each insert wall inwardly into the (optionally about) 90° angle formed by insert walls 1173-1 and 1173-2. In some embodiments, such lateral indents may increase the strength of the corner insert and/or act as an alignment feature for forming the corner joint as discussed below.

Referring to FIG. 11C, corner insert 1170 is shown along with first frame section 1101-1 and second frame section 1101-2, each of which may optionally have structure similar to the frame sections of FIGS. 5A and 5B. For visual reference, some of the frame features are labelled, including frame sidewall 1103-1, bottom flange 1104-1, bottom flange doubled portion 1104-1', 1104-2' lower shelf 1105-1, 1105-2 (part of the panel containment structure), top lip 1107-1, 1107-2, and support wall 1132-1, 1132-2. Frame sidewall and bottom flange for the second frame section are not visible in this view. The first portion 1171-1 of corner insert 1170 may be designed to fit at least partially into the first frame space collectively formed by the first frame section's bottom flange, frame sidewall, panel containment structure, and support wall. In some cases, the dimensions of the corner insert may be such that the insert wall 1173-1 may be flush, near flush or provide some interference with support wall 1132-1, bottom flap 1174-1 may be flush, near flush or provide some interference with bottom flange 1104-1, and/or top flap 1175-1 may be flush with lower shelf 1105-1. The second portion 1171-1 of corner insert 1170 may be designed to fit at least partially into the second frame space collectively formed by the second frame section's bottom flange, frame sidewall, panel containment structure, and support wall. In some cases, the dimensions of the corner insert may be such that the insert wall 1173-2 may be flush, near flush or provide some interference with support wall 1132-2, bottom flap 1174-2 may be flush, near flush or provide some interference with the bottom flange of the second frame section (not easily visible in these views), and/or top flap 1175-2 may be flush, near flush or provide some interference with lower shelf 1105-2.

The ends of support walls 1132-1, 1132-2 may include one or more notches 1147-1a, 1147-1b, 1147-2a, 1147-2b that, upon frame assembly, may be designed to receive lateral indents 1177a and 1177b of the corner connector. Support walls 1132-1, 1132-2 may include one or more tab precursor structures 1143-1a, 1143-1b, 1143-2a, 1143-2b that, upon frame assembly, may be designed to align with hole features 1176-1a, 1176-1b, 1176-2a, 1176-2b. In some embodiments, the bendable flaps of the tab precursor structures may optionally be cut into the support wall to form an angled edge in a manner similar to that described with respect to FIG. 6H.

Figure 11D:
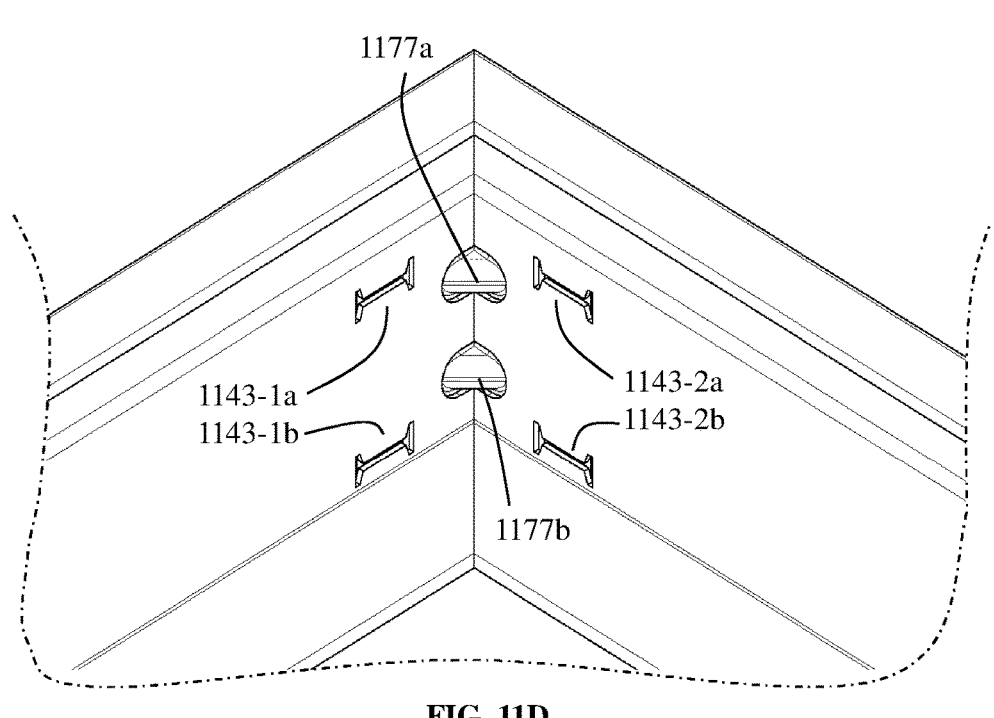
FIG. 11D is a perspective view of frame sections in an intermediate stage of assembly for forming a corner joint according to some embodiments.
Figure 11E:
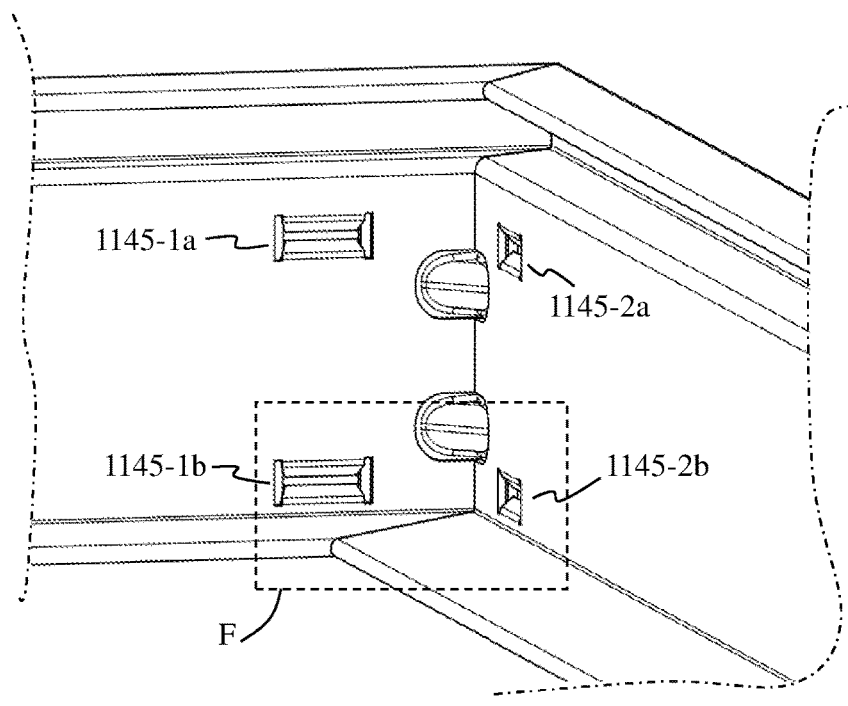
FIGS. 11E and 11F are perspective views of a non-limiting example of an assembled corner joint according to some embodiments.
Figure 11F:
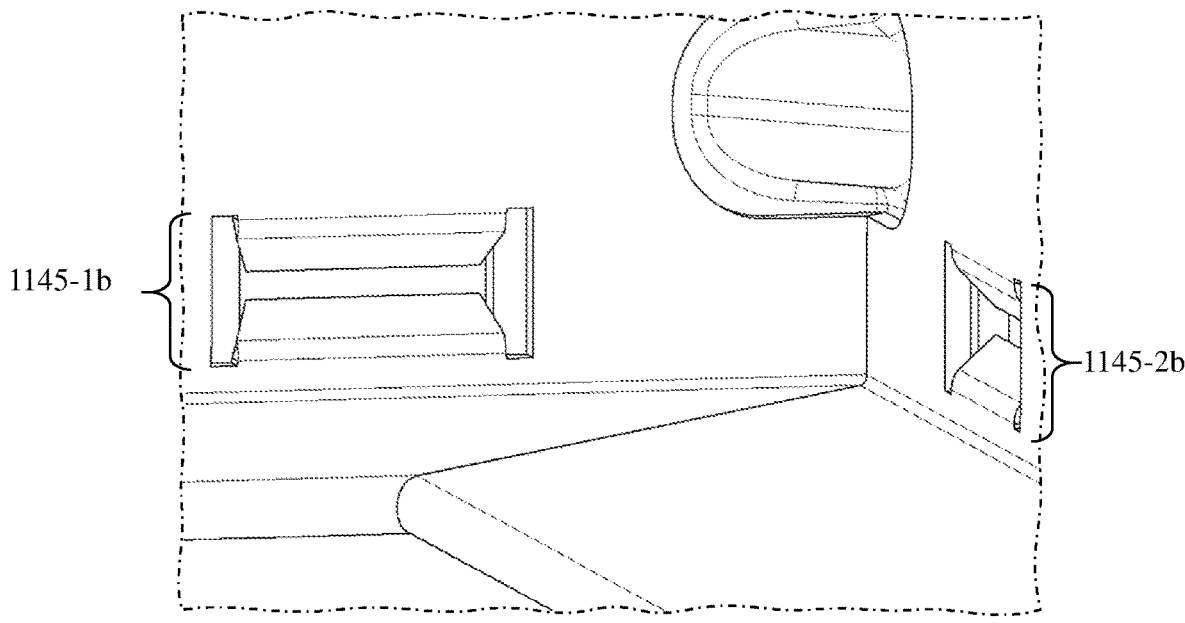

FIG. 11D is a perspective view of the frame sections in an intermediate stage of assembly (only a few features are labelled for clarity, but others are self-evident from FIG. 11C), where the corner insert portions are appropriately inserted into their respective frame space so that the tab precursor structures of the frame section support walls are aligned with the hole features of the corner insert. Next, as shown in FIG. 11E, the flaps of the tab precursor structures may be pushed inwardly through the hole features to form tab connector assemblies 1145-1a, 1145-1b, 1145-2a, 1145-2b (that may optionally be similar in operation and/or structure to those described with respect to FIGS. 6A-6K) thereby locking the components in place and forming a corner joint between the first and second frame sections. FIG. 11F is a zoomed in view of box F from FIG. 11E to further illustrate the tab connector assemblies.

FIGS. 11A-11F represent just one of many possible embodiments for using an open-type corner insert. Alternative locking mechanisms may be used in addition to, or instead of, the tab precursor structure type, e.g., spring tabs, push tabs, bent tabs, friction, serrated teeth or the like. In some cases, the friction alone between the flush surfaces of the corner insert and the frame sections may be sufficient to lock the various components in place. In some embodiments, the corner insert may be first cooled relative to the frame sections to cause a slight reduction in size to allow easier assembly. Upon warming, the expansion may help secure the components of the corner joint in place. Alternatively, or in addition, the frame sections may be warmed relative to the corner insert to achieve a similar effect.

Figures 12A, 12B:
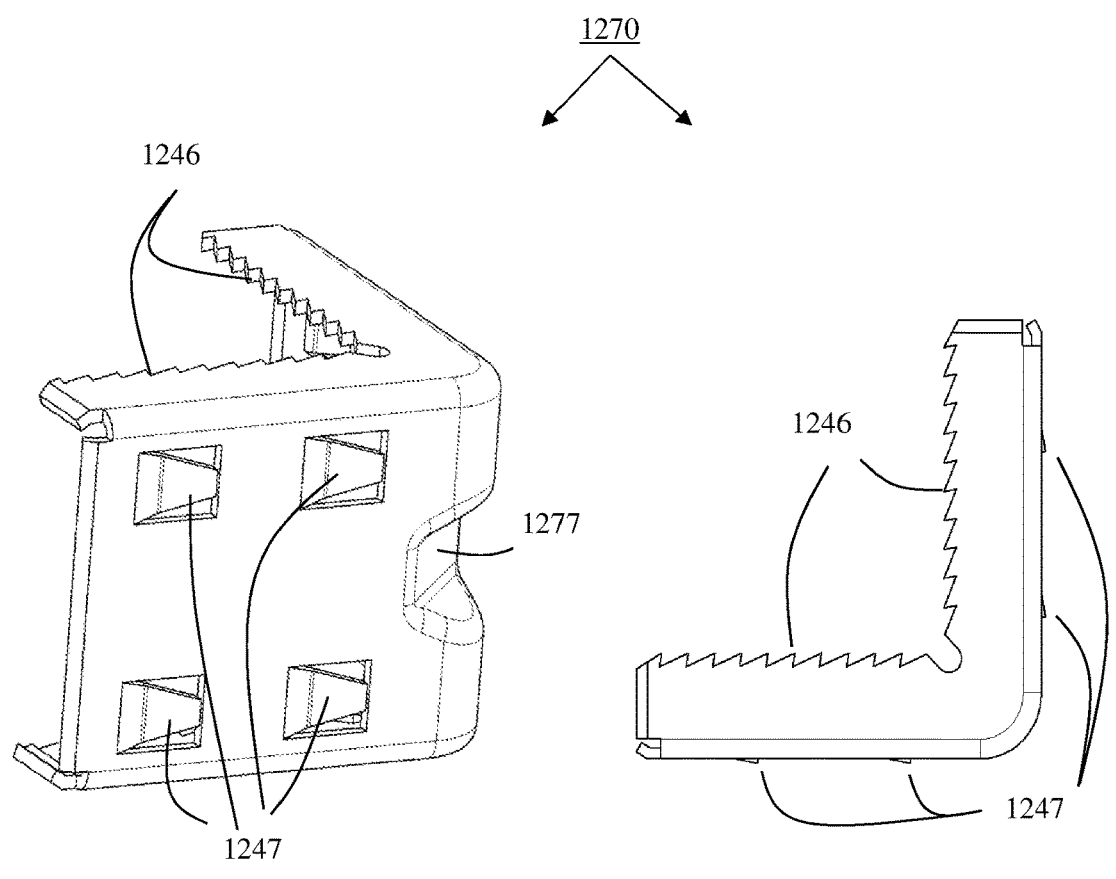
FIGS. 12A-12C illustrate a non-limiting example of a corner insert according to some embodiments.
Figure 12C:
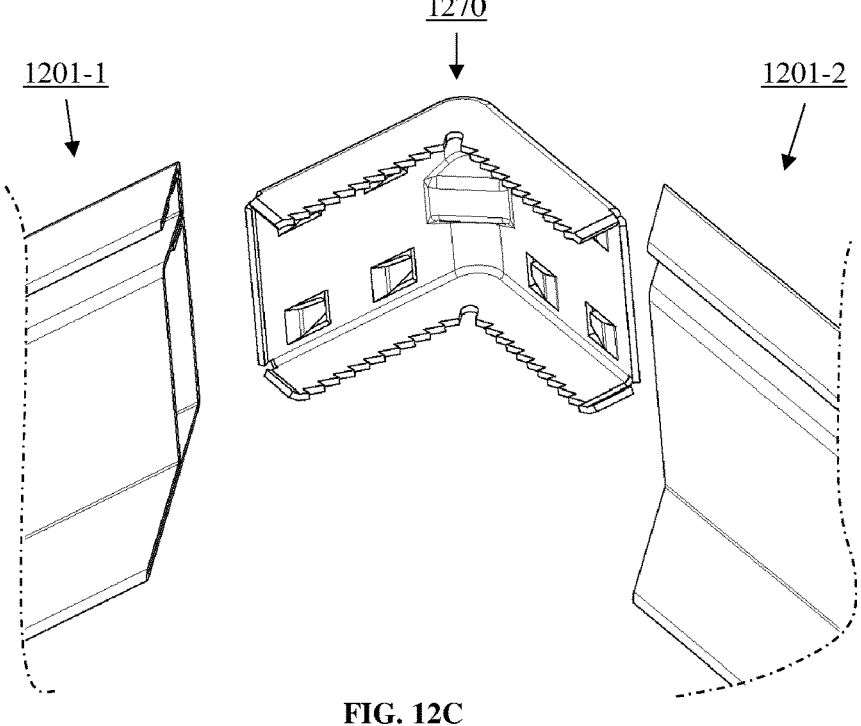

FIGS. 12A-12C illustrate another non-limiting example of an open-type corner insert according to some embodiments. The approach may be generally similar to that described in FIGS. 11A-11D, so only a few part features are labelled (the rest are self-evident from earlier figures), and only key differences are discussed here. FIG. 12A is a perspective view of corner insert 1270, FIG. 12B is a top view of corner insert 1270, and FIG. 12C shows corner insert 1270 with respect to first frame section 1201-1 and second frame section 1201-2. Corner insert 1270 may include one or more spring tabs 1247 on the insert walls. The edges of the bottom flaps and/or top flaps may include serrated teeth 1246 or similar engagement features. The corner insert may further include a lateral indent 1277.

The respective first and second portions of corner insert 1270 may be designed to fit at least partially into the first and second frames space collectively formed by their respective bottom flange, frame sidewall, panel containment structure, and support wall. In some cases, the dimensions of the corner insert may be such that the insert walls may be flush, near flush or provide some interference with the frame sidewall, the bottom flaps may be flush, near flush or provide some interference with the bottom flanges, and/or the top flaps may be flush with lower shelves. The spring tabs may push against the frame sidewall to aid in locking or holding the components together. In some embodiments, the frame sidewall may include holes or grooves that may catch the end of a spring tab to further assist in holding components in place. The serrated teeth at the top and bottom flap edges may engage the support wall of the frame sections to aid in locking or holding components together. The support wall may include holes or grooves to catch the serrated teeth and further assist in holding components in place.

Figure 17A:
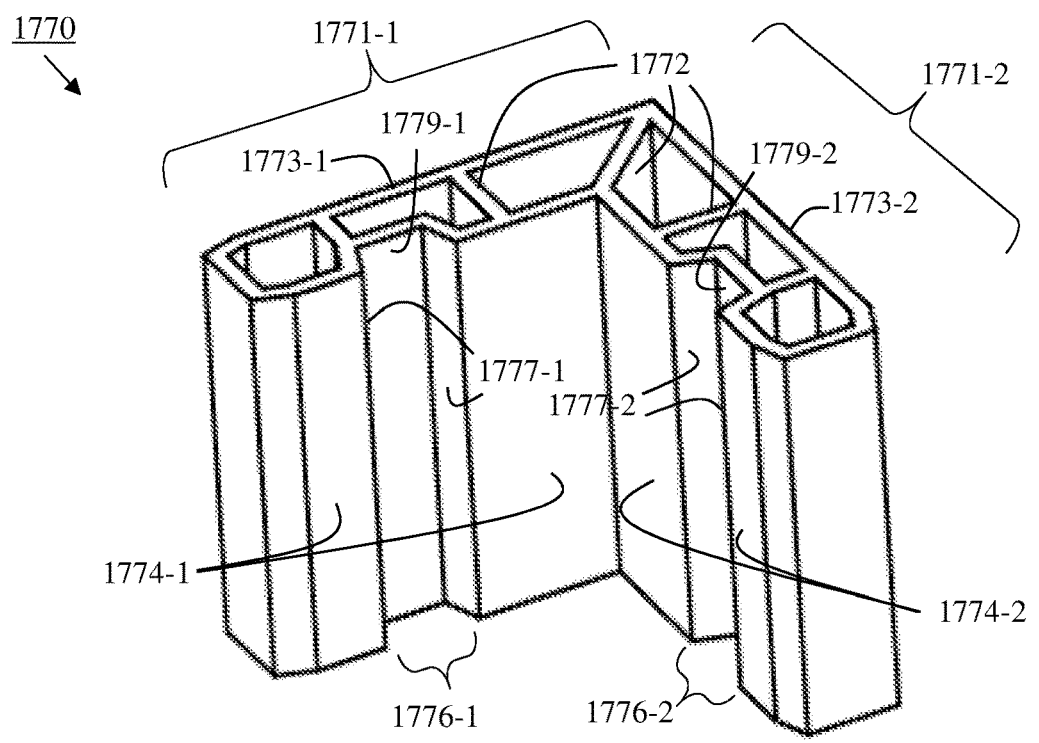
FIGS. 17A-17H are various views of a non-limiting example of a corner insert and its use according to some embodiments.

FIGS. 17A-17H are various views of a non-limiting example of a corner insert and its use according to some embodiments. FIG. 17A shows a corner insert 1770 having a first portion 1771-1 provided at an angle to second portion 1771-2. For example, for a rectangular or square frame, the angle formed by first portion 1771-1 and second portion 1771-2 may be about 90°. The corner insert may be characterized as having outer walls 1773-1, 1773-2 and inner walls 1774-1, 1774-2. In some embodiments, corner connector 1770 may be partially hollow but include internal support structure elements 1772 as might be formed, e.g., by an extrusion process using an extrusion die. In some cases, corner insert 1770 may be formed of an extruded material such as a metal or metal alloy (e.g., one including aluminum, copper, steel, lead, or the like), a polymer, a ceramic, a composite, or some other extrudable material. The material could also be injection molded or cast. The corner insert with the features to accept the tabs may be made of folded steel. Corner insert 1770 may include one or more hole features 1776-1, 1776-2 which may be in the form of a vertical channels or recesses provided in the inner wall 1774-1 of the first portion 1771-1 and the inner wall 1774-2 of the second portion 1771-2, respectively. The hole features (channels, recesses) are shown extending from top to bottom, but in some embodiments, the recess may instead extend only partially along the inner walls. As shown later, the channels have sidewalls 1777-1, 1777-2 that can catch or otherwise interact with tabs, e.g., from a tab precursor structure on a sidewall or support wall of a frame section, to assist in locking together various elements of a connection such as a corner joint. In some embodiment, the hole features may include a channel back wall 1780-1, 1780-2. As with the hole features 1776-1, 1776-2, the sidewalls, 1777-1 and 1777-2 may in some embodiments not extend from top to bottom but may be partial or intermittent.

Figure 17B:
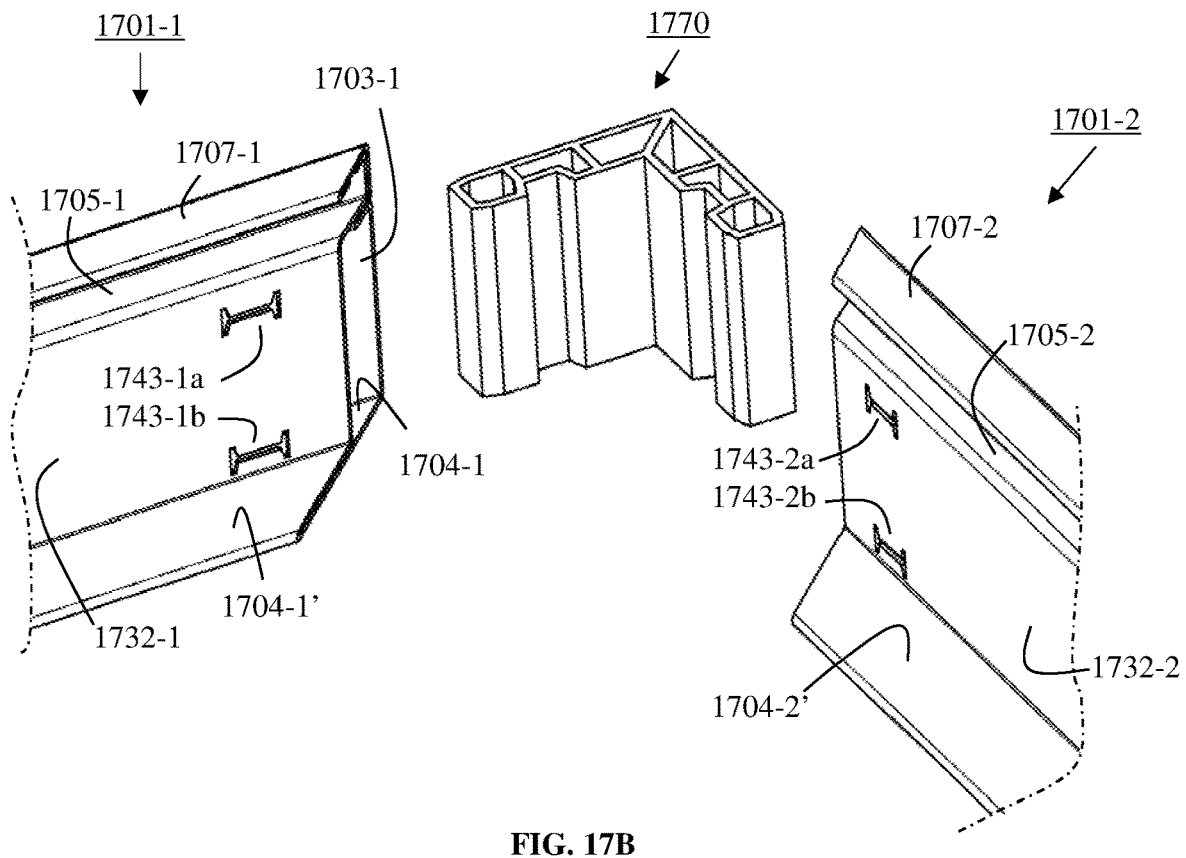

Turning to FIG. 17B, corner insert 1770 is shown along with first frame section 1701-1 and second frame section 1701-2, each of which may optionally have structure similar to the frame sections of FIGS. 5A and 5B. For visual reference, some of the frame features are labelled in FIG. 17B and/or later figures, including frame sidewall 1703-1, 1703-2, bottom flange 1704-1, 1704-2, bottom flange doubled portion 1704-1', 1704-2' lower shelf 1705-1, 1705-2, (part of the panel containment structure), supplemental lower shelf 1705-1', 1705-2' (considered part of the lower shelf), pocket sidewall 1706-1, 1706-2, top lip 1707-1, 1707-2, and support wall 1732-1, 1732-2. Frame sidewall and bottom flange for the second frame section are not visible in FIG. 17B. The first portion 1771-1 of corner insert 1770 may be designed to fit at least partially into the first frame space collectively formed by the first frame section's bottom flange, frame sidewall, panel containment structure, and support wall. In some cases, the dimensions of the corner insert may be such that the inner wall 1774-1 may be flush, near flush or provide some interference with support wall 1732-1, outer wall 1774-1 may be flush, near flush or provide some interference with frame sidewall 1703-1, the bottom of the first region 1771-1 may be flush, near flush or provide some interference with bottom flange 1704-1, and/or the top of first region 1771-1 may be flush, near flush or provide some interference with lower shelf 1705-1 or 1705-1'. The second portion 1771-1 of corner insert 1770 may be designed to fit at least partially into the second frame space collectively formed by the second frame section's bottom flange, frame sidewall, panel containment structure, and support wall. In some cases, the dimensions of the corner insert may be such that the inner wall 1774-2 may be flush, near flush or provide some interference with support wall 1732-2, outer wall 1774-2 may be flush, near flush or provide some interference with frame sidewall 1703-2, the bottom of the first region 1771-2 may be flush, near flush or provide some interference with bottom flange 1704-2, and/or the top of first region 1771-2 may be flush, near flush or provide some interference with lower shelf 1705-2 or 1705-2'.

Figure 17C:
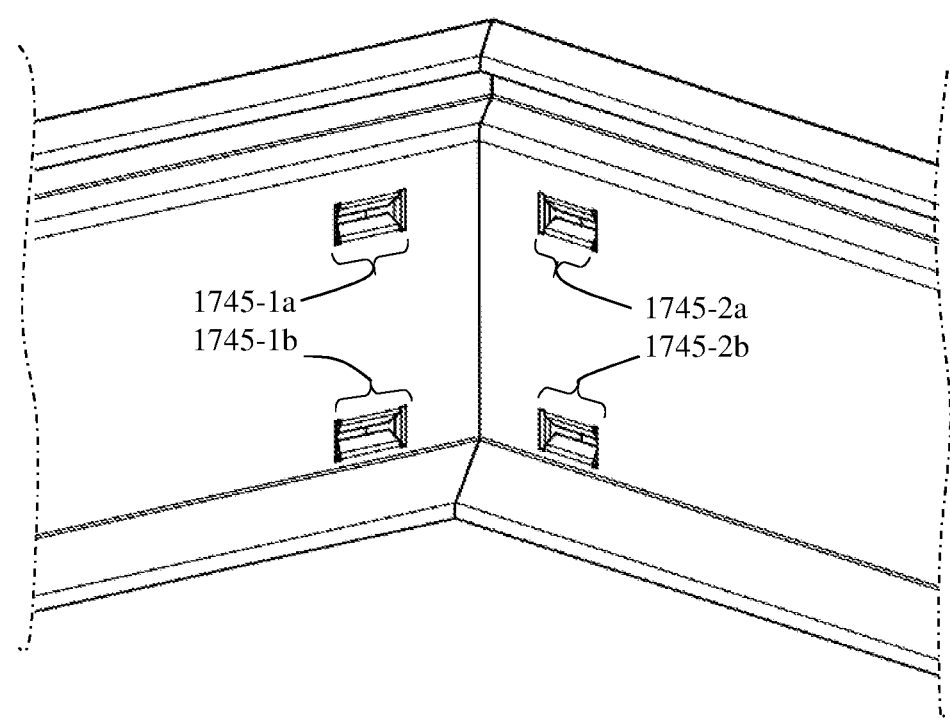
Figure 17D:
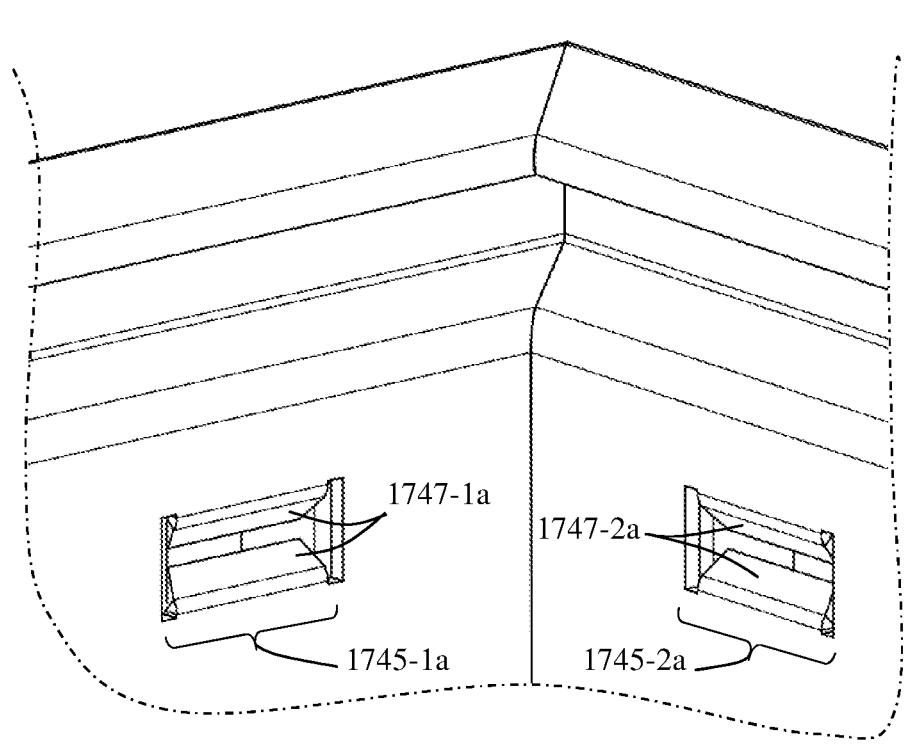

Support walls 1732-1, 1732-2 may include one or more tab precursor structures 1743-1a, 1743-1b, 1743-2a, 1743-2b that, upon frame assembly, may be designed to align with hole features (channels) 1776-1, 1776-2 of the corner insert. After alignment, and as shown in perspective view FIG. 17C, the tab precursor structures may be pressed into the hole features to form tab connector assemblies 1745-1a, 1745-1b, 1745-2a, 1745-2b. FIG. 17D is a zoomed in view of FIG. 17C showing the bent tabs 1747-1a, 1747-2a pushed into the hole features such that one or both edges of the bent tabs are adjacent to, catch or abut the channel sidewalls. The tab edges may contact one or both the channel side walls. If the tab only contacts the wall channel farthest from the corner, then the frame section may be pushed or pulled into the corner in a manner that may be similar to that described with respect to FIGS. 6H-6K. If this occurs on the adjacent frame sections, the frame sections may be forced together which may form a reduced corner seam and may strengthen the corner joint. This may also occur if both tab edges contacted the channel sidewalls but the tab edge farther from the corner were pushed in further.

Figure 17E:
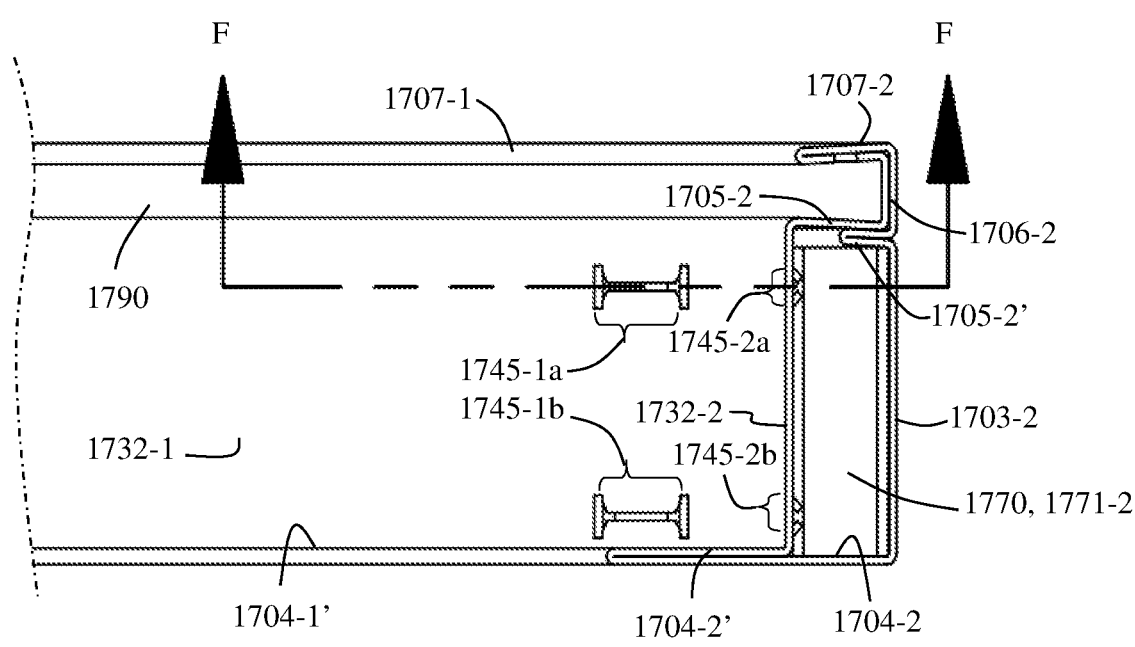
Figure 17F:
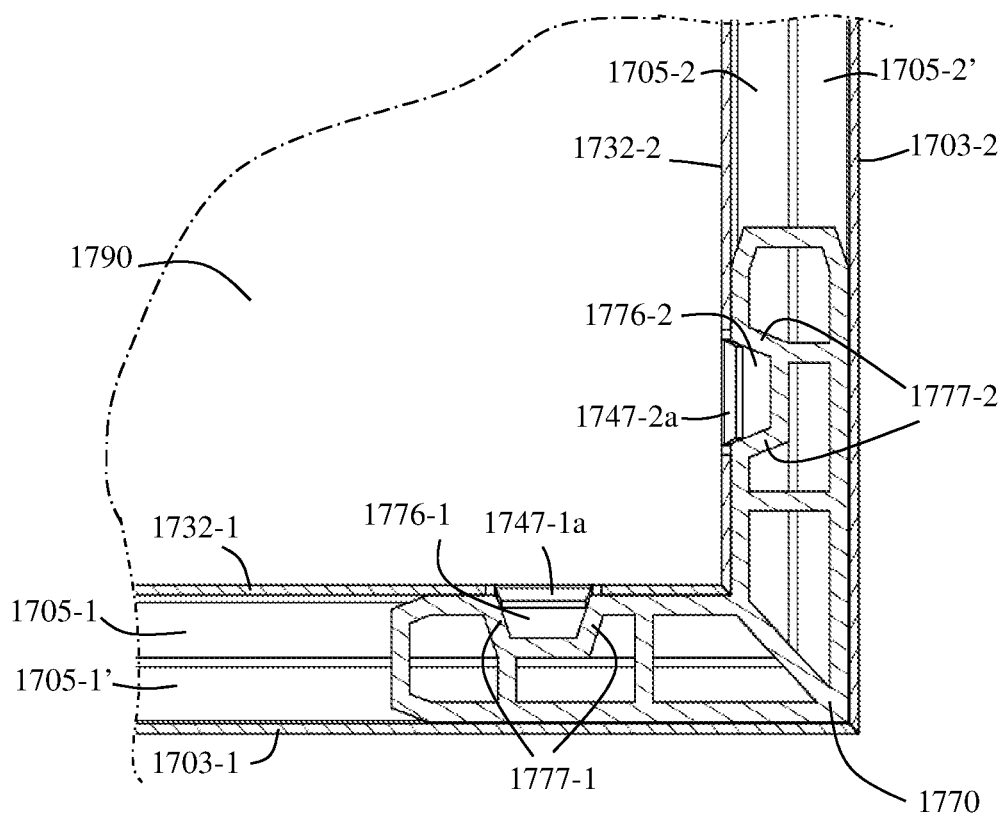

FIG. 17E is a partial cutaway of the connected frame structure edge-on with respect to the lengthwise direction of the second frame section. For completeness, FIG. 17E further illustrates panel 1790 seated in a panel containment structure which may include lower shelf 1705-2, supplemental lower shelf 1705-2, pocket wall 1706-2, and top lip 1707-2. FIG. 17F is a sectional view taken along cutline F-F from FIG. 17E. This view is taken from below, i.e., "looking up" at the section. In some embodiments, as shown in FIG. 17F, the bent tabs 1747-1a and 1747-2a may contact respective sidewalls 1777-1, 1777-2 of the respective hole features (channels) 1776-1, 1776-2. In some embodiments, only one edge of a bent tab may contact a hole feature sidewall. In some embodiments, as shown in FIG. 17F, the bent tabs 1747-1a, 1747-2a may not extend all the way to the channel back wall 1779-1, 1779-2. In some other embodiments, one or more bent tabs may extend all the way to the channel back wall.

Figure 17G:
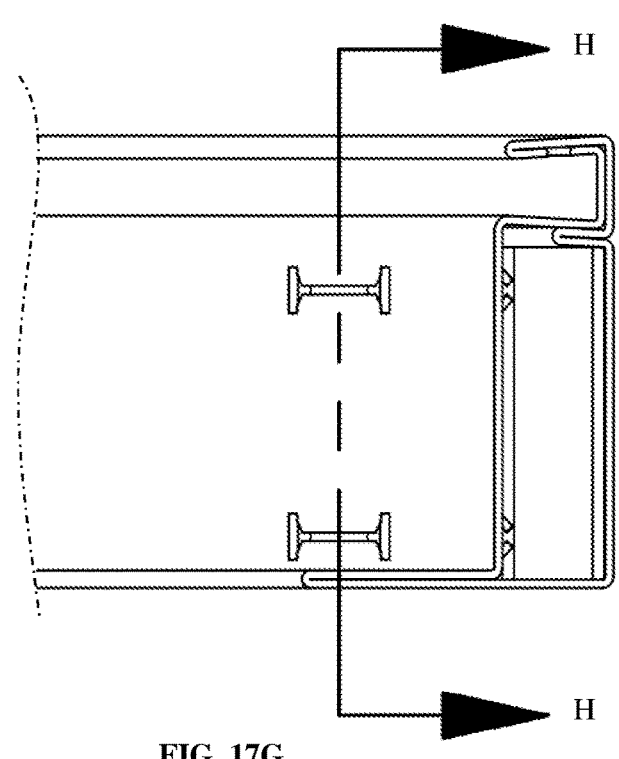
Figure 17H:
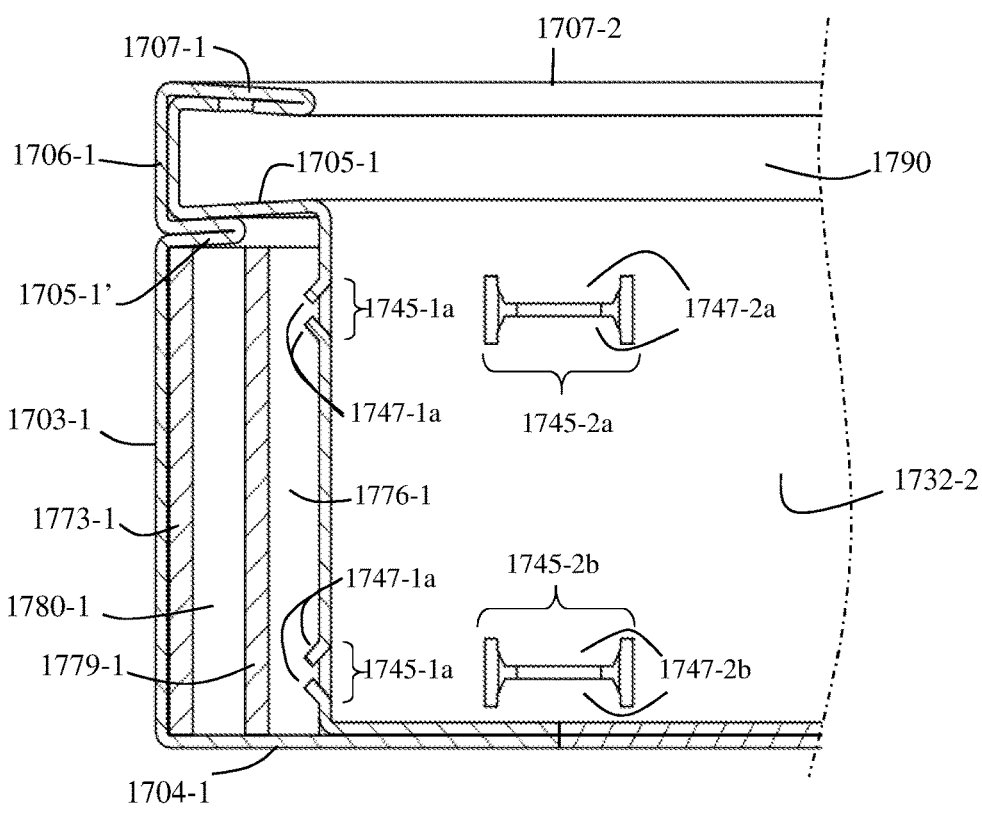

FIG. 17G is the same as FIG. 17E and so it is not labelled, but it shows a different cutline H-H which is orthogonal to cutline F-F. FIG. 17H is a section view taken along cutline H-H from FIG. 17G. The various features have been previously discussed except to note that 1780-1 corresponds to the open space between the corner insert's outer wall 1773-1 and channel back wall 1779-1.

It should be noted that, with minor modifications as a skilled person would understand, corner inserts may be employed at corner bends to help lock the two adjacent frame sections together in position.

Figure 13A:
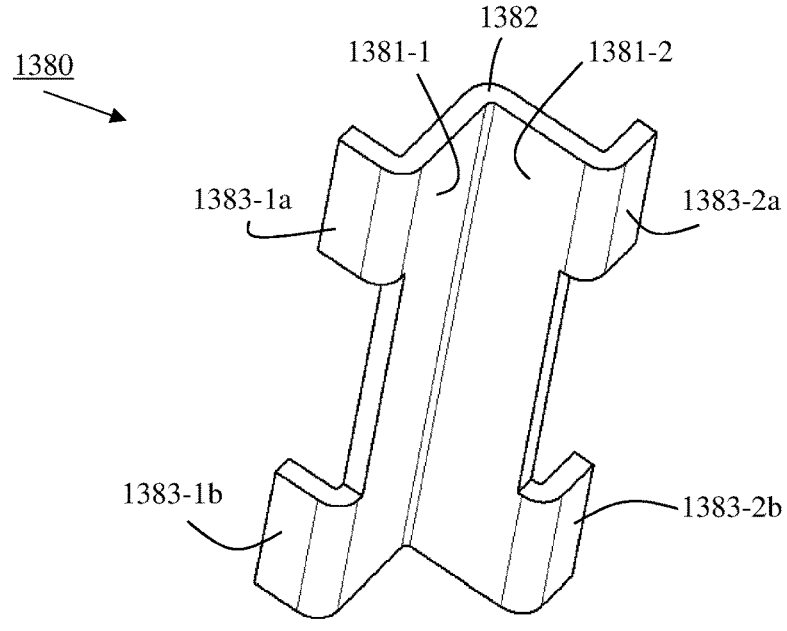
FIGS. 13A-13E illustrate a non-limiting example illustrating the use of an inside corner connector element to form a corner joint according to some embodiments.
Figure 13B:
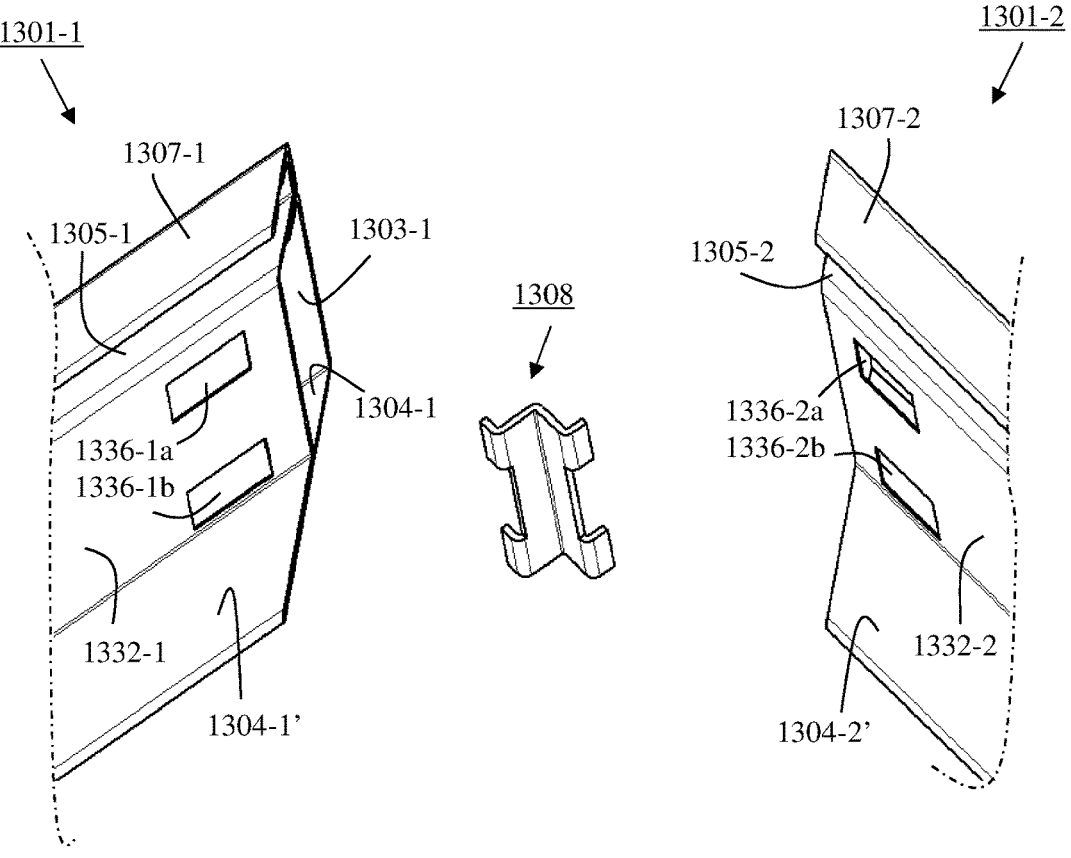
Figure 13C:
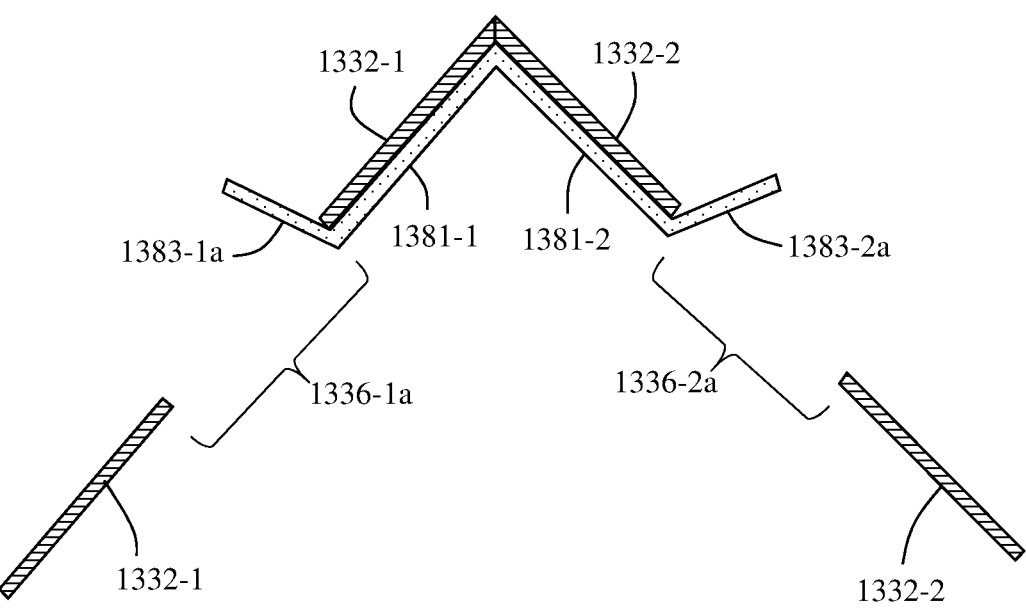

In some embodiments, frame sections may be connected by using one or more corner connector elements that may be provided on an inside corner or outside corner formed by the two frame sections. FIGS. 13A-13C illustrate a non-limiting example illustrating the use of an inside corner connector element to form a corner joint according to some embodiments. FIG. 13A is a perspective view of corner connector element 1380 which may include a fold 1382 defining a first connector wall 1381-1 and second connector wall 1381-2. In some embodiments, the two connector walls may form an angle similar to that of two frame sections to be joined (corner joint angle). For example, for a rectangular or square frame, the angle formed by the connector walls may be about 90°. Corner connector 1380 element may include one or more (optionally bendable) connector tabs 1383-1a, 1383-1b, 1383-2a, 1383-2b, attached to, or formed from, the respective first and second connector walls 1381-1, 1382-2. The connector tabs may optionally be partially bent or angled (as shown in these figures) or alternatively may extend in the same plane as the corner walls and bent later. Corner connector element 1380 may optionally be characterized as an "inside corner connector element".

In some embodiments, the corner connector element may be fabricated from metal (including but not limited to stainless steel, coated steel, aluminum, or the like), e.g., using progressive die cutting/shaping or even casting. In some embodiments, the corner connector element may be made from or include plastic, fiberglass, or a composite material. Any material may be used that has suitable strength and optionally suitable bendability. In some cases, the corner connector element may also act as an electrical conduit between the first and second frame sections.

Referring to FIG. 13B, corner connector element 1380 is shown along with first frame section 1301-1 and second frame section 1301-2, each of which may optionally have structure similar to the frame sections of FIGS. 5A and 5B. For visual reference, some of the frame features are labelled, including frame sidewall 1303-1, bottom flange 1304-1, doubled bottom flange portion 1304-1', 1304-2' lower shelf 1305-1, 1305-2 (part of the panel containment structure), top lip 1307-1, 1307-2, and support wall 1332-1, 1332-2. Frame sidewall and bottom flange for the second frame section are not easily visible in this view. The support walls may include one or more hole features 1336-1a, 1336-1b, 1336-2a, 1336-2b.

Figure 13D:
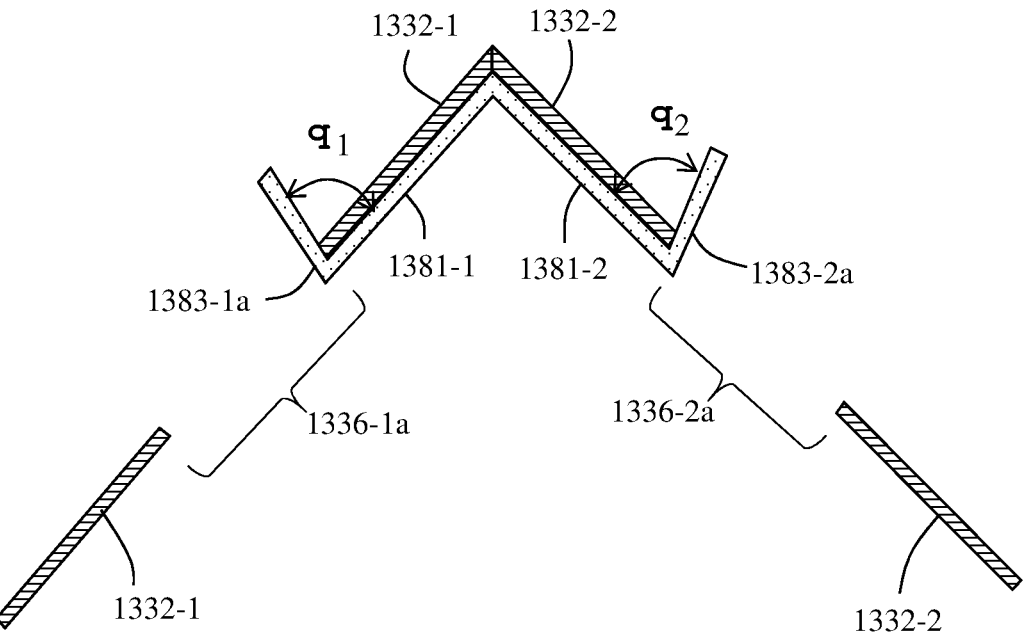
Figure 13E:
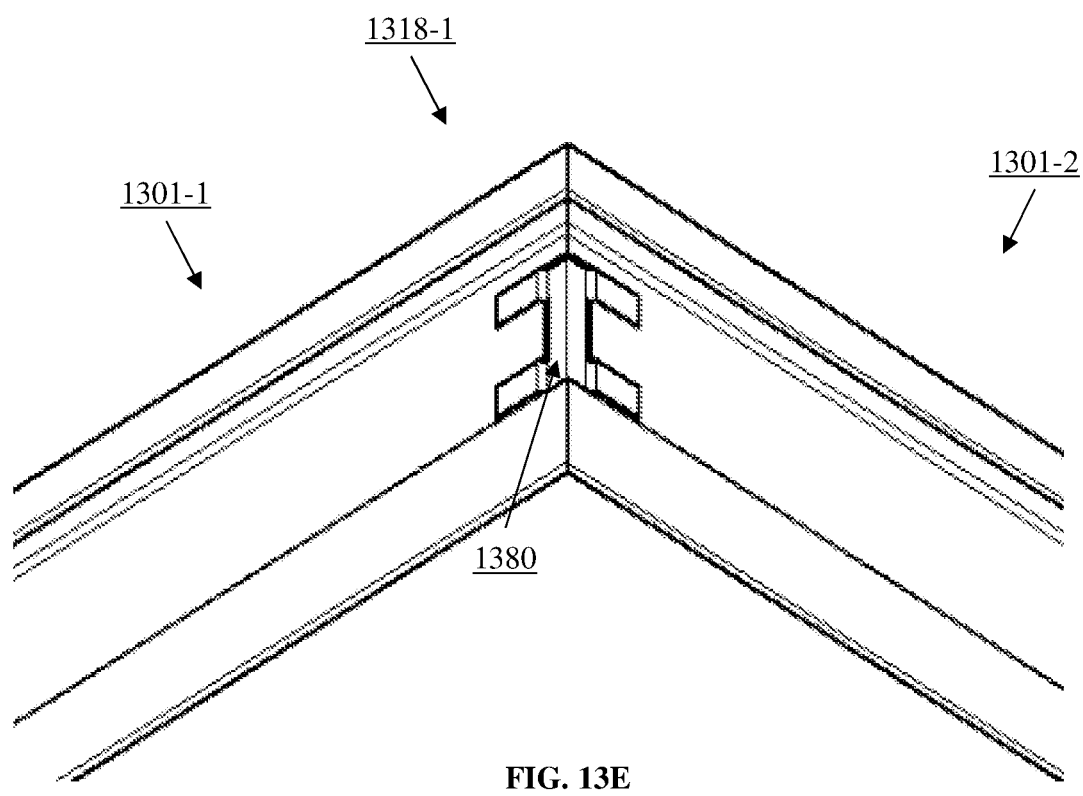

When forming a corner joint, the frame sections are moved together, and the corner connector element may be provided flush into the corner formed by the two support walls of the frame section. For example, FIG. 13C is a cross-sectional view taken horizontally across the two frame sections' support walls and the corner connector element according to some embodiments. Specifically, this cross section is across hole features 1336-1a and 1336-2a and may represent an intermediate stage of assembly where the frame sections are not yet locked in place As shown in FIG. 13C, corner wall 1381-1 may be flush against support wall 1332-1 and corner wall 1381-2 may be flush against support wall 1332-2. The connector tabs may extend or be pushed into hole features (1383-1a into 1336-1a, 1383-2a into 1336-2a). Although not shown in FIG. 13C, connector tab 1383-1b may also extend into hole feature 1336-1b, and connector tab 1383-2a into hole feature 1336-2a. In some embodiments as shown in FIG. 13D, the connector tabs may be further bent or knurled, e.g., to form an angle $q_1$, $q_2$ relative to the corner wall that may be about 90° or less, alternatively less than 80°, 70°, 60°, 45°, or even less than 30°. In some cases, such bending or knurling may help lock the elements in place. In some embodiments, the connector tab may be bent or wrapped around the hole feature edge so that it makes contact with the opposite side of the frame section's support wall which may better stabilize the connector element. In some embodiments (not shown) the hole feature may have a lip extending into the frame space and the connector tab may wrap around the lip. The completed corner joint formed between the first frame section 1301-1 and the second frame section 1301-2 using corner connector element 1380 (after bending the connector tabs) is shown in FIG. 13E. For clarity, most features are not labeled but are self-evident from the preceding figures.

In some embodiments when forming corner joints in square or rectangular frames, the connector tabs on one side of the corner connector element, e.g., those attached to the first connector walls such as 1383-1a and 1383-1b, may be pre-angled to form an acute angle that may be equal to or even substantially less than about 45° with the respective first corner wall, whereas the connector tabs on the other side of the corner connector element, e.g., those attached to the second connector walls such as 1383-2a and 1383-2b, may have no pre-bend, or alternatively include a pre-bend forming an angle that may be greater than 45° relative to the second corner wall. Upon assembly of the corner joint, optionally only the connector tabs 1383-2a and 1383-2b may be further bent to secure the components in place (i.e., the first connector tabs 1383-1a and 1383-1b may already be sufficiently angled or bent). In some embodiments, if all connector tabs are pre-angled, they may form an angle with the respective corner wall that may be at least 45° so that there is no problem inserting the connector tabs into the hole features.

In some embodiments prior to frame assembly, a corner connector element 1380 may be first attached to the first frame section 1301-1, for example, by tightly folding connector tabs 1383-1*a* and 1383-1*b* around the edges of hole features 1336-1*a* and 1336-1*b*, respectively, so that the tabs essentially contact the backside of the support wall and hold the connector element in place. When the frame is assembled, e.g., in a manner that might be similar to that shown in FIG. 3 or 2E, and the first frame section meets the second frame section, the second set of connector tabs 1383-2*a* and 1383-2*b* (which may optionally initially have no bend), may then be bent through hole features 1336-2*a* and 1336-2*b*, respectively, to form a corner joint.

Although the inside corner connector element is shown joining first and second support walls, it may instead connect first and second frame sidewalls, or they may engage with the top and/or bottom surfaces frame walls, or may engage one or more of these four surfaces in any combination including but not limited to side-to-side, top-to-side, . . . etc. Numerous alternative embodiments exist that may use different connection mechanisms or engagement features. For example, rather using than connector tabs with hole features, the inside corner connector element and frame section wall (support wall or sidewall) may utilize other tab connection assemblies including, but not limited to, those based on spring tabs, press fit tabs, and tab precursor structures as previously discussed. The inside corner connector element may further include features that engage the bottom flange and/or the lower shelf (containment structure) of the frame section. For example, a corner connector element may include an extension that fits into a hole or slot provided in the bottom flange. In some embodiments, the location of the hole feature(s) and connector tab(s) may be reversed. That is, one or more hole features may be provided as part of the inside connector element and one or more connector tabs may be provided on the frame sidewalls or support walls.

Figure 13F:
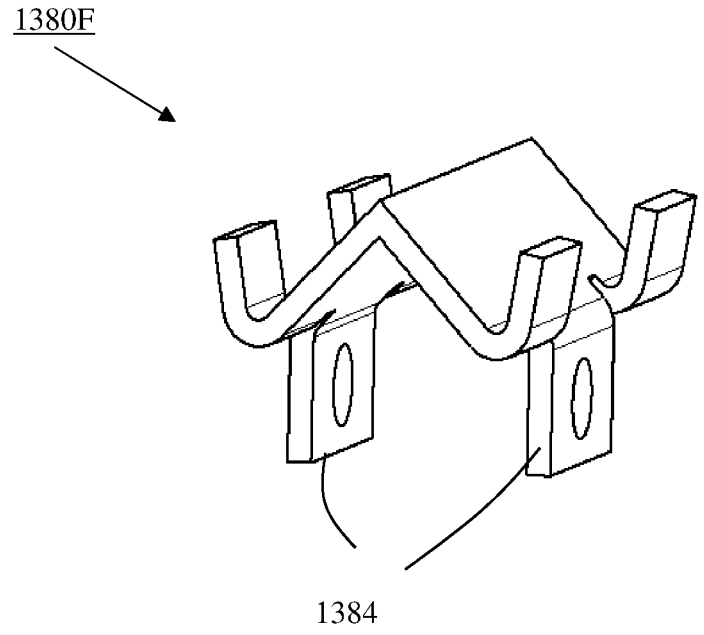
FIG. 13F is a non-limiting example of a corner connector with handling features according to some embodiments.

In some cases, the inside corner connector element may include serrations, dimples, or non-smooth textures that may assist in creating structural and/or electrical bonds to the frame sections. In some cases, a corner connector element may seat into slots without needing further deformations or bends. In some embodiments, a corner connector element may include features to improve handling, e.g., to improve robotic handling. A non-limiting example of a corner connector element 1380F with handling features 1384 is shown in FIG. 13F.

Figure 14A:
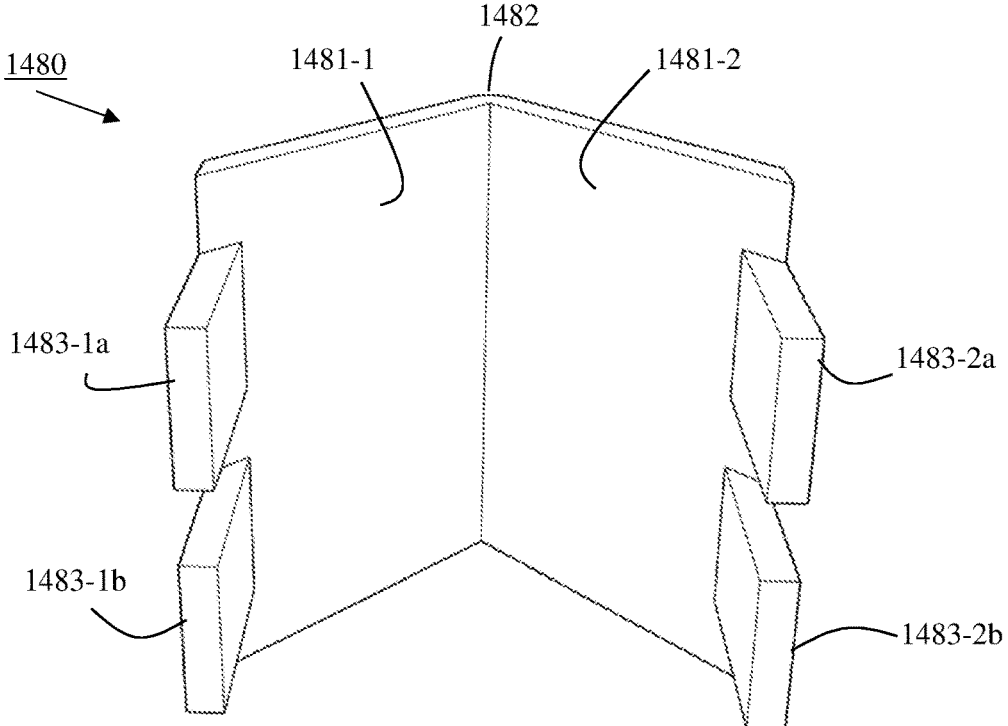
FIGS. 14A-14D are a non-limiting examples of an outside corner connector according to some embodiments.

In some embodiments, the corner connector element may be characterized as an outside corner connector element. FIG. 14A is a non-limiting example of an outside corner connector according to some embodiments. Corner connector element 1480 which may include a fold 1482 defining a first connector wall 1481-1 and second connector wall 1481-2. In some embodiments, the two connector walls may form an angle similar to that of two frame sections to be joined. For example, for a rectangular or square frame, the angle formed by the connector walls may be about 90°. Corner connector 1480 element may include one or more (optionally bendable) connector tabs 1483-1*a*, 1483-1*b*, 1483-2*a*, 1483-2*b*, attached to, or formed from, the respective first and second connector walls 1481-1, 1482-2. The connector tabs may optionally already be at least partially angled (as shown in these figures) or alternatively may extend in the same plane as the corner walls. Corner connector element 1480 may optionally be characterized as an "outside corner connector element". Materials and fabrication methods may be similar to those described with respect to corner connector element 1380, as described above.

Figure 14B:
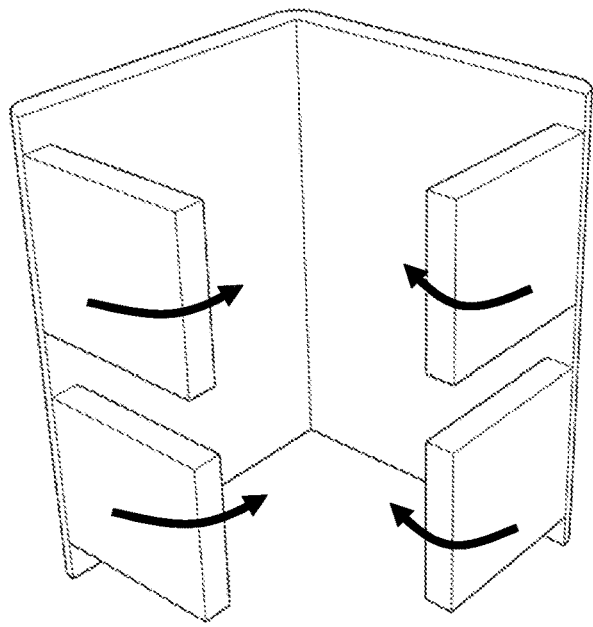
Figure 14C:
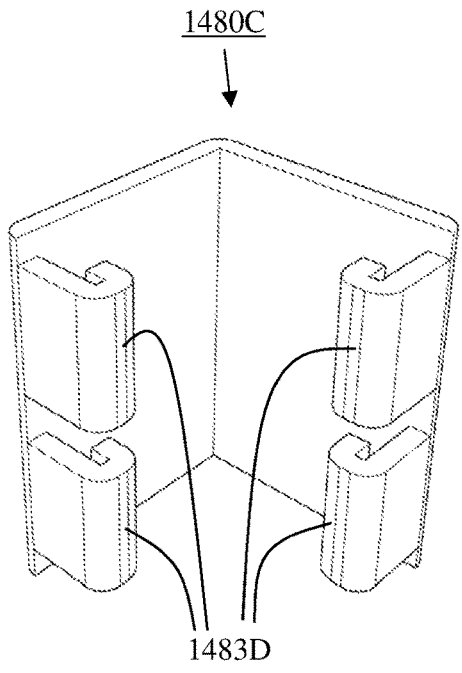

The outside corner connector element may be attached to first and second frame sections (not shown) to make a corner joint in a manner that may be similar to that described with respect to corner connector element 1380. For example, first and second frame sections may include hole features that align with the connector tabs. The two frame sections may be moved together and the corner connector element may be provided against the outside corner formed by the two frame sidewalls. The first corner wall 1481-1 may be flush against the first frame section frame sidewall and the second corner wall 1481-2 may be flush against the second frame section sidewall. Connector tabs may extend or be pushed into corresponding hole features provided in the frame sidewalls. In some embodiments, the connector tabs may be further bent or knurled, e.g., bent to form an angle relative to the corner wall that may be about 90° or less, alternatively less than 80°, 70°, 60°, 45°, or even less than 30°. In some embodiments, the connector tab may be bent or wrapped around the hole feature edge so that it makes contact with the opposite side of the frame section's sidewall. In some embodiments (not shown) the hole feature in the frame sidewall may have a lip extending into the frame space and the connector tab may wrap around the lip. FIG. 14B is a non-limiting example of the corner connector element 1480 after further bending the connector tabs (again, frame sidewall and hole features are not shown). A non-limiting example of a corner connection element 1480C after knurling the connector tabs (knurled connector tabs 1483D) is shown in FIG. 14C (frame sidewall and hole features are not shown).

In some embodiments prior to frame assembly, a corner connector element 1480 may be first attached to the first frame section, for example, by tightly folding connector tabs 1483-1*a* and 1483-1*b* around the edges of respective hole features in the first frame section sidewall, so that the tabs essentially contact the backside of the frame sidewall and hold the connector element in place. When the frame is assembled, e.g., in a manner that might be similar to that shown in FIG. 3 or 2E, and the first frame section meets the second frame section, the second set of connector tabs 1483-2*a* and 1483-2*b* (which may optionally initially have no bend), may then be bent through respective hole features in the second frame section sidewall to form a corner joint.

Figure 14D:
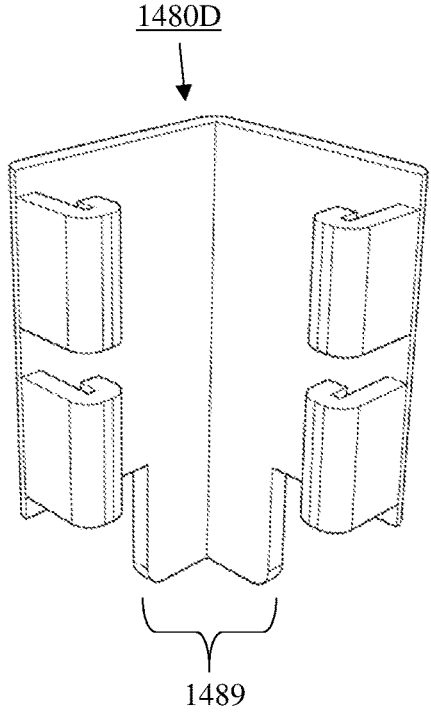

In some embodiments, an outside corner connector element may extend above or below the top or bottom plane of the PV module (framed panel structure). Such extensions may in some cases serve as spacers between PV modules in a stack. This may allow a stack of PV modules to be shipped without the frames rubbing against one another and avoid the need for separate shipping spacers that are discarded as waste or need recycling. The built-in spacers may allow installers to more easily get their fingers or other lifting apparatus between PV modules to pick them up. FIG. 14D shows a perspective view of a corner connector element 1480D that may include a spacer tab extension 1489. In another embodiment, the spacer tab extension may include engagement features designed to connect with complementary engagement features provided on racking.

Numerous alternative embodiments exist that may use different connection mechanisms or engagement features. For example, rather than using bent connector tabs with hole features, the outside corner connector element and frame section sidewall may utilize other tab connection assemblies including, but not limited to, those based on spring tabs, press fit tabs, and tab precursor structures as previously discussed. The outside corner connector element may further include features that engage the bottom flange and/or other frame features. For example, an outside corner connector element may include an extension that bends around to fit into a hole or slot provided in the bottom flange. In some embodiments, the location of the hole feature(s) and connector tab(s) may be reversed. That is, one or more hole features may be provided as part of the outside connector element and one or more connector tabs may be provided on the frame sidewalls or support walls.

In some cases, the corner connector element may include serrations, dimples, or non-smooth textures that may assist in creating structural and/or electrical bonds to the frame sections. In some cases, a corner connector element may seat into slots without needing further deformations or bends. In some embodiments, a corner connector element may include features to improve handling, e.g., to improve robotic handling.

In some embodiments, a corner connector element may be used to help secure or lock in place a corner bend between two contiguous frame sections.

Figure 15A:
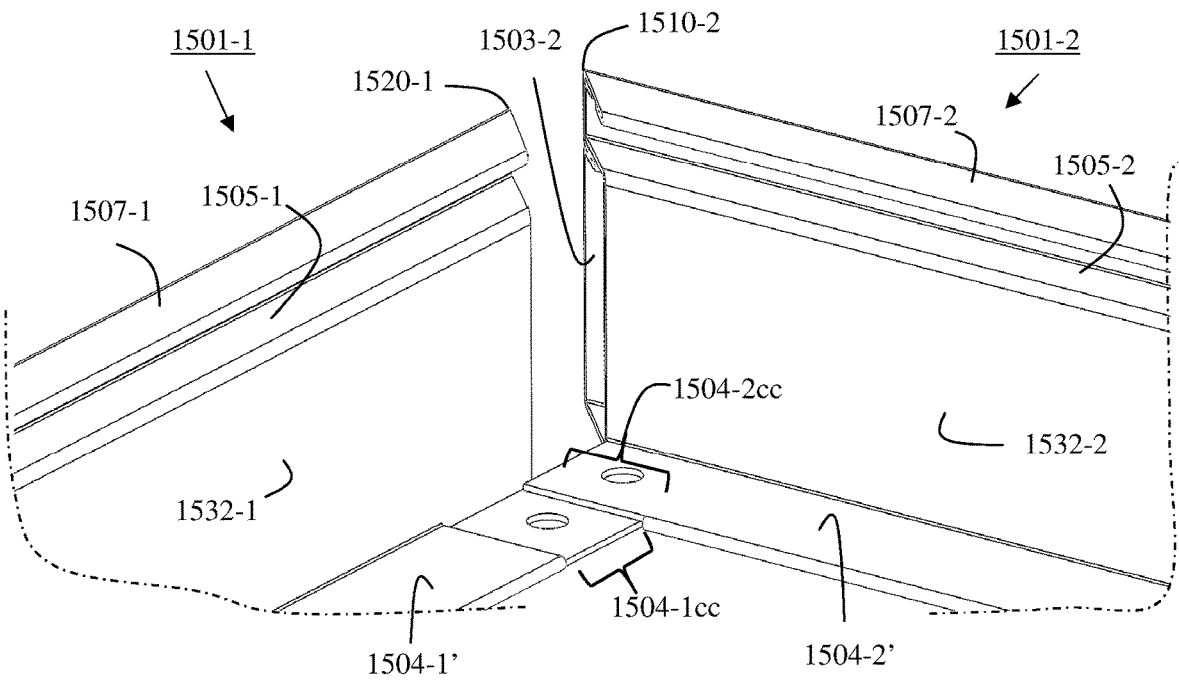
FIGS. 15A and 15B are perspective views of a non-limiting example of frame sections employing a bottom flange corner connection assembly according to some embodiments.
Figure 15B:
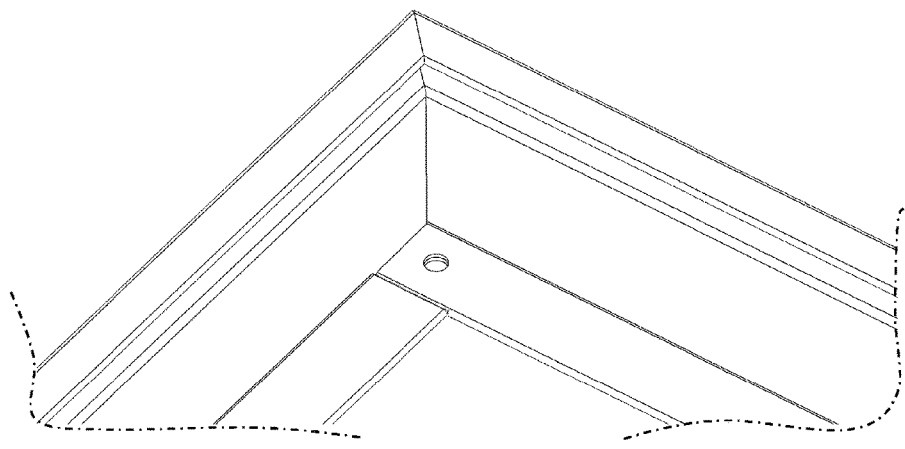

In some embodiments, a bottom flange may be designed to secure or lock a corner. FIGS. 15A and 15B are a perspective view of a non-limiting example of frame sections employing a bottom flange corner connection assembly according to some embodiments. Referring to FIG. 115A, first frame section 1501-1 and second frame section 1501-2 each may optionally have structure similar to the frame sections of FIGS. 5A and 5B. For visual reference, some of the frame features are labelled, including frame sidewall 1503-2, doubled bottom flange portion 1504-1', 1504-2' lower shelf 1505-1, 1505-2 (part of the panel containment structure), top lip 1507-1, 1507-2, and support wall 1532-1, 1532-2. Also labelled is the second end of first frame section 1520-1 and the first end of second frame section 1510-2. Not all frame section features are easily visible in this view. The doubled bottom flange portions may each be characterized as having an upper layer and lower layer of framework material.

A portion of the upper layer of the doubled bottom flange portion 1504-1' has been cut away to form a corner connector bottom flange element 1504-1cc. Similarly, a portion of the lower layer of doubled bottom flange portion 1504-2' has been cut away to form a complementary corner connector bottom flange element 1504-2cc. Each corner connector bottom flange element may optionally include additional features that may aid in securing a corner upon assembly. In FIG. 15A, holes are illustrated but be clinches or any number of alternative engagement features may be used.

FIG. 15B illustrates the two frame sections upon assembly to form a corner joint such that the 1504-1cc slips underneath 1504-2cc and their optional holes are in alignment. 1504-1cc and 1504-2cc may collectively be referred to as a bottom flange corner connection assembly. The corner joint may already be locked, but alternatively, the overlapping corner connector bottom flange elements may be connected together in any suitable manner including, but not limited to, using a clinch, rivet, screw, bolt, weld or a tab connection assembly approach.

In some embodiments, a bottom flange corner connection assembly may be used at a corner bend (instead of a corner joint) to assist in securing or locking two contiguous frame sections in place.

Numerous methods, materials, and structures ("connection technologies") have been discussed herein for making connections between frame sections or between a frame section and another connectable element. Any of these connection technologies may be used singly or in combination with one or more other connection technologies disclosed herein, or even in combination with alternative connection methods, e.g., conventional connection methods.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal (coated or uncoated).

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or non-flat. For example, one or more of these features may include one or more curves or additional bends and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or an additional anti-corrosion coating treatment including, but not limited to, those already discussed.

In some embodiments, in areas where multiple layers of framework material are formed, such areas may optionally include a bonding feature to hold the layers together. Some non-limiting examples of bonding features may include a crimp, a clinch, an interlocking feature between the layers, double-sided adhesive tape, an adhesive, a weld, a braze, a solder, or the like. In some embodiments, an anticorrosion coating may also have adhesive properties and act as a bonding feature.

Still further embodiments herein include the following enumerated embodiments. The term "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of ").

ENUMERATED EMBODIMENTS

Enumerated embodiment 1. A frame for at least partially enclosing or supporting a panel, the frame including at least a first frame section, the first frame section including:
  a) an elongated piece of framework material having a first end and a second end, wherein the first and second ends define a lengthwise dimension;
  b) a lengthwise fold defining an intersection of a frame sidewall with a bottom flange, wherein the frame sidewall is characterized by a height extending from the bottom flange; and
  c) a portion of at least one tab connection assembly where a connected element is attached to the first frame section, wherein the tab connection assembly includes i) at least
one tab feature provided as part of either the first frame
section or the connected element, and ii) at least one
corresponding hole feature provided as part of the other
of the first frame section or the connected element,
wherein the hole feature lockingly receives the at least
one tab feature,
and wherein the connected element includes another
frame section, a cross bar, or a racking structure.

Enumerated embodiment 2. The frame of enumerated
embodiment 1 or any other enumerated embodiment,
wherein the hole feature includes a slot.

Enumerated embodiment 3. The frame of enumerated
embodiment 2 or any other enumerated embodiment,
wherein the slot defines a connection plane orthogonal to a
first surface including the hole feature.

Enumerated embodiment 4. The frame of enumerated
embodiment 3 or any other enumerated embodiment,
wherein the tab feature includes a spring tab element that is
bent out of the connection plane and wherein the tab feature
extends at least partially through the slot such that an end of
the spring tab element engages the structure including the
slot on a second surface opposite the first surface.

Enumerated embodiment 5. The frame according to any
of enumerated embodiments 1-3 or any other enumerated
embodiment, wherein the tab feature includes a press tab
element that extends at least partly through the hole feature.

Enumerated embodiment 6. The frame of enumerated
embodiment 5 or any other enumerated embodiment or any
other enumerated embodiment, wherein a surface including
the hole feature include one or more flap elements that
engage the press tab element.

Enumerated embodiment 7. The frame according to any
of enumerated embodiments 1-3 or any other enumerated
embodiment, wherein the tab feature extends at least par-
tially through the hole feature and includes a bend at the
interface with the hole feature.

Enumerated embodiment 8. The frame according to any
of enumerated embodiments 1-3 or 7 or any other enumer-
ated embodiment, wherein the tab feature is formed from a
tab precursor structure provided in a surface adjacent to a
surface having the hole feature.

Enumerated embodiment 9. The frame of enumerated
embodiment 8 or any other enumerated embodiment,
wherein the tab precursor structure includes one or more
flaps, and wherein at least one flap is characterized by a flap
edge that, when pushed into the hole feature, engages an
edge of hole feature.

Enumerated embodiment 10. The frame of enumerated
embodiment 9 or any other enumerated embodiment,
wherein the flap edge is about parallel to the edge of the hole
feature.

Enumerated embodiment 11. The frame of enumerated
embodiment 9 or any other enumerated embodiment,
wherein the flap edge is provided at an angle relative to the
edge of the hole feature.

Enumerated embodiment 12. The frame of enumerated
embodiment 11 or any other enumerated embodiment,
wherein an action of pushing the flap into the hole feature
causes relative movement of the surface having the hole
feature which tightens the connection of the frame section
with the connected element.

Enumerated embodiment 13. The frame according to any
of enumerated embodiments 1-12 or any other enumerated
embodiment, wherein the first frame section further includes
a first panel containment structure at an upper portion of the
frame sidewall.

Enumerated embodiment 14. The frame of enumerated
embodiment 13 or any other enumerated embodiment,
wherein the first frame section further includes a support
wall extending from the first panel containment structure to
the bottom flange.

Enumerated embodiment 15. The frame of enumerated
embodiment 14 or any other enumerated embodiment,
wherein the support wall includes the at least one tab feature
or the at least one corresponding hole feature.

Enumerated embodiment 16. The frame according to any
of enumerated embodiments 1-15 or any other enumerated
embodiment, wherein the first frame and connected ele-
ments are connected by at least two tab connection assem-
blies.

Enumerated embodiment 17. The frame according to any
of enumerated embodiments 1-13 or any other enumerated
embodiment, wherein the connected element includes a
second frame section that forms a corner joint with the first
frame section.

Enumerated embodiment 18. The frame of enumerated
embodiment 17 or any other enumerated embodiment,
wherein the second frame includes:
  a) an elongated piece of framework material having a first
     end and a second end, wherein the first and second ends
     define a lengthwise dimension;
  b) a lengthwise fold defining an intersection of a second
     frame sidewall with a second bottom flange, wherein
     the second frame sidewall is characterized by a height
     extending from the second bottom flange; and
  c) another portion of the at least one tab connection
     assembly where the second frame section is attached to
     the first frame section.

Enumerated embodiment 19. The frame of enumerated
embodiment 18 or any other enumerated embodiment,
wherein the second frame section further includes a second
panel containment structure at an upper portion of the
second frame sidewall.

Enumerated embodiment 20. The frame section of enu-
merated embodiment 19 or any other enumerated embodi-
ment, wherein the second frame section further includes a
second support wall extending from the second panel con-
tainment structure to the second bottom flange.

Enumerated embodiment 21. A frame for at least partially
enclosing or supporting a panel, the frame including:
  a) a first frame section including:
     i) an elongated piece of framework material having a
        first end and a second end, wherein the first and
        second ends define a lengthwise dimension;
     ii) a lengthwise fold defining an intersection of a frame
        sidewall with a bottom flange, wherein the frame
        sidewall is characterized by a height extending from
        the bottom flange; and
     iii) a panel containment structure at an upper portion of
        the frame sidewall; and
     wherein at least the bottom flange, frame sidewall, and
        panel containment structure collectively form a
        frame space at least partially enclosed on at least
        three sides; and
  b) a second frame section including:
     i) an elongated piece of framework material having a
        first end and a second end, wherein the first and
        second ends define a lengthwise dimension;
     ii) a lengthwise fold defining an intersection of a frame
        sidewall with a bottom flange, wherein the frame
        sidewall is characterized by a height extending from
        the bottom flange;

iii) a panel containment structure at an upper portion of the frame sidewall; and iv) a fold in the frame sidewall orthogonal to the lengthwise dimension defining a sidewall extension member extending at an angle relative to the second frame sidewall, the sidewall extension member including a first engagement feature, wherein, the sidewall extension member is provided at least partially within the frame space of the first frame section such that the first engagement feature lockingly engages the first frame section.

Enumerated embodiment 22. The frame of enumerated embodiment 21 or any other enumerated embodiment, wherein the first frame section further includes a support wall extending between the panel containment structure and the bottom flange, and wherein at least the bottom flange, frame sidewall, panel containment structure and support wall collectively form a frame space at least partially enclosed on four sides.

Enumerated embodiment 23. The frame of enumerated embodiment 21 or enumerated embodiment 22 or any other enumerated embodiment, wherein the second frame section further includes a support wall extending between the panel containment structure and the bottom flange Enumerated embodiment 24. The frame of enumerated embodiment 23 or any other enumerated embodiment, wherein the second frame section further includes a fold in the support wall orthogonal to the lengthwise dimension defining a support wall extension member extending at an angle relative to the support wall, the support wall extension member including a second engagement feature, wherein the support wall extension member is provided at least partially within the frame space of the first frame section such that the second engagement feature lockingly engages the first frame section Enumerated embodiment 25. The frame according to any of enumerated embodiments 21-24 or any other enumerated embodiment, wherein at least one engagement feature includes a spring element that engages at least two opposing internal surfaces defining the frame space.

Enumerated embodiment 26. The frame according to any of enumerated embodiments 21-25 or any other enumerated embodiment, wherein at least one engagement feature includes serrated teeth elements Enumerated embodiment 27. The frame according to any of enumerated embodiments 21-26 or any other enumerated embodiment, wherein at least one engagement feature includes a high friction surface Enumerated embodiment 28. The frame according to any of enumerated embodiments 21-27 or any other enumerated embodiment, wherein at least one internal surface defining the frame space includes a hole or groove that cooperate with the engagement feature to provide locking engagement.

Enumerated embodiment 29. A method for joining two frame sections, the method including:

a) providing a first frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange; and iii) a first set of interlocking tab precursors provided at a frame sidewall end, wherein the first set of interlocking tab precursors include a first series of longer and shorter tabs inwardly angled relative to the frame sidewall;

b) providing a second frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange; and iii) a second set of interlocking tab precursors provided at a frame sidewall end, wherein the second set of interlocking tab precursors include a second series of shorter and longer tabs inwardly angled relative to the frame sidewall;

c) aligning the first frame section with the second frame section so that the shorter tabs of the first set are proximate the longer tabs of the second set, and so that the longer tabs of the first set are proximate the shorter tabs of the second set; and d) folding the longer tabs over the shorter tabs to form an interlocking tab structure.

Enumerated embodiment 30. The method of enumerated embodiment 29, further including applying a compressive force to each side of the folded longer tabs.

Enumerated embodiment 31. The method of enumerated embodiment 29 or 30 or any other enumerated embodiment, further including applying a sealant over the interlocking tab structure.

Enumerated embodiment 32. A frame for at least partially enclosing or supporting a panel, the frame including:

a) a first frame section and a second frame section, each frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange; and iii) a panel containment structure at an upper portion of the frame sidewall;

wherein at least the bottom flange, frame sidewall, and panel containment structure of the first frame section and of the second frame section each collectively form a respective first frame space and second frame space, each frame space at least partially enclosed on at least three sides; and b) an insert connector including:

i) a first portion that extends at least partially into the first frame space and lockingly engages the first frame section; and ii) a second portion the extends at least partially into the second frame space and lockingly engages the second frame section.

Enumerated embodiment 33. The frame of enumerated embodiment 32 or any other enumerated embodiment, wherein the first frame section further includes a support wall extending between its panel containment structure and bottom flange, and wherein at least the bottom flange, frame sidewall, panel containment structure and support wall of the first frame section collectively form the first frame space that is at least partially enclosed on four sides.

Enumerated embodiment 34. The frame of enumerated embodiment 33 or any other enumerated embodiment, wherein the second frame section further includes a support wall extending between its panel containment structure and bottom flange, and wherein at least the bottom flange, frame sidewall, panel containment structure and support wall of the second frame section collectively form the second frame space that is at least partially enclosed on four sides.

Enumerated embodiment 35. The frame according to any of enumerated embodiments 32-34 or any other enumerated embodiment, wherein the insert connector is a corner insert having the first portion provided at an angle relative to the second portion, and wherein the first frame section, second frame section, and corner insert collectively form a corner joint.

Enumerated embodiment 36. The frame according to any of enumerated embodiments 32-35 or any other enumerated embodiment, wherein the insert connector engages one or both frame sections using a tab connection assembly.

Enumerated embodiment 37. The frame of enumerated embodiment 36 or any other enumerated embodiment, wherein the tab connection assembly includes a spring tab, a bent tab, a press-fit tab, or is formed from a tab precursor structure.

Enumerated embodiment 38. The frame according to any of enumerated embodiments 32-37 or any other enumerated embodiment, wherein the insert connector includes a roughened or serrated surface.

Enumerated embodiment 39. A frame for at least partially enclosing or supporting a panel, the frame including:

a) a first frame section and a second frame section, each frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange;

iii) a panel containment structure at an upper portion of the frame sidewall;

iv) an optional support wall extending between the panel containment structure and the bottom flange;

v) at least one first frame section engagement feature provided on the sidewall or optional support wall of the first frame section; and vi) at least one second frame section engagement feature provided on the sidewall or optional support wall of the second frame section, wherein an end of the first frame section sidewall meets an end of the second frame section sidewall at a corner joint angle, and b) a corner connector element including:

i) a first connector wall and a second connector wall, wherein the second connector wall is provided at a connector angle relative to the first connector wall, and wherein the connector angle corresponds to the corner joint angle;

ii) at least one first connector engagement feature provided on the first connector wall; and iii) at least one second connector engagement feature provided on the second connector wall, wherein the corner connector element is attached to the first frame section via the first connection engagement feature and the first frame section engagement feature, and wherein the corner connector element is attached to the second frame section via the second connection engagement feature and the second frame section engagement feature.

Enumerated embodiment 40. The frame of enumerated embodiment 39 or any other enumerated embodiment, wherein the first connector engagement feature and the first frame section engagement feature collectively form a first tab connection assembly including a first hole feature and a first tab feature.

Enumerated embodiment 41. The frame of enumerated embodiment 40 or any other enumerated embodiment, wherein the first frame section engagement feature includes the first hole feature and the first connector engagement feature includes the first tab feature.

Enumerated embodiment 42. The frame of enumerated embodiment 40 or any other enumerated embodiment, wherein the first frame section engagement feature includes the first tab feature and the first connector engagement feature includes the first hole feature.

Enumerated embodiment 43. The frame according to any of enumerated embodiments 39-42 or any other enumerated embodiment, wherein the second connector engagement feature and the second frame section engagement feature collectively form a second tab connection assembly including a second hole feature and a second tab feature.

Enumerated embodiment 44. The frame of enumerated embodiment 43 or any other enumerated embodiment, wherein the second frame section engagement feature includes the second hole feature and the second connector engagement feature includes the second tab feature.

Enumerated embodiment 45. The frame of enumerated embodiment 44 or any other enumerated embodiment, wherein the second frame section engagement feature includes the second tab feature and the second connector engagement feature includes the second hole feature.

Enumerated embodiment 46. The frame according to any of enumerated embodiments 40-45 or any other enumerated embodiment, wherein at least one tab feature includes a bent tab element Enumerated embodiment 47. The frame according to any of enumerated embodiments 40-46 or any other enumerated embodiment, wherein at least one tab feature includes a press-fit tab element Enumerated embodiment 48. The frame according to any of enumerated embodiments 40-47 or any other enumerated embodiment, wherein at least one tab feature includes a spring tab element.

Enumerated embodiment 49. The frame according to any of enumerated embodiments 40-48 or any other enumerated embodiment, wherein at least one tab feature is formed from a tab precursor structure.

Enumerated embodiment 50. The frame according to any of enumerated embodiments 40-49 or any other enumerated embodiment, wherein at least one hole feature includes a slot.

Enumerated embodiment 51. The frame according to any of enumerated embodiments 39-50 or any other enumerated embodiment, wherein the first frame section and second frame section each have one or more additional frame section engagement features, and wherein the first connector wall and second connector wall each have one or more additional connector engagement features.

Enumerated embodiment 52. The frame according to any of enumerated embodiments 39-50 or any other enumerated embodiment, wherein the corner connector element includes a spacer tab.

Enumerated embodiment 53. The frame according to any of enumerated embodiments 39-52 or any other enumerated embodiment, wherein the first frame section and second frame section form a corner joint.

Enumerated embodiment 54. The frame according to any of enumerated embodiments 39-52 or any other enumerated embodiment, wherein the first frame section and second frame section form a corner bend.

Enumerated embodiment 55. A method for forming a corner bend or corner joint between two frame sections, the method including:

a) providing a first frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange; and iii) a reversing flange fold at the end of the bottom flange forming a doubled bottom flange portion including an upper layer and lower layer of framework material;

iv) a first corner connector bottom flange element formed by cutting away a portion of the upper layer of framework material at the second end;

a) providing a second frame section including:

i) an elongated piece of framework material having a first end and a second end, wherein the first and second ends define a lengthwise dimension;

ii) a lengthwise fold defining an intersection of a frame sidewall with a bottom flange, wherein the frame sidewall is characterized by a height extending from the bottom flange; and iii) a reversing flange fold at the end of the bottom flange forming a doubled bottom flange portion including an upper layer and lower layer of framework material;

iv) a second corner connector bottom flange element formed by cutting away a portion of the lower layer of framework material at the first end;

c) forming the corner bend or corner joint between the second end of the first frame section and the first end of the second frame by moving the first corner connector bottom flange element under the second corner connector bottom flange element.

Enumerated embodiment 56. The method of enumerated embodiment 55 or any other enumerated embodiment, further including connecting the first and second corner connector bottom flange elements.

Enumerated embodiment 57. The method of enumerated embodiment 56 or any other enumerated embodiment, wherein the connecting includes using a clinch, rivet, screw, bolt, weld, or tab connection assembly Enumerated embodiment 58. The method according to any of enumerated embodiments 55-57 or any other enumerated embodiment, wherein the second end of the first frame section sidewall is contiguous with the first end of the second frame section sidewall at a corner bend precursor axis, and wherein the first frame section and second frame section form a corner bend.

Enumerated embodiment 59. The method according to any of enumerated embodiments 55-57 or any other enumerated embodiment, wherein the second end of the first frame section sidewall is not contiguous with the first end of the second frame section sidewall at a corner bend precursor axis, and wherein the first frame section and second frame section form a corner joint.

Enumerated embodiment 60. The frame or method according to any of enumerated embodiments 1-59, wherein the framework material includes coated steel.

Enumerated embodiment 61. The frame or method of enumerated embodiment 60, wherein the coated steel has a thickness in a range of about 0.3 mm to about 1.4 mm.

As can be easily understood from the foregoing, the basic concepts of the various embodiments of the present application(s) may be embodied in a variety of ways. It involves frame, frame precursor structures, and/or connection technology techniques as well as devices to accomplish the appropriate frame, frame precursor structures, and/or connection technologies. In this application, the frame, frame precursor structures, and/or connection technology techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the various embodiments of the present application and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application. As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. Terms like "overlaying", "over" or the like may be direct contact, indirect contact, above, upon, cover, or the like.

It should also be understood that a variety of changes may be made without departing from the essence of the various embodiments of the present application. Such changes are also implicitly included in the description. They still fall within the scope of the various embodiments of the present application. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the present application both independently and as an overall system.

Further, each of the various elements of embodiments of the present application and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the present application, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the present application are entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "connection" should be understood to encompass disclosure of the act of "connecting"—whether explicitly discussed or not—and, conversely, were there effectively disclosure of the act of "connecting", such a disclosure should be understood to encompass disclosure of a "connection" and even a "means for connecting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of the various embodiments of present application such statements are expressly not to be considered as made by the applicant(s).

Thus, the applicant(s) should be understood to have support and make claims to embodiments including at least: i) each of the frame, frame precursor structure, and/or connector technologies as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent embodiments, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all embodiments described herein.

In addition and as to computer aspects and each aspect amenable to programming or other electronic automation, it should be understood that in characterizing these and all other aspects of the various embodiments of the present application—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as a person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent embodiments, and xxxiii) the various combinations of each of the above and of any aspect, all without limiting other aspects in addition. In addition, the applicant(s) should be understood to have support to claim and make a statement of invention that may include claims directed to any of the enumerated embodiments and any permutation or combination thereof.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as desired to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. A frame for at least partially enclosing or supporting a panel, the frame comprising:

a) a first frame section comprising:

i) an elongated piece of framework material having a first end and a second end, wherein the first and second ends define a lengthwise dimension;

ii) a first lengthwise fold defining an intersection of a frame sidewall with a bottom flange, wherein the frame sidewall is characterized by a height extending from the bottom flange;

iii) a panel containment structure at an upper portion of the frame sidewall;

iv) a reversing flange fold that folds a second layer of framework material backward directly onto the bottom flange to form a double layer of framework material along a first portion of the bottom flange;

v) a support wall; and vi) a second lengthwise fold defining an intersection of the support wall with the double layer of framework material at the bottom flange;

wherein at least the bottom flange, frame sidewall, panel containment structure, and support wall of the first frame section each collectively form a first frame space that is at least partially enclosed on four sides at the first frame section and at a side of the support wall opposite the double layer of framework material;

b) a second frame section comprising a second frame space that is at least partially enclosed on four sides at the second frame section and at a side of a second frame section support wall opposite a section frame section double layer of framework material; and c) an insert connector comprising:

i) a first portion that extends at least partially into the first frame space at the side of the support wall opposite the double layer of framework material and lockingly engages the first frame section; and ii) a second portion that extends at least partially into the second frame space at the side of the support wall opposite the double layer of framework material and lockingly engages the second frame section.

2. The frame of claim 1, wherein the insert connector is a corner insert having the first portion provided at an angle relative to the second portion, and wherein the first frame section, second frame section, and corner insert collectively form a corner joint.

3. The frame of claim 1, wherein the insert connector engages one or both of the first frame section and the second frame section using a tab connection assembly.

4. The frame of claim 3, wherein the tab connection assembly comprises a spring tab, a bent tab, a press-fit tab, or is formed from a tab precursor structure.

5. The frame of claim 3, wherein the insert connector comprises a roughened or serrated surface; wherein the tab connection assembly comprises a spring tab on the insert connector; and wherein the spring tab is configured to push the frame sidewalls into the roughened or serrated surface of the insert connector.

6. The frame of claim 3, wherein the insert connector comprises a roughened or serrated surface; wherein the tab connection assembly comprises a spring tab on the insert connector; and wherein the spring tab is configured to engage the frame sidewalls of each of the first and second frame sections.

7. The frame of claim 6, and further comprising an engagement feature on the first and second frame sections; wherein the engagement features comprise holes or grooves; and wherein the spring tab is configured to engage with the holes or grooves of the first and second frame sections.

8. The frame of claim 1, wherein the insert connector comprises a roughened or serrated surface.

9. The frame of claim 8, wherein the roughened or serrated surface of the insert connector comprises serrated teeth on the insert connector.

10. The frame of claim 9, further comprising an engagement feature on each of the first frame section and the second frame section, wherein the engagement features are configured to lockingly engage with the serrated teeth of the insert connector.

11. The frame of claim 10, wherein the engagement features of the first and second frame sections comprise holes or grooves.

12. The frame of claim 8, wherein the roughened or serrated surface is located at a top flap edge, a bottom flap edge, or both the top flap edge and bottom flap edge of the insert connector, and wherein the roughened or serrated surface is configured to engage the support walls of the first frame section and the second frame section.

13. The frame of claim 8, and further comprising a connector engagement feature of each of the first portion and second portion of the insert connector.

14. The frame of claim 13, wherein the connector engagement features comprise a tab connection assembly.

15. The frame of claim 14, wherein the tab connection assembly comprises a spring tab, a bent tab, a press-fit tab, or is formed from a tab precursor structure.

16. The frame of claim 13, wherein the connector engagement features of the insert connector are configured to push the first and second frame sections into the first and second portions of the insert connector.

17. The frame of claim 13, wherein the connector engagement features are configured to push the roughened or serrated surface of the insert connector into the first frame section and the second frame section.

18. The frame of claim 13, wherein the connector engagement features of each of the first portion and second portion of the insert connector are configured to push into the frame sidewalls of each of the first and second frame sections, and wherein the roughened or serrated surface of the insert connector engages with the support walls of the first and second frame sections.

19. The frame of claim 1, and further comprising indents located on an element chosen from the insert connector, an inside surface of the insert connector, an outside surface of the insert connector, the support walls of the first and second frame sections, and the sidewalls of the first and second frame sections.

20. The frame of claim 19, wherein the indents are configured to engage with an adjacent material chosen from an insert connector, sidewalls of the first and second frame sections, and support walls of the first and second frame sections.

* * * * *